(12) United States Patent
Kimura et al.

(10) Patent No.: US 7,226,035 B2
(45) Date of Patent: Jun. 5, 2007

(54) VALVE DEVICE

(75) Inventors: Hitotoshi Kimura, Nagano-ken (JP); Izumi Nozawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 122 days.

(21) Appl. No.: 10/412,664

(22) Filed: Apr. 14, 2003

(65) Prior Publication Data

US 2004/0021107 A1 Feb. 5, 2004

(30) Foreign Application Priority Data

| Apr. 12, 2002 | (JP) | ............................. 2002-110698 |
| Apr. 12, 2002 | (JP) | ............................. P2002-110696 |
| Apr. 12, 2002 | (JP) | ............................. P2002-110697 |
| May 24, 2002 | (JP) | ............................. 2002-151258 |
| May 24, 2002 | (JP) | ............................. 2002-151259 |
| Jun. 20, 2002 | (JP) | ............................. 2002-180421 |
| Aug. 30, 2002 | (JP) | ............................. 2002-255172 |
| Aug. 30, 2002 | (JP) | ............................. 2002-255173 |
| Feb. 19, 2003 | (JP) | ............................. 2003-041738 |

(51) Int. Cl.
*F16K 31/02* (2006.01)

(52) U.S. Cl. ................. 251/129.17; 251/65; 251/129.2; 347/9

(58) Field of Classification Search ........... 251/129.17, 251/129.2, 65; 347/9, 44
See application file for complete search history.

(56) References Cited

U.S. PATENT DOCUMENTS

| 3,244,397 A | * | 4/1966 | Fattor ........................ 251/129.1 |
| 3,606,241 A | * | 9/1971 | Bornholdt ............... 251/129.17 |
| 3,814,376 A | | 6/1974 | Reinicke |
| 4,253,493 A | | 3/1981 | English |
| 4,284,262 A | | 8/1981 | Ruyak |
| 4,474,212 A | * | 10/1984 | Schmitz .................. 251/129.08 |
| 4,496,134 A | | 1/1985 | Idogaki et al. |
| 4,506,701 A | | 3/1985 | Masaki et al. |
| 4,546,338 A | | 10/1985 | Idogaki et al. |
| 4,682,135 A | | 7/1987 | Yamakawa |
| 5,009,388 A | | 4/1991 | Pei-gi et al. |
| 5,040,567 A | | 8/1991 | Nestler et al. |
| 5,653,422 A | | 8/1997 | Pieloth et al. |
| 5,758,863 A | | 6/1998 | Buffet et al. |
| 6,105,931 A | * | 8/2000 | Frank et al. ............ 251/129.15 |
| 6,161,539 A | * | 12/2000 | Winter ..................... 251/129.2 |
| 6,199,587 B1 | | 3/2001 | Shlomi et al. |
| 6,318,851 B1 | * | 11/2001 | Hoen et al. .................... 347/92 |
| 6,390,611 B1 | | 5/2002 | Kobayashi et al. |

FOREIGN PATENT DOCUMENTS

| DE | 295 13 047 U1 | 2/1996 |
| DE | 199 18 007 A1 | 10/2000 |
| DE | 100 37 251 A1 | 2/2002 |

(Continued)

*Primary Examiner*—Eric Keasel
(74) *Attorney, Agent, or Firm*—Sughrue Mion, PLLC

(57) ABSTRACT

A valve member is located in a passage through which fluid passes. The valve member selectively opens and closes the passage. The valve member is supported by a support member formed a magnetic material. An electromagnetic driving mechanism attracts the support member with magnetic force. The electromagnetic driving mechanism is located outside the passage. When attracting the support member, the electromagnetic driving mechanism selectively opens and closes the passage with the valve member.

16 Claims, 32 Drawing Sheets

FOREIGN PATENT DOCUMENTS

| | | |
|---|---|---|
| EP | 0 693 646 A1 | 1/1996 |
| GB | 1008888 A | 11/1965 |
| GB | 1 270 879 A | 4/1972 |
| GB | 1 380 826 | 1/1975 |
| GB | 1 444 393 | 7/1976 |
| GB | 2 103 391 A | 2/1983 |
| JP | 48-42331 | 12/1973 |
| JP | 56-134673 | 10/1981 |
| JP | 58-22574 U | 2/1983 |
| JP | 58-170982 A | 10/1983 |
| JP | 52-203271 | 11/1983 |
| JP | 59-110981 A | 6/1984 |
| JP | 59-143645 | 8/1984 |
| JP | 60-051376 U | 3/1985 |
| JP | 60-051376 U | 4/1985 |
| JP | 60-177381 U | 11/1985 |
| JP | 61-002982 A | 1/1986 |
| JP | 61-290284 | 12/1986 |
| JP | 62-108678 U | 7/1987 |
| JP | 62-224785 A | 10/1987 |
| JP | 62-246669 | 10/1987 |
| JP | 63-147651 A | 6/1988 |
| JP | 1-503479 A | 11/1989 |
| JP | 03-031608 A | 2/1991 |
| JP | 04-258581 A | 9/1992 |
| JP | 05-44539 U | 6/1993 |
| JP | 05-201016 A | 8/1993 |
| JP | 6-21938 | 3/1994 |
| JP | 06-058452 A | 3/1994 |
| JP | 7-63273 | 3/1995 |
| JP | 08-118671 A | 5/1996 |
| JP | 8-510542 A | 11/1996 |
| JP | 9-11496 | 1/1997 |
| JP | 9-89146 | 3/1997 |
| JP | 09-229217 A | 5/1997 |
| JP | 11-013926 A | 1/1999 |
| JP | 11-286121 A | 10/1999 |
| JP | 11-348310 | 12/1999 |
| JP | 2000-074249 A | 3/2000 |
| JP | 2000-81162 | 3/2000 |
| JP | 2001-027350 A | 1/2001 |
| JP | 2001-212975 A | 8/2001 |
| JP | 2001-270095 A | 10/2001 |
| JP | 2001-304452 A | 10/2001 |
| JP | 2002-36603 | 2/2002 |
| WO | WO 87/04745 A1 | 8/1987 |
| WO | WO 00/03877 | 1/2000 |

* cited by examiner

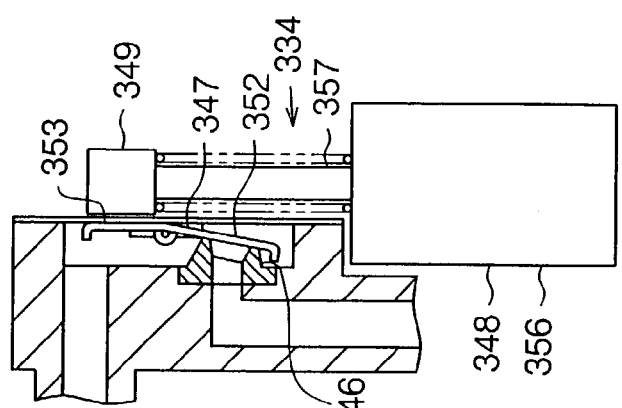
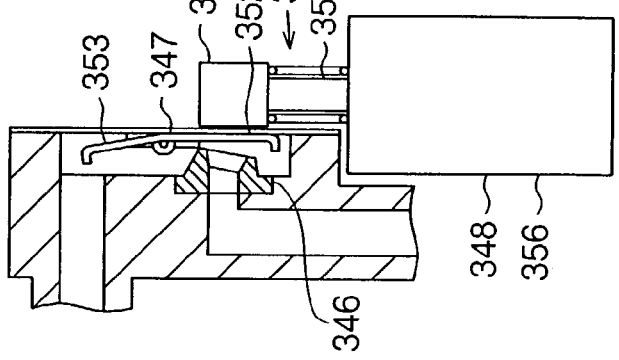
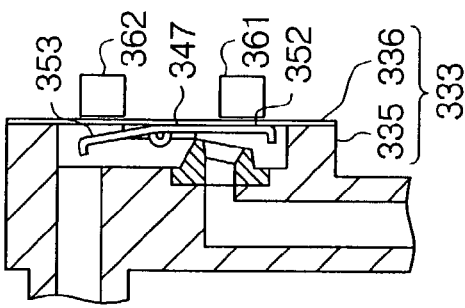
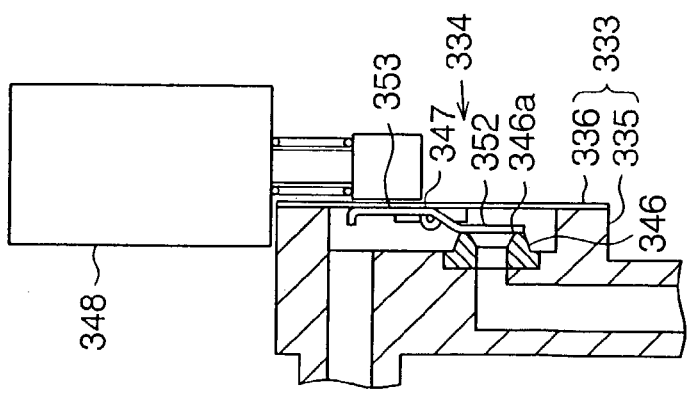

VALVE DEVICE

BACKGROUND OF THE INVENTION

The present invention relates to a valve device that opens and closes a passage of a fluid.

A typical valve device for opening and closing a passage of fluid uses an electromagnet. Japanese Laid-Open Patent Publication No. 2000-81162 discloses such a valve device. This valve device has a valve body (valve member) for opening and closing a passage of a valve main body that moves fluid. The valve body is made of magnetic material. The valve body is coupled to a film that is movably supported by the valve main body. An excitation coil is wound about the outer circumference of the fluid passage of the valve main body. When the coil is excited, an electromagnet is provided. When the excitation coil is excited, the valve body, which a magnetic material, is attracted or repelled thereby opening or closing the passage.

The valve body and part of the fluid passage must be made of magnetic material. Therefore, the electromagnet must be arranged close to the valve body so that magnetic force of the electromagnet is transmitted to the valve body. Therefore, the material for the valve member must be selected from a limited number of materials, which restricts selection of the valve member and limits the flexibility of the design. Also, the excitation coil must be wound about the outer circumference of the fluid passage of the valve main body. This complications the structure of the device and increases the size of the device.

SUMMARY OF THE INVENTION

Accordingly, it is an objective of the present invention to provide a valve device that adds to the selection of materials and flexibility of the design. Another objective of the present invention is to provide a valve device having a simplified structure and a reduced size.

To achieve the foregoing and other objectives and in accordance with the purpose of the present invention, a valve device including a valve member, a support member, and an electromagnetic driving mechanism is provided. The valve member is located in a passage through which fluid passes, and selectively opens and closes the passage. The support member supports the valve member and is made of a magnetic material. The electromagnetic driving mechanism attracts the support member with magnetic force. The electromagnetic driving mechanism is located outside the passage. When attracting the support member, the electromagnetic driving mechanism selectively opens and closes the passage with the valve member.

The present invention also provides a valve device including a passage forming member, a valve member, a support member, an electromagnetic driving mechanism, and a film. The passage forming member forms a passage through which fluid passes. The valve member is located in the passage, and selectively opens and closes the passage. The support member supports the valve member and is made of a magnetic material. The electromagnetic driving mechanism attracts the support member with magnetic force, and is located outside the passage. When attracting the support member, the electromagnetic driving mechanism selectively opens and closes the passage with the valve member. The film is located between the support member and the electromagnetic driving mechanism.

The present invention provides another valve device, which includes a valve member located in a fluid passage through which fluid moves. The valve member selectively opens and closes the passage. The valve member is controlled with a permanent magnet and an electromagnet.

Further, the present invention provides a valve device including an operational member, a magnet, and a moving mechanism. The valve member is located in a passage through which fluid moves. The operational member is formed of a magnetic material, and is located in the passage. A relative distance between the operational member and the valve member is changed such that the passage is selectively opened and closed. The magnet is located outside the passage. At a predetermined attraction position, the magnet attracts the operational member with magnetic force to open the passage. The moving mechanism causes the magnet to separate from or approach the attraction position.

The present invention also provides a valve device including a valve member, an operational member, a magnet, and a moving mechanism. The valve member is located in a passage through which fluid moves. The operational member is located in the passage, and has a first side section and a second side section. The operational member selectively opens and closes the passage by causing the first side section to contact and separate from the valve member. The magnet is located outside the passage. The magnet is moved to a first attraction position for attracting the first side section and to a second attraction position for attracting the second side section. The magnet opens and closes the passage by attracting the first side section or the second side section. The moving mechanism moves the magnet to the first attraction position and to the second attraction position.

The present invention provides yet another valve device including an operational member, a magnet and an elastic member. The operational member is located in a passage through which fluid moves, and is formed of a magnetic material. The operational member is moved between a standby position for closing the passage and an operational position for opening the passage. The magnet attracts the operational member with magnetic force, thereby moving the operational member from the standby position to the operational position. The elastic member is located in the passage, and urges the operational member to the standby position.

Also, a valve device including a valve seat, a magnetic member, a permanent magnet, and an excitation coil is provided. The valve seat is located in a passage through which fluid moves. The magnetic member is moved in a first direction approaching the valve seat and in a second direction separating from the valve seat. As the magnetic member is moved, the magnetic member selectively opens and closes the passage. The permanent magnet is located outside the passage. The permanent magnet attracts the magnetic member to move the magnetic member in the first direction or in the second direction. The excitation coil magnetizes the magnetic member such that the magnetic member repels the permanent magnet, thereby moving the magnetic member in a direction opposite from the direction in which the magnetic member is moved when attracted by the permanent magnet.

Another valve device including a valve seat, a first magnetic member, a second magnetic member, and an excitation coil is provided. The valve seat is located in a passage through which fluid moves. The first magnetic member is moved in a first direction approaching the valve seat and in a second direction separating from the valve seat. As the first magnetic member is moved, the first magnetic member selectively opens and closes the passage. The second magnetic member is arranged along the movement direction of the first magnetic member. The excitation coil has an central axis that is perpendicular to the movement direction of the first magnetic member. The excitation coil surrounds the valve seat, the first magnetic member, and the second magnetic member. By supplying current to the excitation coil, the first magnetic member and the second magnetic member are magnetized to repel each other, thereby moving the first magnetic member in the first direction or in the second direction.

Also, a valve device including a valve seat, an operational member, and a moving mechanism is provided. The valve seat is located in a passage through which fluid moves. The operational member is located in the passage, and is moved between a sealing position for sealing the valve seat and an opening position for opening the valve seat. The moving mechanism reciprocates the operational member between the sealing position and the opening position. The operational member is movable along a wall of the passage and has a support shaft for rotatably supporting the operational member. By rotating the operational member about the support shaft, the operational member is selectively positioned at the sealing position and the opening position.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 27(a) is a schematic view showing an operation of a pressure damper according to an eleventh embodiment when no current is supplied;

FIG. 27(b) is a schematic view showing an operation of the pressure damper according to the eleventh embodiment when current is supplied;

FIG. 28 is a partially cross-sectional view showing a pressure damper;

FIG. 29 is a partially cross-sectional view showing a pressure damper;

DETAILED DESCRIPTION OF THE PREFERRED EMBODIMENTS

A valve device according to a first embodiment of the present invention will be described with reference to FIGS. 1 to 4. The valve device is used in a pressure damper 15 of an inkjet type recording apparatus.

Figure 1:
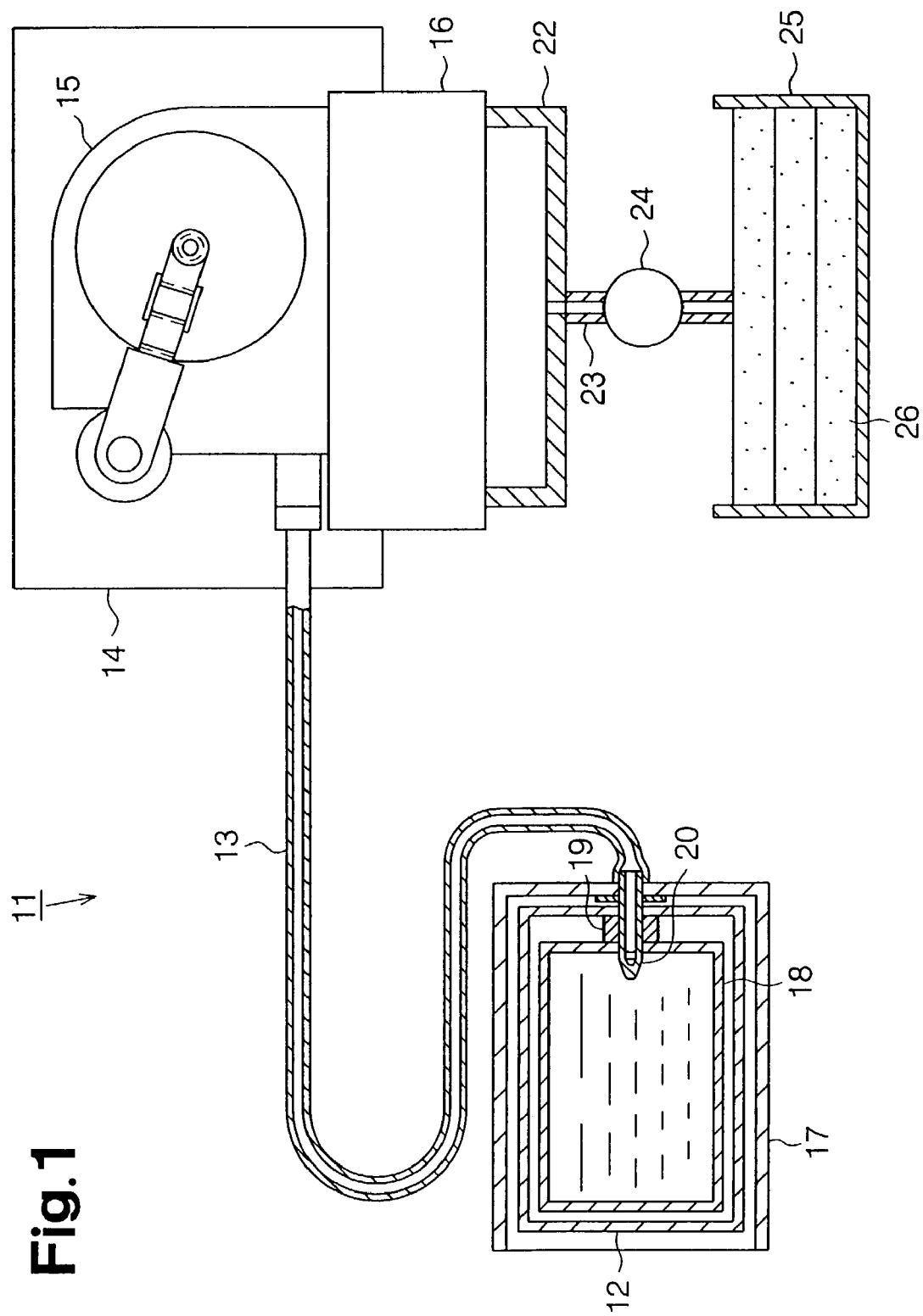
FIG. 1 is a schematic view showing an inkjet printer according to a first embodiment of the present invention.

FIG. 1 is a schematic diagram showing the inkjet type recording apparatus, which is an inkjet printer 11. As shown in FIG. 1, the inkjet printer 11 supplies ink from an ink cartridge 12 to a recording head 16 through an ink supply tube 13 and the pressure damper 15, which is mounted on a carriage 14. The recording head 16 has a nozzle opening to inject ink droplets. The recording head 16 discharges ink droplets onto a print medium such as a sheet of recording paper, thereby recording print data such as images and characters. The inkjet printer 11 is capable of printing on a large format target such as an A0 sized sheet of paper. The inkjet printer 11 therefore consumes a great amount of ink and thus needs to store a great amount of ink. Therefore, if an ink cartridge storing a great amount of ink is mounted on a carriage, the weight of the carriage is increased, which adds an excessive load to a motor for driving the carriage.

The inkjet printer 11 thus has a configuration in which the ink cartridge 12 is not mounted on the carriage 14.

The ink cartridge 12 is accommodated in an ink cartridge holder 17 located in a main body of the inkjet printer 11. An ink pack 18 is located in the ink cartridge 12. The ink pack 18 is filled with ink. A needle receiving portion 19 is formed at one end of the ink pack 18. A needle 20 attached to the ink cartridge holder 17 is received by the needle receiving portion 19. The needle 20 is coupled to one end of the supply tube 13 and supplies ink to the pressure damper 15. The supply tube 13 is made of a flexible material such as polyethylene. The supply tube 13 may have a double-tube structure having an inner tube and an outer tube. In this case, the inner tube is made of a flexible material having a high chemical resistance, and the outer tube is made of polyvinyl chloride having a high airtight property or of a metal film.

The carriage 14 is movably provided in the printer main body. Specifically, the carriage 14 is mounted and reciprocates on a guide member (not shown), which extends along a lateral direction of a sheet of recording paper (main scanning direction). The carriage 14 is molded with a resin material. The pressure damper 15, which function as a valve device, is located in the carriage 14. The pressure damper 15 suppresses fluctuations in ink pressure caused by reciprocation of the carriage 14. The pressure damper 15 will be discussed below. The recording head 16 is located at the lower side of the carriage 14. An ink passage is formed to supply ink from the pressure damper 15 to the recording head 16. Although not illustrated, the recording head 16 includes a filter, an ink supply pipe, a piezoelectric oscillator, a passage unit, and a nozzle. The recording head 16 expands and contracts a pressure chamber with the piezoelectric oscillator to discharge ink droplets from the nozzle opening.

A cap 22 is located at the lower side of the recording head 16 as viewed in FIG. 1. The cap 22 has a closed end and its opening caps the recording head 16. The cap 22 is at a non-printing area of the inkjet printer 11. When the recording head 16 is not printing, the cap 22 covers the nozzle opening of the recording head 16, thereby preventing evaporation of moisture. The cap 22 also applies suction to the recording head 16 to clean the recording head 16. The bottom of the cap 22 is communicated with a suction tube 23. A suction pump 24 is provided on the suction tube 23. The suction pump 24 forcibly draws ink from the recording head 16 toward the cap 22. Ink drawn by the suction pump 24 is collected in a collecting box 25. A multilayer sponges 26 are accommodated in the collecting box 25 to store collected ink.

Although the structure illustrated in FIG. 1 only corresponds to ink of one color, the inkjet printer 11 is configured to print in a plurality of inks such as cyan, magenta, yellow, and black. Therefore, the ink cartridge 12, the ink supply tube 13, the pressure damper 15, and the recording head 16 are each provided for each of the ink colors.

The pressure damper 15 will now be described with reference to FIGS. 2(a) to 4.

Figure 2A:
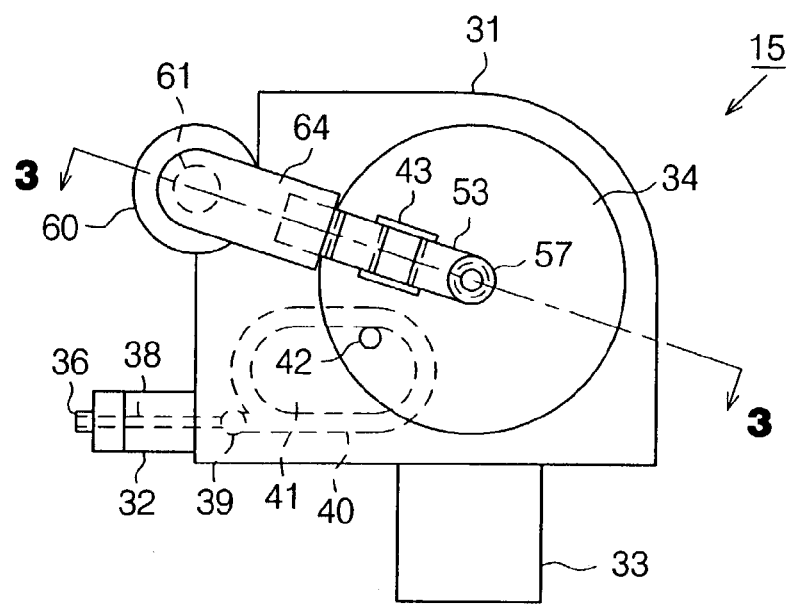
FIG. 2(a) is a rear view showing a pressure damper according to the first embodiment.
Figure 2B:
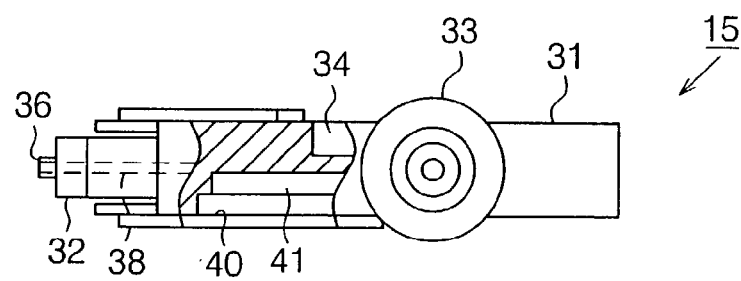
FIG. 2(b) is a side view, with a part cut away, showing the pressure damper of FIG. 2(a)
Figure 2C:
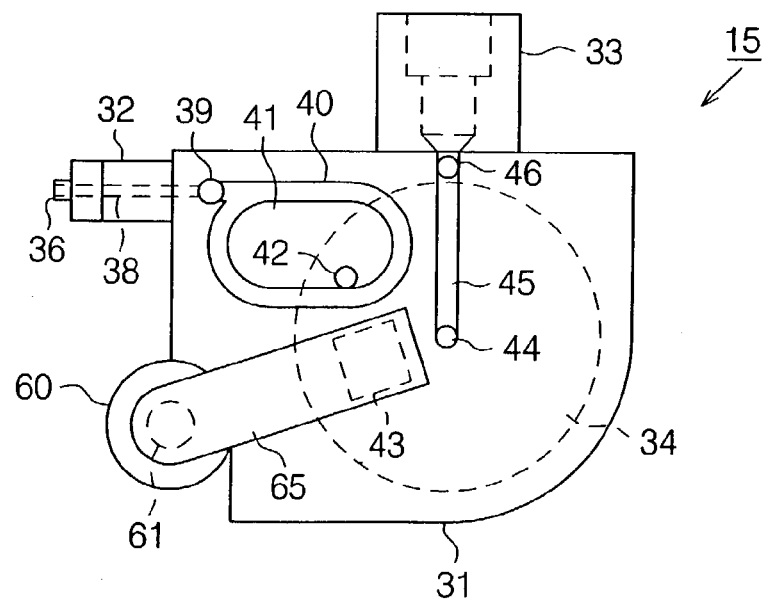
FIG. 2(c) is a front view showing the pressure damper of FIG. 2(a)
Figure 3:
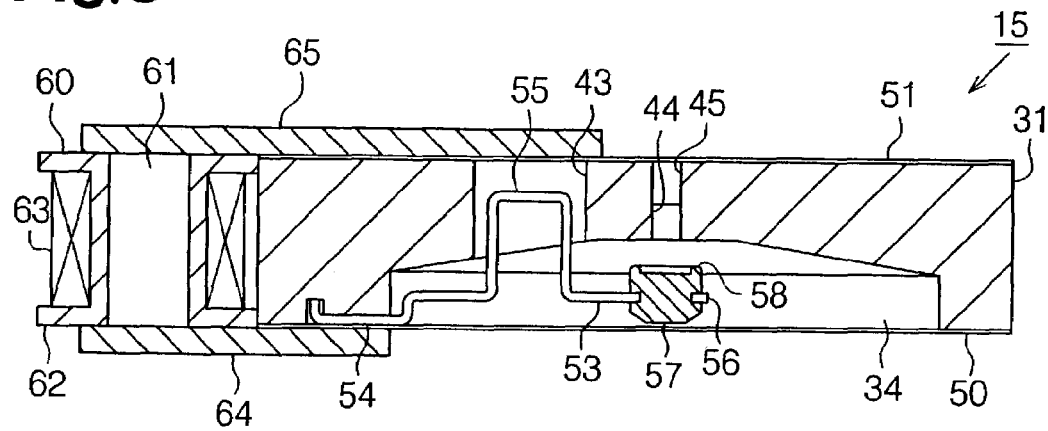
FIG. 3 is a cross-sectional view taken along line 3-3 of FIG. 2(a)
Figure 4:
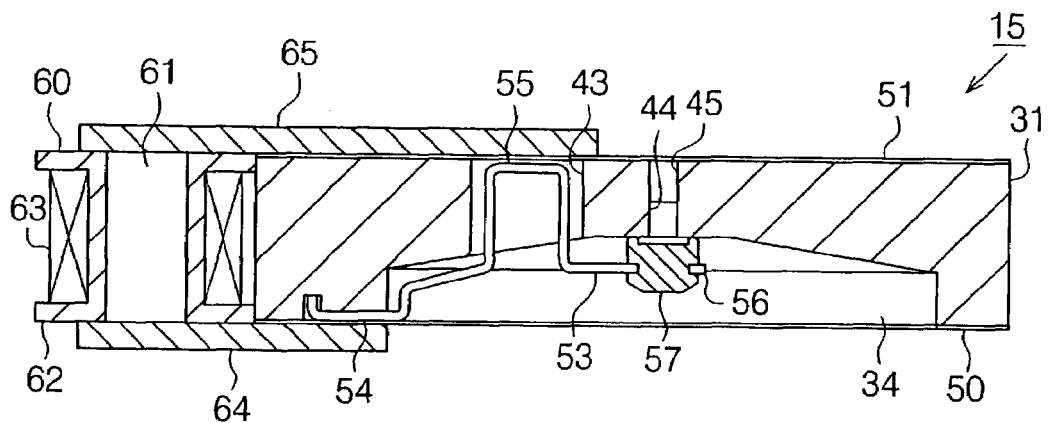
FIG. 4 is a cross-sectional view showing an operation of the pressure damper.

FIGS. 2(a) to FIG. 2(c) illustrate the pressure damper 15. FIG. 2(a) is a rear view. FIG. 2(b) is a side view. FIG. 2(c) is a front view. FIGS. 3 and 4 are cross-sectional views, with a part cut away, along line 3-3 of FIG. 2(a).

The pressure damper 15 includes a passage forming portion 31, an ink inlet 32, and a needle coupler 33. The passage forming portion 31 is formed of a resin material such as polypropylene or polyethylene. An ink chamber 34 is defined in the passage forming portion 31. The passage forming portion 31 has a closed end and has an opening that opens at the bottom side of the pressure damper 15.

The ink inlet 32 has a connector portion 36 to which the ink supply tube 13 is connected. The connector portion 36 is communicated with a first ink passage 38. The first ink passage 38 is communicated with an annular filter passage 40 through a second ink passage 39. A filter 41 is located in the vicinity of the filter passage 40. The filter 41 traps foreign matter in ink. The filter 41 is communicated with the ink chamber 34 through a third ink passage 42.

A through hole 43, which is substantially shaped like a rectangular parallelepiped, is formed in the ink chamber 34. The through hole 43 extends to the upper surface of the pressure damper 15. A small hole 44 is formed substantially in the center of the passage forming portion 31. The small hole 44 is communicated with the ink chamber 34. The small hole 44 is communicated with the needle coupler 33 through a fourth ink passage 45 and a fifth ink passage 46. The needle coupler 33 is formed to receive an ink supply needle (not shown) provided in the recording head 16. Therefore, the first ink passage 38, the second ink passage 39, the filter passage 40, the third ink passage 42, the ink chamber 34, the small hole 44, the fourth ink passage 45, and the fifth ink passage 46 form a continuous ink passage in the pressure damper 15. Ink enters the continuous ink passage from the ink supply tube 13 through the first ink passage 38 and is supplied to the recording head 16 from the fifth ink passage 46. In this embodiment, a part of the continuous ink passage including the first ink passage 38, the second ink passage 39, the filter passage 40, and the third ink passage 42 is referred to as an upstream section of the pressure damper 15, which function as the valve device.

Transparent films 50, 51 are attached to the rear surface and the front surface of the pressure damper 15, respectively. The films 50, 51 are not illustrated in FIGS. 2(a) to 2(c). Each of the films 50, 51 is formed of layers of different materials, such as a polyethylene layer, a bas barrier layer, and nylon layer. Therefore, the films 50, 51 are made of materials having a high gas barrier property. The thicknesses of the films 50, 51 are approximately 0.1 mm to minimize magnetic reluctance. The films 50, 51 are heat welded to the passage forming portion 31 to seal the openings of the ink chamber 34 and the through hole 43 formed in the passage forming portion 31. Particularly, the film 50 is capable of changing its shape either in a direction contracting or expanding the ink chamber 34. The compliance of the film 50 due to elastic deformation absorbs pressure fluctuations of ink in the ink chamber 34.

A support member 53 and a valve member 57 are located in the ink chamber 34, which forms the ink passage. The support member 53 is formed of a leaf spring made of magnetic and elastic material. For example, the support member 53 is mad of a material such as SUS420J2 and SUS631. A proximal section 54 of the support member 53 is held by the passage forming portion 31 and the film 50 at the back of the passage forming portion 31. The proximal section 54 function as a fulcrum of the support member 53. The support member 53 is bent substantially at the center to protrude toward the film 51. The protruded portion forms an attraction section 55 of the support member 53.

The valve member 57 is fixed to a distal portion 56 of the support member 53. The valve member 57 is arranged to close the small hole 44 as shown in FIG. 4 when the support member 53 is moved. Therefore, the distance from the distal portion 54 to the attraction section 55 is shorter than the distance from the distal portion 54 to the valve member 57.

An annular projection 58 is formed on the surface of the valve member 57. The projection 58 contacts the passage forming portion 31 at an area surrounding the small hole 44, thereby closing the small hole 44, which is a passage. The valve member 57 is formed of an elastic material. The valve member 57 is made of, for example, a fluorine rubber, a rigid silicon rubber, a chlorinated butyl rubber, an elastomer, a CR rubber, an NBR rubber, or a urethane rubber.

Electromagnetic driving means, which is an electromagnet 60, is located outside of the passage forming portion 31, or outside the ink passage. The electromagnet 60 includes an iron core 61, a frame 62, an excitation coil 63, a first magnetic member 64, and a second magnetic member 65. The frame 62 is machined to form a cylinder, and the iron core 61 is located in the center of the frame 62. The frame 62 is made of resin such as polybutylene terephthalate. The excitation coil 63 is wound about the frame 62. The excitation coil 63 is made of a copper wire and coated with an insulating coating layer of polyethylene and urethane.

The excitation coil 63 is electrically connected to a valve device driving circuit with a lead wire (neither is shown). The first and second magnetic members 64, 65 are fixed to the iron core 61 so that magnetic force is transmitted to the first and second magnetic members 64, 65. The distal end of the first magnetic member 64 is located in the vicinity of the proximal section 54 of the support member 53. The proximal section 54 is held by the passage forming portion 31, the film 50, and the first magnetic member 64. Magnetic force is transmitted to the first magnetic member 64 and the proximal section 54 through the film 50. The distal end of the second magnetic member 65 is located in the vicinity of the attraction section 55 of the support member 53 and the through hole 43. The distal end of the second magnetic member 65 is capable of applying suction to the attraction section 55 with magnetic force. The film 51 is arranged such that the attraction section 55 faces the second magnetic member 65.

An operation of the pressure damper 15 will now be described.

When the electromagnet 60 is not excited, the valve member 57 is away from the small hole 44 as shown in FIG. 3 and opens the ink passage. When the electromagnet 60 is excited, the first and second magnetic members 64, 65 and the support member 53 are also excited. Accordingly, the attraction section 55 is drawn by the second magnetic member 65. As a result, the support member 53 is elastically deformed as shown in FIG. 4, and the attraction section 55 approaches the second magnetic member 65, with the film 51 in between. As the support member 53 is drawn, the valve member 57 is moved together with the support member 53 to close the small hole 44. When the electromagnet 60 is de-excited, the support member 53 returns to the state shown in FIG. 3 by its own elasticity. Accordingly, the valve member 57 is separated from the small hole 44 to open the ink passage.

The above described operation of the pressure damper 15 is suitable for cleaning the recording head 16 by drawing ink. In the inkjet printer 11, a suction cleaning is performed during a maintenance. In this cleaning, to remove bubbles in ink in the recording head 16, the ink is drawn by the suction pump 24. However, in a normal cleaning, bubbles cannot be sufficiently removed. Particularly, if a great number of bubbles remain on a filter (not shown), the nozzle may be blocked, which degrades the printing quality.

The "choke cleaning" is one of effective methods for removing bubbles. In the choke cleaning, a valve located in the upstream section of the ink passage is closed (choked), and suction is applied to the nozzle by the suction pump 24.

The pressure in the recording head 16 is lowered to expand the bubbles, so that the bubbles are drawn to a section downstream of the filter of the recording head 19. In this state, the valve is opened to discharge the bubbles. In the pressure damper 15, the choke cleaning is executed by opening and closing the ink passage with the valve member 57.

The operation of the pressure damper 15 is suitable for cleaning one of a plurality of recording heads 16, or for executing the selective cleaning. The number of the nozzles per head of recent inkjet printers has increased due to the demands for faster printing. This is called higher resolution trend of inkjet printers. Also, due to the demands for high quality color printing, inkjet printers are equipped with inks with an increased number of colors. Accordingly, the amount of consumed ink has been increasing. Therefore, there is a demand for reducing the amount of consumed ink by reducing liquid waste generated in suction cleaning. To achieve this goal, the selective cleaning, in which only the recording head 16 that requires cleaning is subjected to suction, is favorable. According to this embodiment, the ink passage of the printing head corresponding to the ink that needs cleaning is opened, and the ink passages of the other printing heads are closed. In other words, this embodiment is capable of executing the selective cleaning.

The pressure damper 15 according to the first embodiment has the following advantages.

(1) In the first embodiment, the electromagnet 60 forms a magnetic circuit with the support member 53 through the first and second magnetic members 64, 65. When the electromagnet 60 is excited, the attraction section 55 of the support member 53 is drawn, which causes the valve member 57 to close the passage. The first and second magnetic members 64, 65 are arranged to face each other, and the support member 53 is located between the first and second magnetic members 64, 65. Therefore, the support member 53 is effectively drawn.

(2) In the first embodiment, the support member 53 is formed of a magnetic material. This eliminates the necessity to form the valve member 57 with a magnetic material. Also, since the electromagnet 60 does not need to be located in the vicinity of the valve member 57, there is no need to wind an excitation coil directly about the ink passage to form an electromagnet. Since the electromagnet 60 is located outside of the passage, no electromagnet needs to be located in the passage. Accordingly, a valve device having a simplified structure and a reduced size is obtained.

(3) In the first embodiment, the proximal section 54 and a first magnetic member 64 are located close to each other, with the film 50 in between. This reduces the distance between the proximal section 54 and the first magnetic member 64. Therefore, even if the load on the electromagnet 60 is reduced, a relatively great attraction force is generated.

(4) In the first embodiment, the films 50, 51 seals the ink passage. Particularly, by using thin materials for the films 50, 51, the magnetic reluctance is decreased at portions that receives magnetic attraction force. Therefore, a more efficient magnetic circuit is created.

(5) In the first embodiment, the films 50, 51 are heat welded to the passage forming portion 31. Therefore, the passage is sealed with a simple structure. Also, since the films 50, 51 are made of a material having a high gas barrier property, the films 50, 51 reliably prevent gas from entering the passage.

(6) Therefore, the distance from the distal portion 54 to the attraction section 55 is shorter than the distance from the distal portion 54 to the valve member 57. This reduces the movement of the attraction section 55 and thus decreases the load on the electromagnet 60. Since the attraction section 55 is formed by bending toward the magnetic member 65, the distance between the attraction section 55 and the second magnetic member 65 is reduced.

(7) In the first embodiment, the filter 41 is located in the upstream section of the pressure damper 15, which is a valve device. This prevents foreign matter from entering the valve device and permits the valve member 57 to reliably open and close.

(8) In the first embodiment, the valve member 57 closes the ink passage when the electromagnet 60 is activated, and opens the passage when the electromagnet 60 is deactivated. Therefore, a valve device that closes the ink passage when the electromagnet 60 is not activated is obtained. Therefore, during the choke cleaning or the selective cleaning, the electromagnet 60 needs to be excited only when cleaning operation is executed. This reduces the load on the entire inkjet printer 11.

(9) In the first embodiment, the support member 53 is a leaf spring. Therefore, when the support member 53 is elastically deformed by magnetic attraction force, the ink passage is opened or closed. Also, since the support member 53 is made of an elastic material, an additional elastic member is not needed when the support member 53 is drawn.

(10) In the first embodiment, since the valve member 57 is made of an elastic material, the valve member 57 is closely contacts the passage forming portion 31. Particularly, since the projection 58 is formed at the distal end of the valve member 57, the valve member 57 is reliably seals the ink passage.

(11) In the first embodiment, the valve device is located upstream of the recording head 16 of the inkjet printer 11. Therefore, during cleaning to discharge bubbles from the filter of the recording head 16, the valve device is effectively used.

The first embodiment may be modified as follows.

In the first embodiment, the attraction section 55 of the support member 53 is shaped as illustrated in FIG. 3 and other drawings. However, the shape of the attraction section 55 may be changed. The distance between the attraction section 55 and the second magnetic member 65 may be changed as needed according to magnetic force generated by the electromagnet 60. Further, if a great magnetic force is generated, the attraction section 55 may be omitted.

Figure 5:
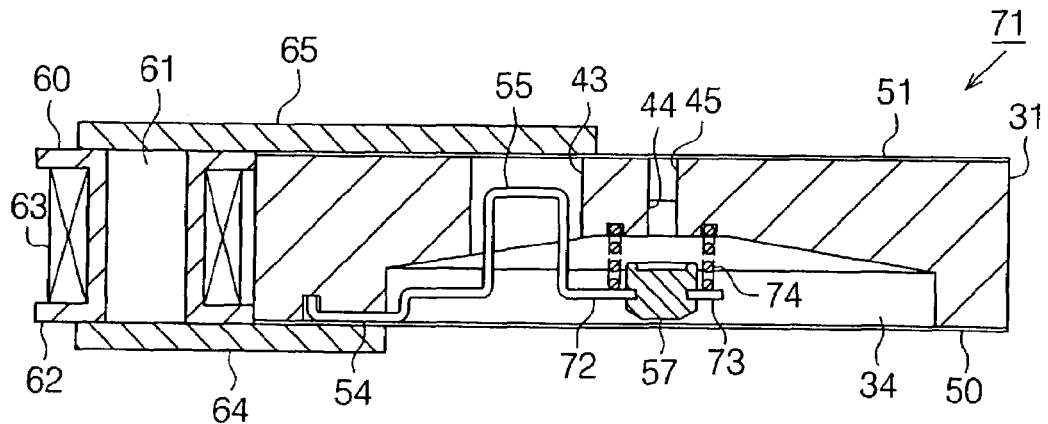
FIG. 5 is a cross-sectional view, with a part cut away, illustrating a pressure damper according to a second embodiment.

A pressure damper 71 according to a second embodiment of the present invention will now be described with reference to FIG. 5. The second embodiment is different from the first embodiment in the structure of the valve member and the support member. Thus, like or the same reference numerals are given to those components that are like or the same as the corresponding components of the first embodiment.

The pressure damper 71 has an elastic member, which is a coil spring 74. The coil spring 74 is located between a support member 72 and the small hole 44. When the ink passage is closed with the valve member 57, the force of the coil spring 74 acts in a direction to open the ink passage.

In addition to the advantages (1) to (11) of the first embodiment, the second embodiment provides the following advantage.

(12) In the second embodiment, when the ink passage is closed with the valve member 57, the force of the coil spring 74 acts in a direction to open the ink passage. Therefore, when the electromagnet 60 is de-excited, the coil spring 74 quickly opens the passage.

The second embodiment may be modified as follows.

In the second embodiment, the single coil spring 74 is used as an elastic member. However, a plurality of coil springs may be provided about the valve member 57.

In the second embodiment, the coil spring 74 is used as an elastic member. However, other types of elastic members may be used.

In the second embodiment, the support member 72 is formed of an elastic material. However, the support member 72 may be formed of a material other than an elastic material. This is because using the coil spring 74 eliminates the necessity for forming the support member 72 of an elastic material.

Figure 6:
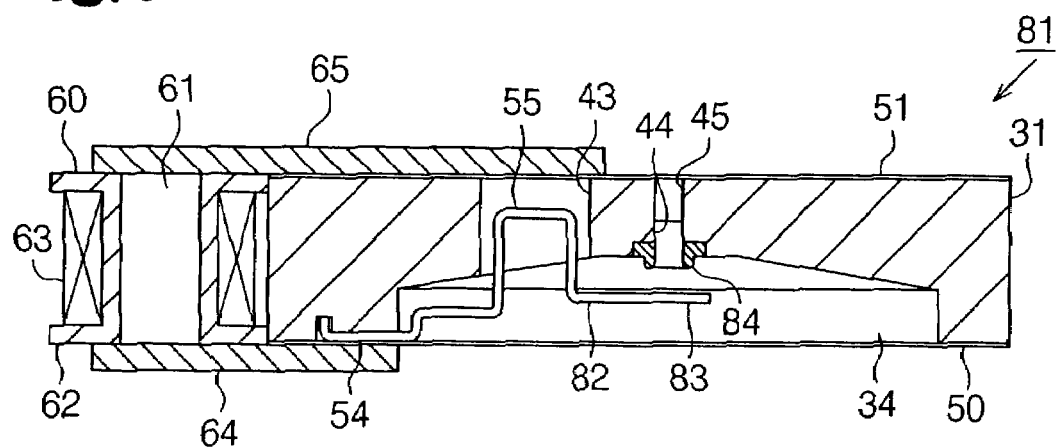
FIG. 6 is a cross-sectional view, with a part cut away, illustrating a pressure damper according to a third embodiment.

A pressure damper 81 according to a third embodiment of the present invention will now be described with reference to FIG. 6. The third embodiment is different from the first embodiment in the structure of the valve member and the support member. Thus, like or the same reference numerals are given to those components that are like or the same as the corresponding components of the first embodiment.

The pressure damper 81 of the third embodiment has the support member 82. However, the valve member 57 is not provided at the distal end. A distal portion 83 of the support member 82 functions as a valve member. An annular projection 84 is formed about the small hole 44. The projection 84 is formed of an elastic material. The projection 84 is made of, for example, a fluorine rubber, a silicon rubber, a butyl rubber, an elastomer, a CR rubber, an NBR rubber, or a urethane rubber. In this embodiment, when the electromagnet 60 is excited, the distal portion 83, which functions as a valve member, contacts the projection 84 of the small hole 44, to close the small hole 44, or the ink passage.

In addition to the advantages (1) to (9), and (11) of the first embodiment, the third embodiment provides the following advantage.

(12) The distal portion 83, which functions as a valve member, contacts the projection 84, which closes the ink passage. Particularly, since the projection 84 is made of an elastic material, the distal portion 83 closely contacts the projection 84.

The third embodiment may be modified as follows.

The valve member 57 of the first embodiment may be added to the third embodiment. The coil spring 74 of the second embodiment may be added to the third embodiment. The valve member 57 and the coil spring 74 may be added to the third embodiment. This structure further improves the sealing property of the ink passage.

Figure 7:
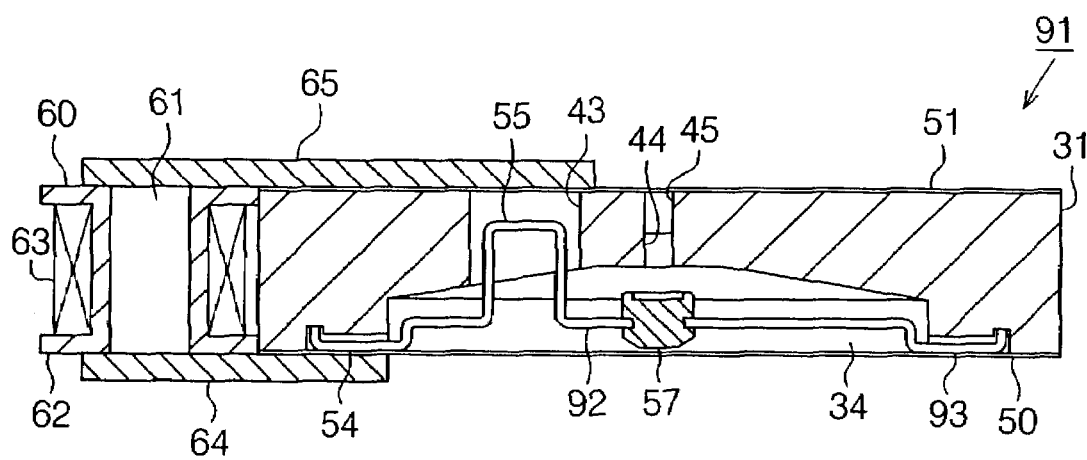
FIG. 7 is a cross-sectional view, with a part cut away, illustrating a pressure damper according to a fourth embodiment.
Figure 8:
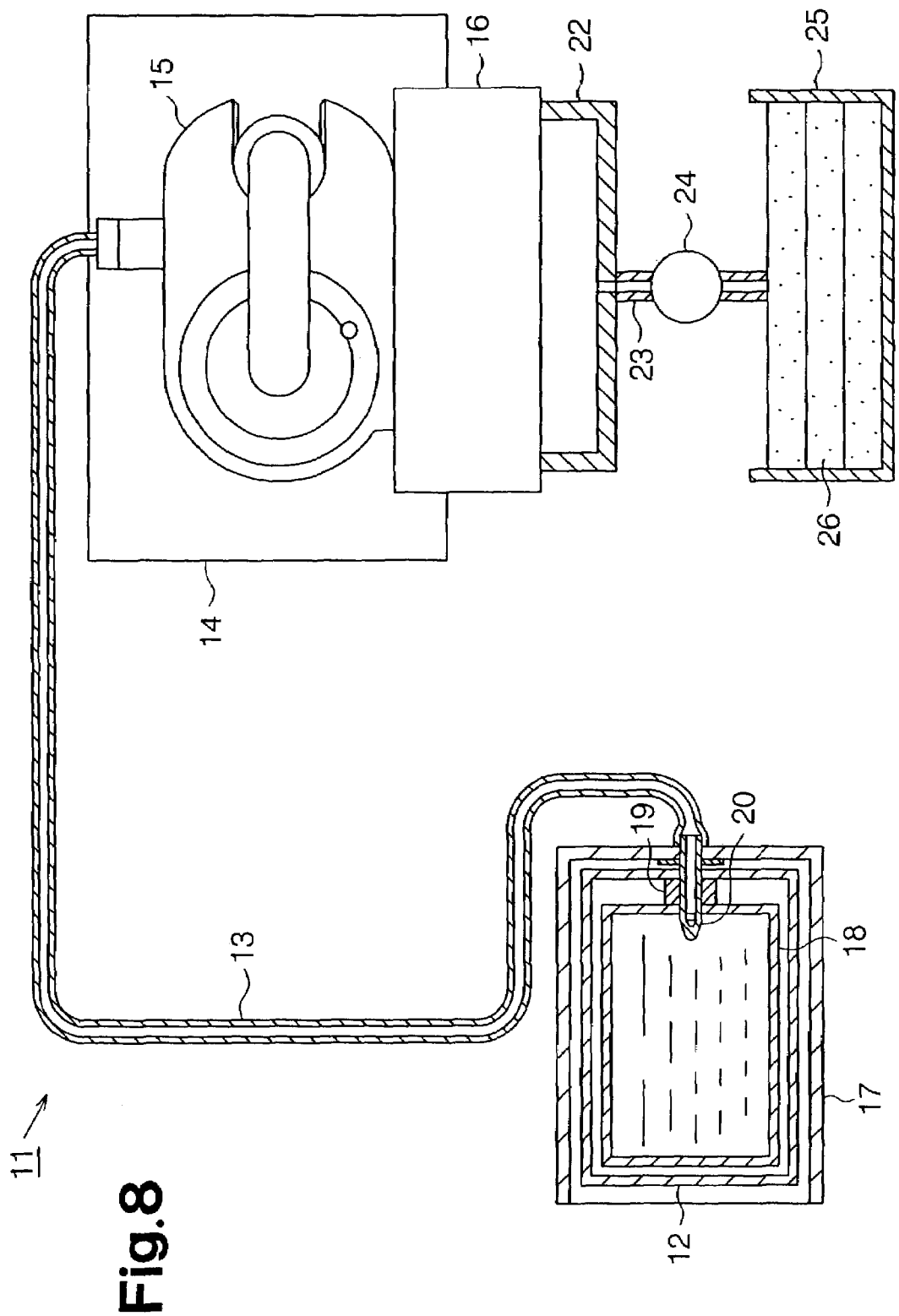
FIG. 8 is a schematic view showing an inkjet printer according to a fifth embodiment.
Figure 9A:
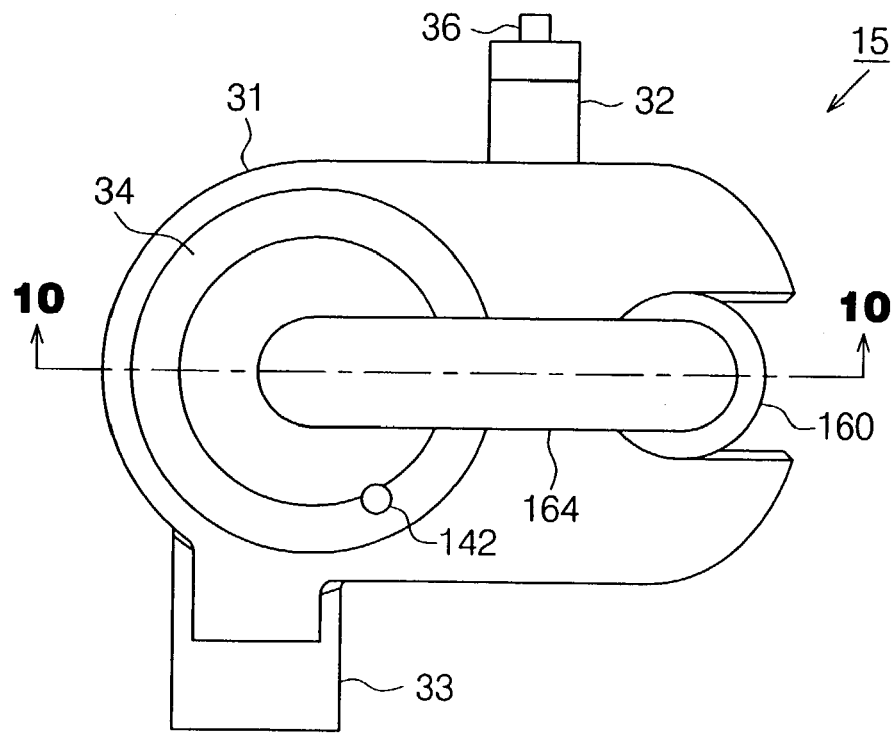
FIG. 9(a) is a front view showing a pressure damper according to the fifth embodiment.
Figure 9B:
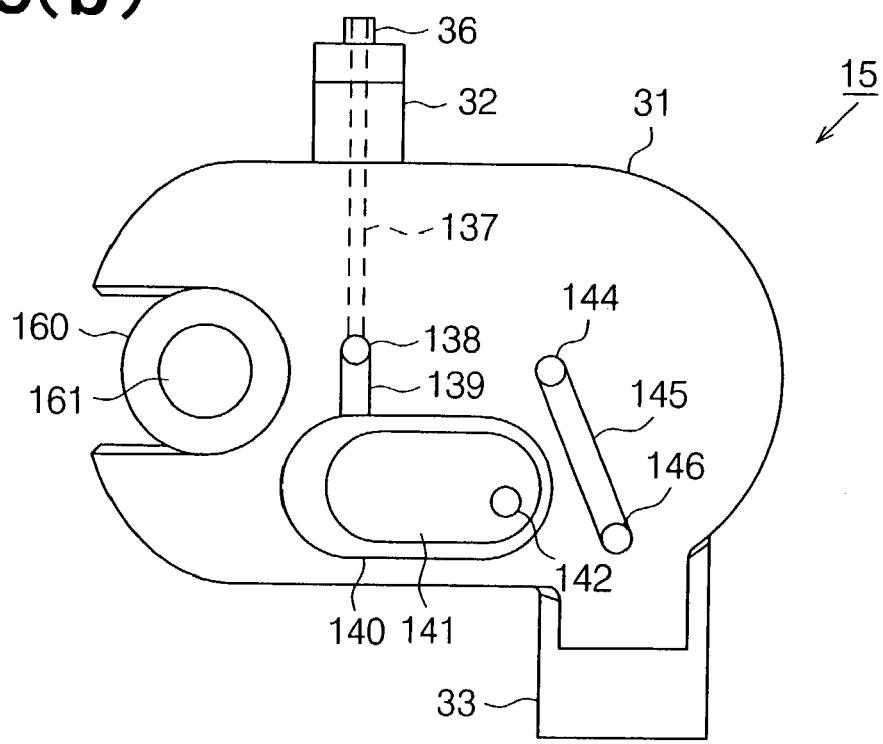
FIG. 9(b) is a rear view showing the pressure damper according to the fifth embodiment.

A pressure damper 91 according to a fourth embodiment of the present invention will now be described with reference to FIG. 7. The fourth embodiment is different from the first embodiment in the structure of the support member. Thus, like or the same reference numerals are given to those components that are like or the same as the corresponding components of the first embodiment.

The pressure damper 91 of the fourth embodiment has the support member 92. The distal portion 54 and the distal portion 93 are both held by the passage forming portion 31 and the film 50. When the electromagnet 60 is excited and the attraction section 55 of the support member 92 is drawn, the entire support member 92 is elastically deformed, and the valve member 57 closes the small hole 44.

In addition to the advantages (1) to (9), and (11) of the first embodiment, the fourth embodiment provides the following advantage.

(13) Since the support member 92 is supported by the passage forming portion 31 at both ends, the valve member 57 is stably supported.

The coil spring 74 of the second embodiment may be added to the fourth embodiment. The projection 84 of the third embodiment may be added to the fourth embodiment.

The coil spring 74 and the projection 84 may be added to the fourth embodiment. This structure further improves the sealing property of the ink passage.

The first to fourth embodiments may be modified as follows.

In the first to fourth embodiments, the ink passage is closed when the valve member activates the electromagnet 60, and is opened when the valve member does not activate the electromagnet 60. To the contrary, the configuration may be changed such that the ink passage is opened when the valve member activates the electromagnet 60, and is closed when the valve member does not activate the electromagnet 60. To achieve this configuration, the lengths of the first and second magnetic members 64, 65 are reversed, and the attraction section 55 is bent toward the first magnetic member 64. Also, the support member must be configured such that the valve member closes the small hole 44 when the electromagnet 60 is not excited.

In the above embodiments, the present invention is applied to inkjet printers. However, the present invention may be applied to other types of valve devices. Also, the present invention may be applied to devices that uses fluids other than ink.

A valve device according to a fifth embodiment of the present invention will be described with reference to FIGS. 8 to 11. The valve device is used in a pressure damper 15 of an inkjet type recording apparatus. Mainly, the difference form the embodiment of FIG. 1 will be discussed below.

The pressure damper 15 includes a passage forming portion 31, an ink inlet 32, and a needle coupler 33. The passage forming portion 31 is formed of a resin material such as polypropylene or polyethylene. An ink chamber 34 is defined in the passage forming portion 31. The ink chamber 34 is formed such that the diameter decreases from the opening to the bottom. The inner circumferential wall of the ink chamber 34 is tapered.

The ink inlet 32 has a connector portion 36 to which the ink supply tube 13 is connected. The connector portion 36 is communicated with a first ink passage 137. The first ink passage 137 is communicated with an annular filter passage 140 through a second ink passage 138 and a third ink passage 139. A filter 141 is located in the vicinity of the filter passage 140. The filter 41 traps foreign matter in ink. The filter 141 is communicated with the ink chamber 34 through a fourth ink passage 142. A small hole 144 is formed substantially in the center of the ink chamber 34. The small hole 144 is communicated with the ink chamber 34. The small hole 144 is communicated with the needle coupler 33 through a fifth ink passage 145 and a sixth ink passage 146.

The needle coupler 33 is formed to receive an ink supply needle (not shown) provided in the recording head 16. Therefore, the first ink passage 137, the second ink passage 138, the third ink passage 139, the filter passage 140, the ink chamber 34, the small hole 144, the fifth ink passage 145, and the sixth ink passage 146 form a continuous ink passage in the pressure damper 15. Ink enters the continuous ink passage from the ink supply tube 13 through the first ink passage 137 and is supplied to the recording head 16 from the sixth ink passage 146. In this embodiment, a part of the continuous ink passage including the first ink passage 137, the second ink passage 138, the third ink passage 139, the filter passage 140, and fourth ink passage 142 is referred to as an upstream section of the pressure damper 15, which function as the valve device.

Films 150, 151 are attached to the rear surface and the front surface of the pressure damper 15, respectively. The films 150, 151 are not illustrated in FIGS. 9(a) and 9(b). The characteristic properties of the films 150, 151 are the same as those of the first embodiment.

Figure 10:
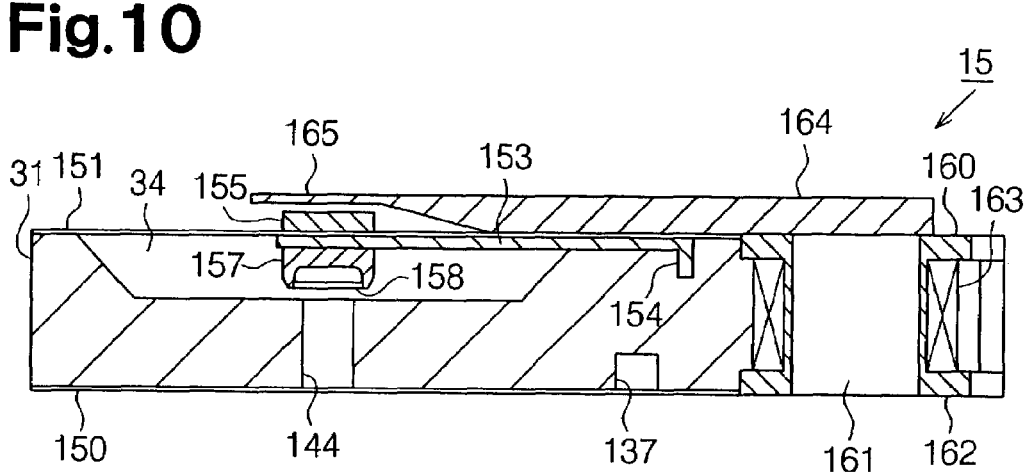
FIG. 10 is a cross-sectional view, with a part cut away, taken along line 10-10 of FIG. 9(a)
Figure 11:
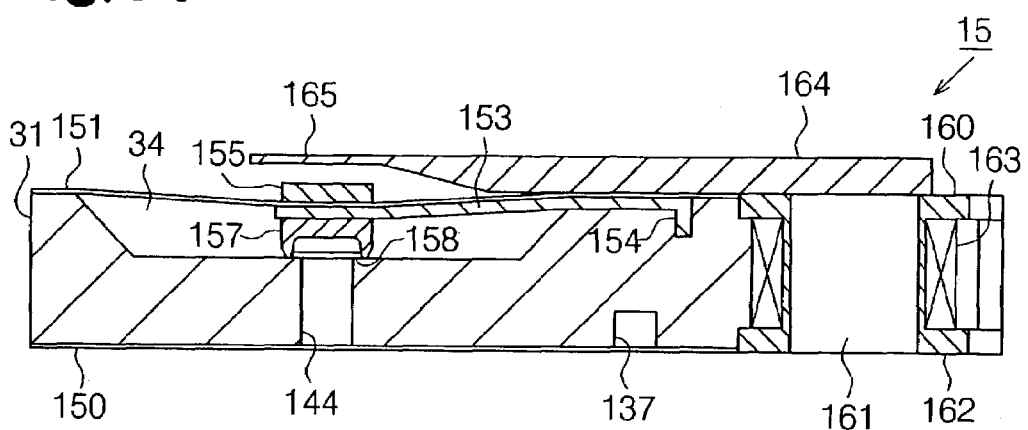
FIG. 11 is a cross-sectional view, with a part cut away, taken along line 10-10 of FIG. 9(a)

A support member 153 and a valve member 157 are located in the ink chamber 34, which forms the ink passage. The support member 153 comprises an elastic body, or a leaf spring, and is made of a non-magnetic material. The support member 153 and the film 151 are adhered to each other. A proximal section 154 of the support member 153 is held by the passage forming portion 31 and the film 151 at the front surface of the passage forming portion 31. The proximal section 154 function as a fulcrum of the support member 153. The valve member 157 is fixed to a distal portion of the support member 153. The valve member 157 is arranged to close the small hole 144 as shown in FIG. 11 when the support member 153 is displaced. In FIGS. 10 and 11, a permanent magnet 155 is located above the valve member 157 with the support member 153 and the film 151 in between. In this embodiment, the distance from the proximal section 154 to the permanent magnet 155 is equal to the distance from the proximal section 154 to the valve member 157.

An annular projection 158 is formed at the distal end of the valve member 157. The projection 158 contacts the passage forming portion 31 at an area surrounding the small hole 144, thereby closing the small hole 144, which is a passage. The valve member 157 is formed of the same elastic material as that of the first embodiment.

An electromagnet 160 is located outside of the passage forming portion 31, or outside the ink passage. As in the first embodiment, the electromagnet 160 includes an iron core 161, a frame 162, an excitation coil 163, and a magnetic member 164. A distal portion 165 of the magnetic member 164 is formed thin and covers the permanent magnet 155. The magnetic member 164 and the passage forming portion 31 hold part of the film 151 and the support member 153.

An operation of the pressure damper 15 will now be described.

When the electromagnet 160 is not excited, the valve member 157 is away from the small hole 144 as shown in FIG. 10 and opens the ink passage. When the electromagnet 160 is excited, the magnetic member 164 is also excited. The polarities of facing portions of the electromagnet 160 and the permanent magnet 155 are the same and repel each other. As a result, as shown in FIG. 10, the film 151 and the support member 153 are elastically deformed and are drawn downward as viewed in FIG. 10. Accordingly, the projection 158 of the valve member 157 contacts a part of the passage forming portion 31 about the small hole 144, thereby closing the ink passage. When the electromagnet 160 is de-excited, the film 151 and the support member 153 are returned to the state of FIGS. 9(a) and 9(b) by the own elasticity, which opens the ink passage.

The pressure damper 15 according to the fifth embodiment has the following advantages.

(1) In the fifth embodiment, the electromagnet 160, the magnetic member 164, and the permanent magnet 155 form a magnetic circuit. When the electromagnet 160 is excited, the permanent magnet 155 repels, which causes the valve body 157 to close the passage. Therefore, a great driving force is generated by activating the permanent magnet 155 and the electromagnet 160.

(2) In the fifth embodiment, since the electromagnet 160 does not need to be located in the vicinity of the valve member 157, there is no need to wind an excitation coil directly about the ink passage to form an electromagnet. Since the electromagnet 160 is located outside of the passage, no electromagnet needs to be located in the passage. Accordingly, the pressure damper 15 having a simplified structure and a reduced size is obtained.

(3) In the fifth embodiment, the permanent magnet 155 and the support member 153 are adhered to the film 151. The permanent magnet 155 and the support member 153 are moved together with the film 151. Therefore, when the permanent magnet 155 is displaced due to magnetic force generated by the magnetic member 164, the support member 153, the film 151 are moved together.

(4) In the fifth embodiment, the support member 153 comprises a leaf spring, which is an elastic material. Therefore, when the electromagnet 160 is deactivated, the support member 153 is urged in a direction to open the passage. Thus, the support member 153 is elastically deformed to open and close the passage. Also, since the support member 153 is made of an elastic material, an additional elastic member is not needed when the support member 153 is drawn.

(5) In the fifth embodiment, the valve member 157 is made of an elastic material. Therefore, the valve member 157 reliably contacts the passage forming portion 31 about the hole 144, which improves the sealing property of the valve member 157, which seals the passage.

(6) In the fifth embodiment, the films 150, 151 are heat welded to the passage forming portion 31. Therefore, the passage is sealed with a simple structure. Also, since the films 150, 151 are made of a material having a high gas barrier property, the films 50, 51 reliably prevent gas from entering the passage.

(7) In the fifth embodiment, the filter 141 is provided. This prevents foreign matter from entering the valve device and permits the valve member 157 to reliably open and close.

(8) In the fifth embodiment, the annular projection 158 formed of the valve member 157 contacts the passage forming member, which improves sealing property of the valve member that seals the passage.

(9) In the fifth embodiment, the pressure damper 15 is located upstream of the recording head 16 of the inkjet printer 11. Therefore, during cleaning to discharge bubbles from the filter of the recording head, the valve device is effectively used.

(10) In the fifth embodiment, the valve device is used for the choke cleaning or the selective cleaning of the inkjet printer 11. Therefore, in the choke cleaning, in which suction is applied through the recording head with the valve device closed to open a valve with a high vacuum, or in the selective cleaning in which the nozzle of the necessary colors are cleaned, the valve device is effectively used.

The fifth embodiment may be modified as follows.

Figure 12:
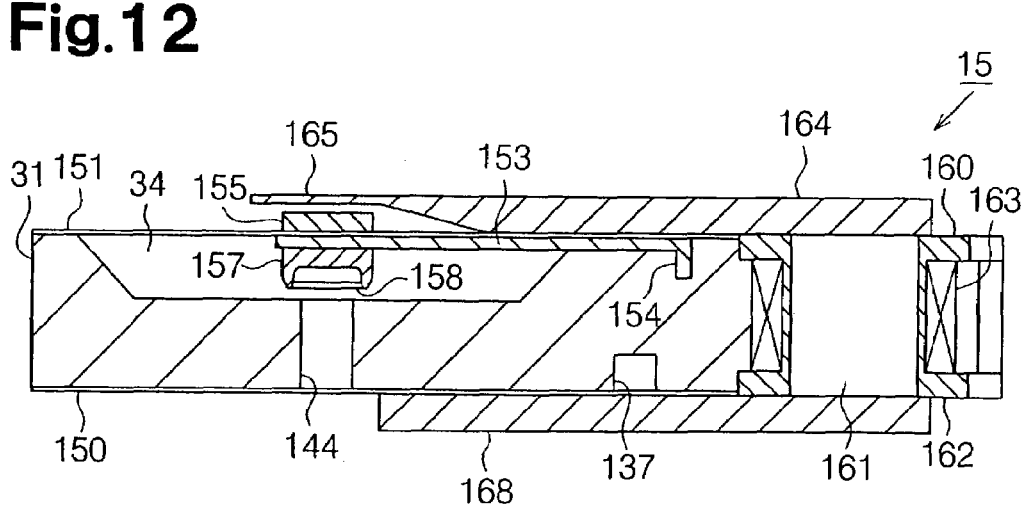
FIG. 12 is a cross-sectional view, with a part cut away, illustrating a pressure damper according to another embodiment.

The fifth embodiment may be modified as shown in FIG. 12. That is, a second magnetic member 168 may be provided on the electromagnet 160 to face the magnetic member 164. In this case, the electromagnet 160 forms a stable magnetic circuit through the magnetic members 164, 168 and the permanent magnet 155.

In the fifth embodiment, the support member 153 may be omitted. That is, the permanent magnet 155 and the valve member 157 may be directly adhered to the film 151. In this case, a durable material is preferably used for the film 151.

In the fifth embodiment, the distance from the proximal section 154 to the permanent magnet 155 may be shorter than the distance from the proximal section 154 to the valve member 157.

Figure 13A:
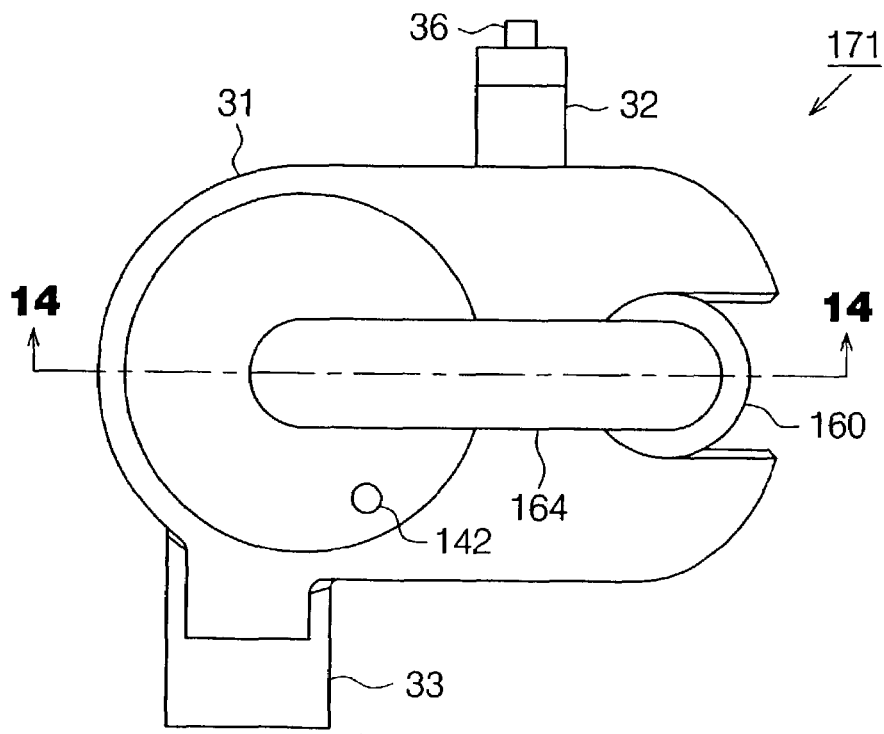
FIG. 13(a) is a front view showing a pressure damper according to a sixth embodiment.
Figure 13B:
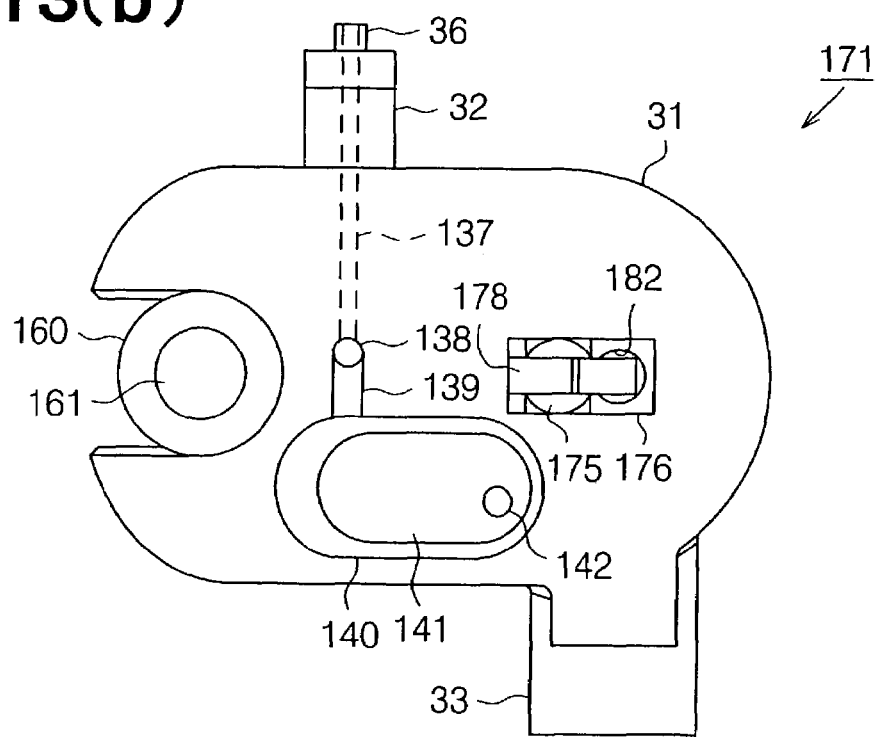
FIG. 13(b) is a rear view showing the pressure damper according to the sixth embodiment.

A pressure damper 171 according to a sixth embodiment of the present invention will now be described with reference to FIGS. 13(*a*) to 15. Like or the same reference numerals are given to those components that are like or the same as the corresponding components of the fifth embodiment.

Although, the basic shape of the pressure damper 171 is the same as that of the pressure damper 15, the pressure damper 171 is different form the pressure damper 15 in the following points. For example, an ink chamber 173 has a constant inner diameter. A seventh ink passage 176 and an eighth ink passage 182 are communicated with the ink chamber 173. A needle coupler 33 is connected to the recording head 16 through the seventh and eighth ink passages 176 and 182. The shape of the support member 177 is also different. The support member 177 is bent perpendicularly in the vicinity of the distal portion 165 of the magnetic member 164. The support member 177 is further bent perpendicularly at the bottom of the pressure damper 171, which forms a base 178. The valve member 179 and the projection 180 are oriented upward as viewed in FIG. 14 and close the eighth ink passage 182. A permanent magnet 175 is located at the same position as the permanent magnet 155 of the fifth embodiment. However, the permanent magnet 175 is thinner than the permanent magnet 155.

An operation of the pressure damper 171 will now be described.

Figure 14:
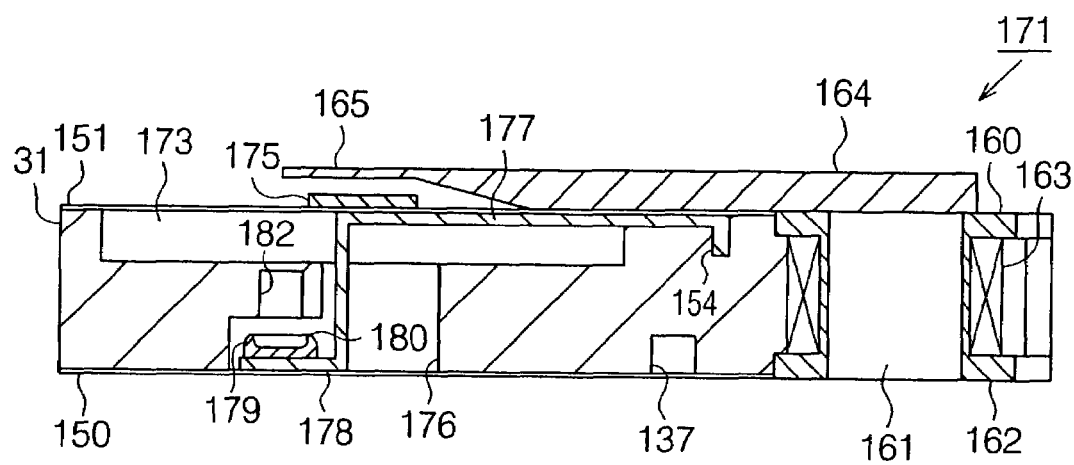
FIG. 14 is a cross-sectional view, with a part cut away, taken along line 14-14 of FIG. 13(a)
Figure 15:
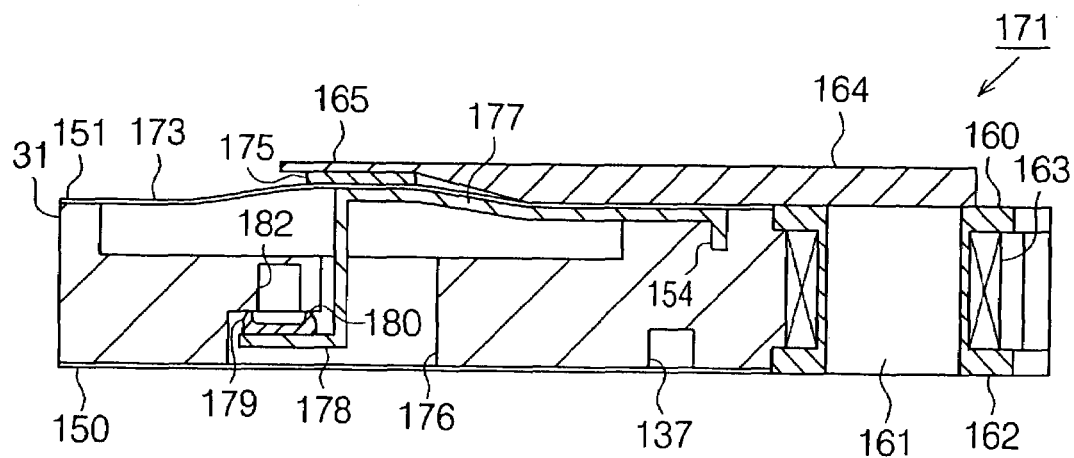
FIG. 15 is a cross-sectional view, with a part cut away, taken along line 14-14 of FIG. 13(a), showing an operating state of the pressure damper.

When the electromagnet 160 is not excited, the valve member 179 is away from the eighth ink passage 182 as shown in FIG. 14 and opens the ink passage. When the electromagnet 160 is excited, the magnetic member 164 is also excited. The polarities of the facing portions of the electromagnet 160 and the permanent magnet 175 are opposite and attract each other. As a result, as shown in FIG. 15, the film 151 and the support member 153 are elastically deformed and are drawn upward as viewed in FIG. 15. Accordingly, the projection 180 of the valve member 179 contacts an area about the eighth ink passage 182, thereby closing the ink passage. When the electromagnet 160 is de-excited, the film 151 and the support member 153 are returned to the state of FIG. 14, which opens the ink passage.

In addition to the advantages (1) to (10) of the fifth embodiment, the sixth embodiment provides the following advantage.

(11) In the sixth embodiment, the valve is opened and closed at the eighth ink passage 182. The eighth ink passage 182 is located substantially at the center of the pressure damper 171 and is formed in a confined space. However, the pressure damper 171 of the above described structure reliably opens and closes the valve.

A valve device according to a seventh embodiment of the present invention will be described with reference to FIGS. 16 to 17(*b*). The valve device is used in an inkjet type recording apparatus.

Figure 16:
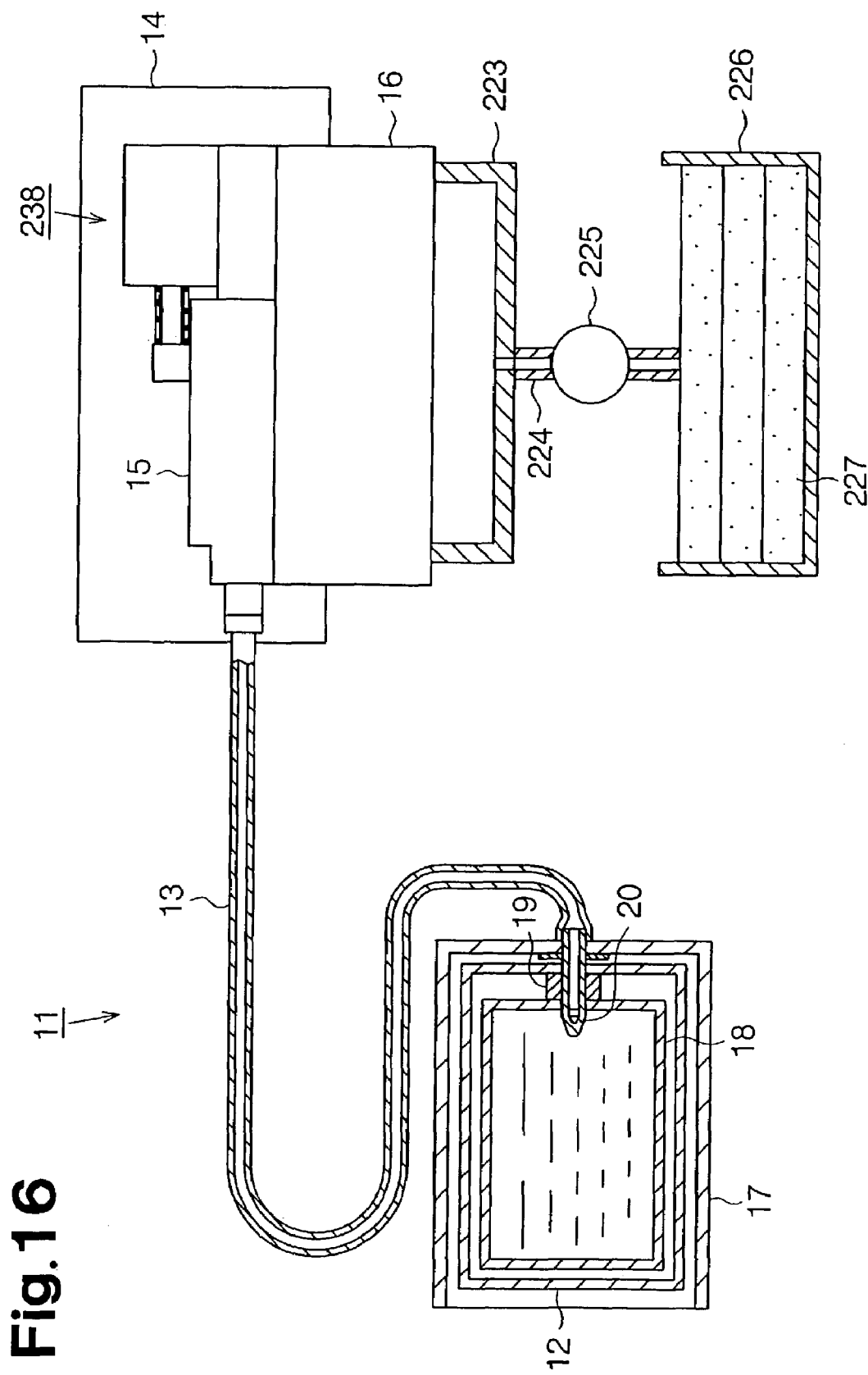
FIG. 16 is a schematic view showing an inkjet printer according to a seventh embodiment.

FIG. 16 is a schematic diagram showing the inkjet type recording apparatus, which is an inkjet printer 11. As shown in FIG. 16, the inkjet printer 11 supplies ink from an ink cartridge 12 to a recording head 16 through an ink supply tube 13 and the pressure damper 15, which is mounted on a carriage 14. The recording head 16 has a nozzle opening to inject ink droplets. The recording head 16 discharges ink droplets onto a print medium such as a sheet of recording paper, thereby recording print data such as images and characters. The inkjet printer 11 is capable of printing on a large format target such as an A0 sized sheet of paper. The inkjet printer 11 therefore consumes a great amount of ink and thus needs to store a great amount of ink. Therefore, if the ink cartridge 12 storing a great amount of ink is mounted on the carriage 14, the weight of the carriage 14 is increased, which adds an excessive load to a motor for driving the carriage. The inkjet printer 11 thus has a configuration in which the ink cartridge 12 is not mounted on the carriage 14.

A cap 223 is located at the lower side of the recording head 16 as viewed in FIG. 16. The cap 223 has a closed end and its upper opening caps the recording head 16. The cap 223 is at a non-printing area of the inkjet printer 11. When the recording head 16 is not printing, the cap 22 covers the nozzle opening of the recording head 16, thereby preventing evaporation of moisture. The cap 22 also applies suction to the recording head 16 to clean the recording head 16. The bottom of the cap 223 is communicated with a suction tube 224. A suction pump 225 is provided on the suction tube 224. The suction pump 225 forcibly draws ink from the recording head 16 toward the cap 223. Ink drawn by the suction pump 225 is collected in a liquid waste collecting box 226. A liquid waste absorbent 227 is accommodated in the waste fluid collecting box 226 to store collected ink.

Although the structure illustrated in FIG. 16 only corresponds to ink of one color, the inkjet printer 11 is configured to print in a plurality of inks such as cyan, magenta, yellow, and black. Therefore, the ink cartridge 12, the ink supply tube 13, the pressure damper 15, and the recording head 16 are each provided for each of the ink colors.

The pressure damper 15 will now be described with reference to FIGS. 17(*a*) and 17(*b*).

The pressure damper 15 has a passage forming member 228. The passage forming member 228 is formed of a resin material such as polypropylene or polyethylene. An ink passage is formed in the passage forming member 228. The ink passage includes a first ink passage 229, an ink chamber 231, a small hole 241, and a second ink passage 232. The distal end of the first ink passage 229 is connected to the ink supply tube 13. The other end of the first ink passage 229 is communicated with the ink chamber 231. The ink chamber 231 has a closed end and has an opening that opens upward. The small hole 241 is formed in the bottom of the ink chamber 231. The ink chamber 231 is communicated with the second ink passage 232 through the small hole 241. Ink from the ink supply tube 13 enters the ink chamber 231 through first ink passage 229. The ink then passes the small hole 241 and enters the second ink passage 232 and is supplied to the recording head 16.

A film 230 is provided on the upper surface of the passage forming member 228. The characteristic properties of the film 230 are the same as those of the first embodiment.

An operational member 233 and a valve member 234 are located in the ink chamber 231, which forms the ink passage. The operational member 233 is formed of a leaf spring made of magnetic and elastic material. For example, the support member 53 is mad of a material such as SUS420J2 and SUS631. A proximal section 235 of the operational member 233 is held by the passage forming member 228 and the film 230 at the upper surface of the passage forming member 228. The proximal section 235 function as a fulcrum of the operational member 233. The distal end of the operational member 233 is bent substantially perpendicularly.

Figure 17A:
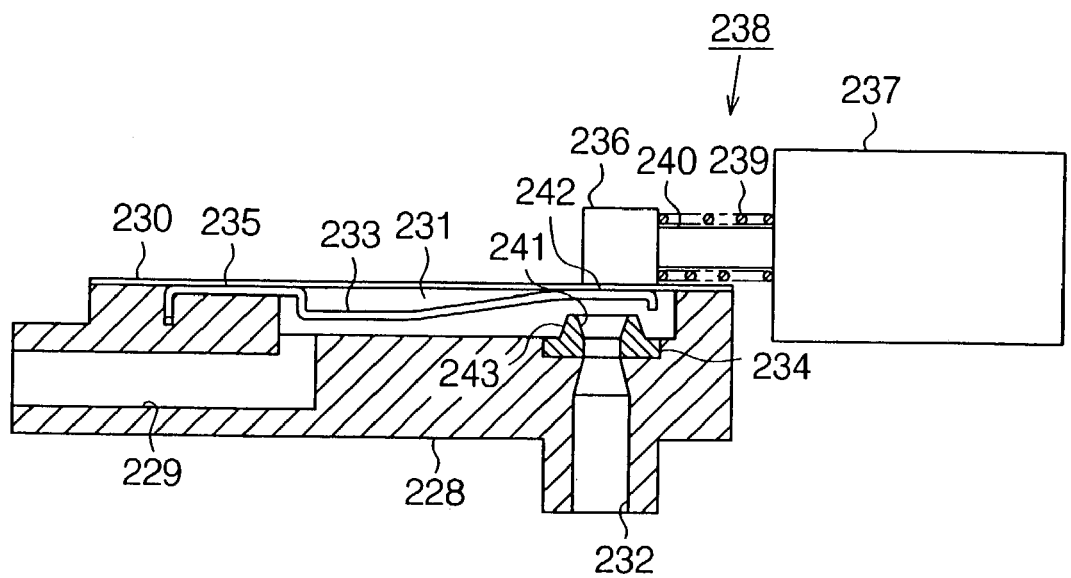
FIG. 17(a) is a cross-sectional view, with the part cut away, illustrating a pressure damper according to the seventh embodiment when no current is supplied to the electromagnet.
Figure 17B:
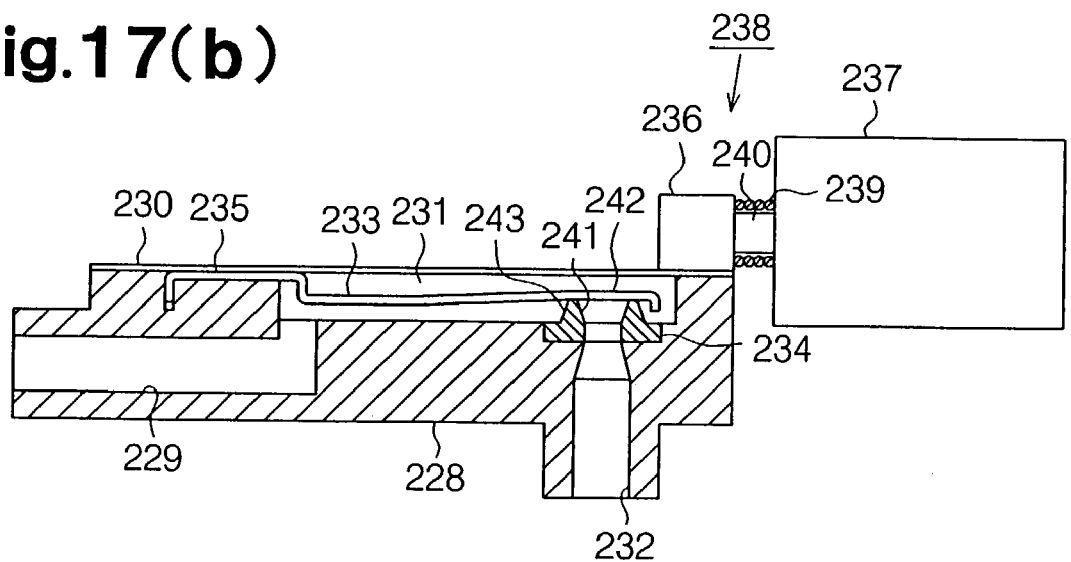
FIG. 17(b) is a cross-sectional view, with a part cut away, illustrating the pressure damper according to the seventh embodiment when current is supplied to the electromagnet.

A valve member 234 is located below the distal portion of the operational member 233 as viewed in FIGS. 17(*a*) and 17(*b*). The valve member 234 is located on the bottom of the ink chamber 231 and on the small hole 241. When the operational member 233 is not attracted by a permanent magnet 236, the operational member 233 closes the small hole 241 as shown in FIG. 17(b). When the operational member 233 is attracted by the permanent magnet 236, an attraction section 242 of the operational member 233 is attracted, and the operational member 233 separates from the valve member 234. The position of the permanent magnet 236 in FIG. 17(a) is referred to as an attraction position. The permanent magnet 236 is movable between the attraction position shown in FIG. 17(a) and a standby position shown in FIG. 17(b).

An annular projection 243 is formed at the distal end of the valve member 234. The projection 243 contacts the operational member 233, thereby closing the small hole 241, which is a passage. The valve member 234 is formed of an elastic material. A part of the upper surface of the projection 243 that contacts the operational member 233 is formed flat. The projection 243 is made of, for example, a fluorine rubber, a silicon rubber, a butyl rubber, an elastomer, a CR rubber, an NBR rubber, or a urethane rubber. When pressed by the operational member 233, the valve member 234 is elastically deformed.

A solenoid 238 is located outside of the passage forming member 228 and above the film 230. The solenoid 238 functions as magnet moving means. The solenoid 238 includes an electromagnet 237, a coil spring 239, and a plunger 240. The electromagnet 237 includes a frame (not shown). The frame is machined to form a cylinder. The frame is made of resin such as polybutylene terephthalate. The excitation coil is wound about the frame. The excitation coil is made of a copper wire and coated with an insulating coating layer of polyethylene and urethane. The excitation coil is electrically connected to a valve device driving circuit with a lead wire (neither is shown).

A returning spring, which is a coil spring 239, is wound about the plunger 240. When the electromagnet 237 is excited, the plunger 240 enters the electromagnet 237, which contracts the coil spring 239. When the electromagnet 237 is not excited, the plunger 240 protrudes from the electromagnet 237, which expands the coil spring 239. A permanent magnet 236 is provided at the distal end of the plunger 240. When the electromagnet 237 is not excited, the permanent magnet 236 is held at the attraction position by the force of the coil spring 239 and attracts the operational member 233.

An operation of the pressure damper 15 will now be described.

When the electromagnet 237 is not supplied with current and is therefore not excited, the permanent magnet. 236 is located at the attraction position as shown in FIG. 17(a) and attracts the operational member 233. At the attraction position, the permanent magnet 236 attracts the attraction section 242 of the operational member 233. Then, the operational member 233 is elastically deformed by the magnetic attraction force of the permanent magnet 236 and separates from the valve member 234, thereby opening the ink passage. When current is supplied to the electromagnet 237, the plunger 240 is attracted to the electromagnet 237 as shown in FIG. 2(b), which contracts the coil spring 239. Also, the permanent magnet 236 is displaced from the attraction position. At the same time as the permanent magnet 236 is separated from the attraction position, the operational member 233 returns to a normal shape by the own restoring force and presses the valve member 234. The passage is closed accordingly. When the electromagnet 237 is de-excited, the force of the coil spring 239 returns the permanent magnet 236 to the attraction position, which opens the passage.

The above described operation of the pressure damper 15 is suitable for cleaning the recording head 16 by drawing ink. In the inkjet printer 11, a suction cleaning is performed as a maintenance of the recording head 16. In the pressure damper 15, the choke cleaning is executed by opening and closing the ink passage with the valve member 234.

The operation of the pressure damper 15 is suitable for cleaning one of a plurality of recording heads 16, or for executing the selective cleaning.

The pressure damper 15 according to the seventh embodiment has the following advantages.

(1) In the seventh embodiment, when the permanent magnet 236 is brought to the attraction position by the solenoid 238, the operation al member 233 is attracted by the permanent magnet 236. This separates the operational member 233 from the valve member 234, which opens the passage. When the permanent magnet 236 is moved away from the attraction position by the solenoid 238, the operational member 233 is returned to the non-deformed state and contacts the valve member 234, which closes the passage. Since the operational member 233 is formed of a magnetic material, the valve member 234 does not need to be formed of magnetic material. That is, the valve member 234 may be made of any material. This adds to the flexibility of design of the valve device.

(2) In the seventh embodiment, the permanent magnet 236 attracts the operational member 233 at the attraction position. Therefore, the operational member 233 is attracted while constantly receiving magnetic force. Compared to a case where an electromagnet is used to attract the operational member 233 at the attraction position, no member to be excited is required in the seventh embodiment. Therefore, a valve device having a simplified structure is obtained. Further, since the permanent magnet 236 is located outside of the passage forming member 228, the permanent magnet 236 does not need to have ink resistance.

(3) In the seventh embodiment, the operational member 233 is a leaf spring. Therefore, when the operational member 233 is attracted by the permanent magnet 236, the operational member 233 is elastically deformed and separated from the valve member 234, which opens the passage. When the operational member 233 is not attracted, the operational member 233 is returned to the original shape and contacts the valve member 234, which closes the passage. Therefore, no member needs to be located between the operational member 233 and the valve member 234. Also, when the passage is closed, the flat portion of the operational member 233 and the valve member 234 contact each other to reliably close the passage.

(4) In the seventh embodiment, the operational member 233 is fixed to the passage forming member 228 at the proximal section 235. Therefore, the operational member 233 is elastically deformed with the proximal section 235 being a fulcrum. Also, since the proximal section 235 is fixed to the passage forming member 228, the operational member 233 opens and closes the passage while being firmly fixed.

(5) In the seventh embodiment, the film 230 is heat welded to the passage forming member 228 to seal the passage. Therefore, the distance between the permanent magnet 236 and the operational member 233 is shortened. The attraction force of the operational member 233 is great even if a magnet having a relatively small magnetic force is used. After arranging the operational member 233 and the valve member 234 in the passage, the passage is sealed by the film member 230. This simplifies the structure for sealing the passage. Also, since the film 230 is made of a material having a high gas barrier property, the film 230 reliably prevents gas from entering the passage.

(6) In the seventh embodiment, the valve member 234 is made of an elastic material. Therefore, the valve member 234 is elastically deformed in accordance with the pressing force of the operational member 233. This reliably closes the passage. Since the projection 243 is formed on the valve member 234, the flat portion of the operational member 233 contacts the projection 243 of the valve member 234 to close the passage. The sealing property of the passage is therefore improved.

(7) In the seventh embodiment, the direction in which the permanent magnet 236 is moved by the solenoid 238 is substantially perpendicular to the direction in which the operational member 233 moves. Therefore, the solenoid 238 is located along a direction that is perpendicular to the direction in which the operational member 233 moves. This prevents the size of the valve device from being increased along the moving direction of the operational member 233.

(8) In the seventh embodiment, the solenoid 238 functions as the magnet moving means. When current is supplied to the solenoid 238, the passage is closed. Therefore, during the choke cleaning or the selective cleaning of the inkjet printer during which the valve member 234 is closed for a short period, the excitation time of the solenoid 238 is shortened. Therefore, the energy efficiency is improved.

(9) In the seventh embodiment, the valve device is located upstream of the recording head 16. Therefore, during the choke cleaning to discharge bubbles from the filter of the recording head 16, the valve device is effectively used. Also, the valve device is effectively used in the selective cleaning in which the nozzle of the necessary colors are cleaned.

A valve device according to an eighth embodiment of the present invention will now be described with reference to FIGS. 18(a) and 18(b). The eighth embodiment is different from the seventh embodiment in the position of the solenoid 238. Thus, like or the same reference numerals are given to those components that are like or the same as the corresponding components of the third embodiment.

Figure 18A:
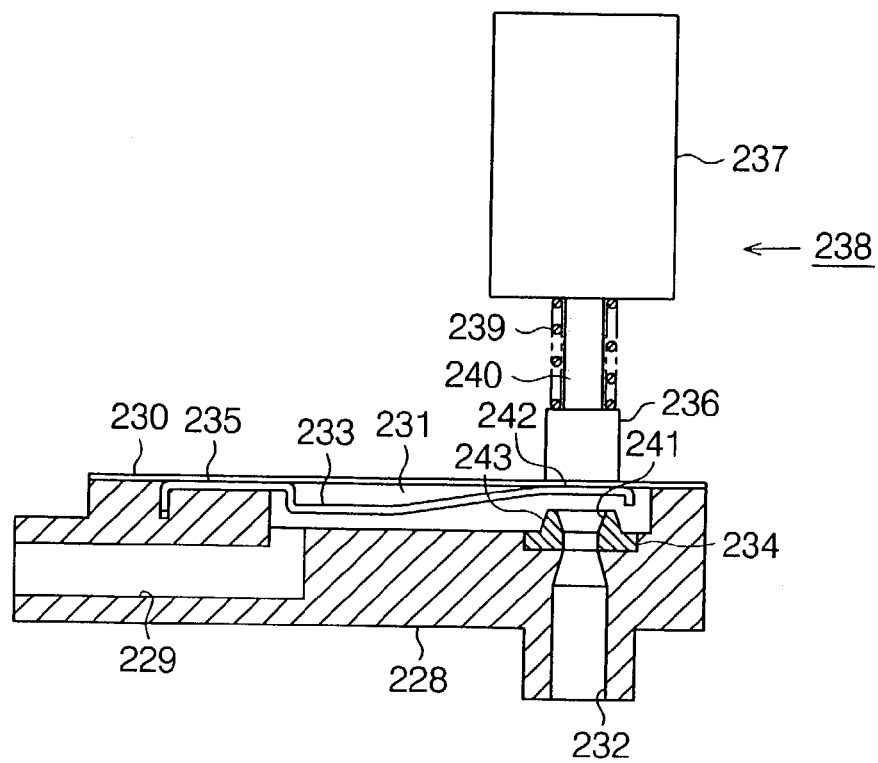
FIG. 18(a) is a cross-sectional view, with a part cut away, illustrating a pressure damper according to an eighth embodiment when no current is supplied to an electromagnet.
Figure 18B:
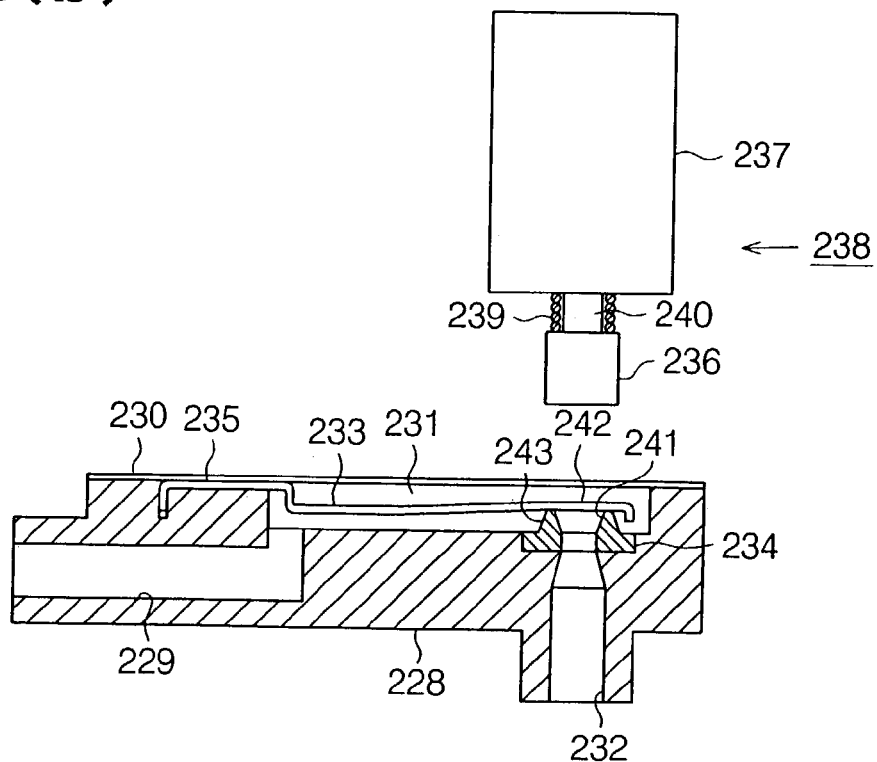
FIG. 18(b) is a cross-sectional view, with a part cut away, illustrating the pressure damper according to the eighth embodiment when current is supplied to an electromagnet.

As shown in FIG. 18(a), the solenoid 238 is located above the passage forming member 228 such that the moving direction of the operational member 233 is the same as the moving direction of the permanent magnet 236. When no current is supplied to the electromagnet 237, the permanent magnet 236 at the distal end of the plunger 240 is at the attraction position. Therefore, the attraction section 242 of the operational member 233, which is formed of a magnetic material, is attracted toward the film 230. This elastically deforms the operational member 233 so that the attraction section 242 is separated from the valve member 234 and the passage is opened. When current is supplied to the electromagnet, the plunger 240 is attracted toward the electromagnet 237 as shown in FIG. 18(b), which separates the permanent magnet 236 from the attraction position. Accordingly, the operational 233 returns to the initial shape by the own restoring force and contacts the valve member 234 to close the passage.

In addition to the advantages (1) to (6), (8), and (9) of the seventh embodiment, the eighth embodiment provides the following advantage.

(10) In the eighth embodiment, the direction in which the permanent magnet 236 is moved by the solenoid 238 is substantially the same as the direction in which the operational member 233 moves. This permits the solenoid 238 to be located in a direction that is substantially the same as the moving direction of the operational member 233, and thus prevents the size of the valve device from being increased in a direction that is substantially the same as the moving direction of the operational member 233.

A valve device according to a ninth embodiment of the present invention will now be described with reference to FIGS. 19(a) and 19(b).

The ninth embodiment is different from the seventh embodiment in the position of the film 230, the shape of the operational member 233, the position of the solenoid 238. Further differences are the states of the passage and the shape of the operational member 233 when current is supplied and when current is not supplied.

The pressure damper 15 will now be described with reference to FIGS. 19(a) and 19(b). The film 230 is heat welded to the lower surface of the passage forming member 228. On the other hand, no film is provided on the upper surface of the passage forming member 228. The operational member 233 and the valve member 234 are located in the ink chamber 231, which is formed in the passage forming member 228. The operational member 233 is a leaf spring made of a magnetic and elastic material. A proximal section 235 of the operational member 233 is held at an upper portion of the passage forming member 228. A substantially center portion of the operational member 233 is bent to form an attraction section 242. The attraction section 242 projects toward the film 230 (toward the bottom of the passage forming member 228).

A solenoid 238 is located outside of the passage forming member 228 and below the film 230 (below the first ink passage 229). A permanent magnet 236 is provided at the distal end of the plunger 240. When at an attraction position, the permanent magnet 236 attracts the operational member 233, which is made of a magnetic material.

An operation of the pressure damper 15 will now be described.

Figure 19A:
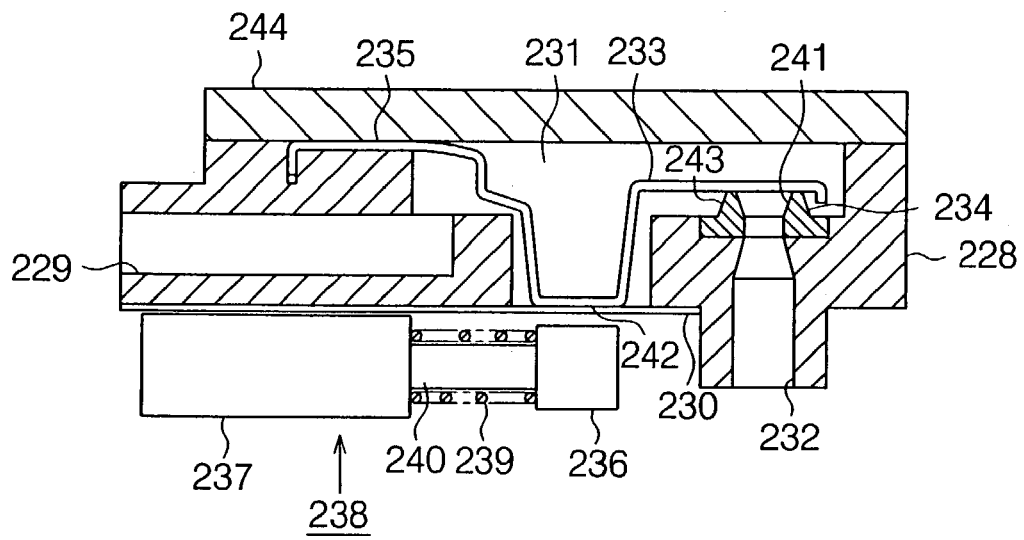
FIG. 19(a) is a cross-sectional view, with a part cut away, illustrating a pressure damper according to a ninth embodiment when no current is supplied to an electromagnet.
Figure 19B:
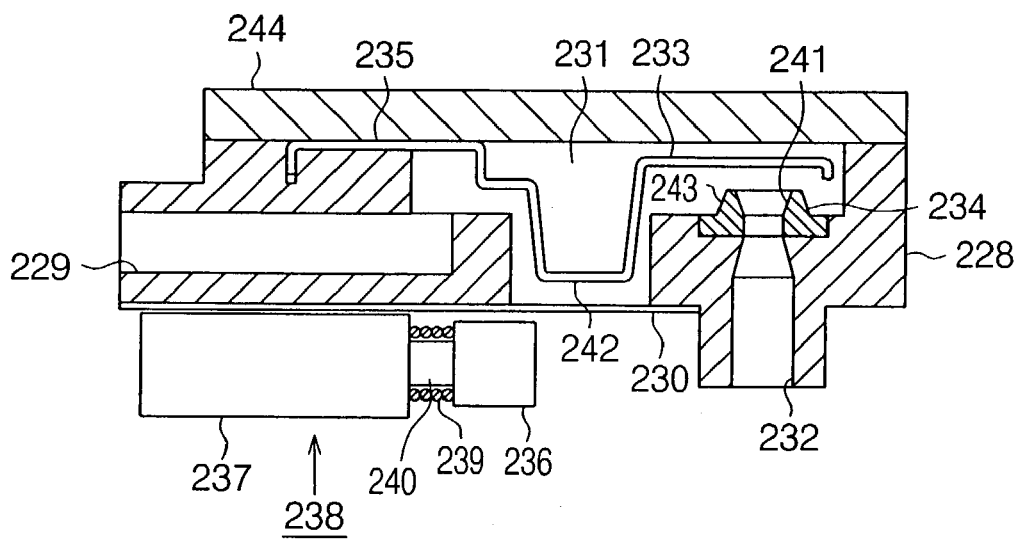
FIG. 19(b) is a cross-sectional view, with a part cut away, illustrating the pressure damper according to the ninth embodiment when current is supplied to the electromagnet.

When no current is supplied to the electromagnet 237, the permanent magnet 236 is located at the attraction position as shown in FIG. 19(a). The attraction section 242 of the operational member 233 is attracted by the permanent magnet 236 and elastically deformed. Accordingly, the attraction section 242 presses the valve member 234 to close the ink passage. When current is supplied to the electromagnet 237, the plunger 240 is attracted to the electromagnet 237 as shown in FIG. 19(b), which contracts the coil spring 239. Also, the permanent magnet 236 is displaced from the attraction position. Accordingly, the operational 233 returns to the prior shape by the own restoring force and separates from the valve member 234 to open the passage.

In addition to the advantages (1) to (7), and (9) of the seventh embodiment, the ninth embodiment provides the following advantage.

(11) In the ninth embodiment, the passage is opened when current is supplied to the electromagnet 237, and is closed when no current is supplied to the electromagnet 237. Therefore, even if the inkjet printer 11 falls sideways when the inkjet printer 11 is off and no current is being supplied to the solenoid 238, ink is prevented from leaking since the valve device is closed.

The seventh to ninth embodiments may be modified as follows.

In the seventh to ninth embodiments, the first ink passage 229 is connected to the ink supply tube 13, and the second ink passage 232 is connected to the recording head 16. To the contrary, the first ink passage 229 may be connected to the recording head 16, and the second ink passage 232 may be connected to the ink supply tube 13. In this case, ink from the ink supply tube 13 enters the ink chamber 231 through the second ink passage 232 and the small hole 241. The ink then passes the first ink passage 229 and is supplied to the recording head 16.

In the seventh to ninth embodiments, the pressure damper 15 is incorporated in the valve device. However, the pressure damper may be separated from the valve device and located upstream of or downstream of the valve device. If the valve device is located upstream of the pressure damper 15, the valve device may be located at an arbitrary position in the ink passage from the ink supply tube 13 to the ink cartridge 12.

In the seventh to ninth embodiments, the film 230 is located between the ink chamber 231 and the permanent magnet 236. However, the film 230 may be omitted. That is, if the permanent magnet 236 has a sufficient magnetic force to attract the operational member 233, the seventh to ninth embodiments have the same advantages listed above even if the film 230 is omitted.

In the seventh to ninth embodiments, the valve member 234 is shaped as illustrated in FIGS. 17(a) to 19(b). However, the shape of the valve member 234 may be changed. Also, the valve member 234 may be located at a distal portion of the operational member 233 to contact the small hole 241. Also an additional member may be located between the operational member 233 and the valve member 234 to improve the sealing property.

In the seventh to ninth embodiments, the operational member 233 is shaped as illustrated in FIGS. 2(a) to 4. However, the shape of the operational member 233 may be changed.

In the seventh to ninth embodiments, the permanent magnet 236 is located at the distal end of the plunger 240. However, the position of the permanent magnet 236 may be located other positions on the plunger 240.

In the ninth embodiment, the moving direction of the permanent magnet 236 is substantially perpendicular to the moving direction of the operational member 233. However, the solenoid 238 may be arranged such that these direction are substantially the same. That is, the permanent magnet 236 may be located directly below the attraction section 242, and the coil spring 239, the plunger 240, and the electromagnet 237 may be located below the permanent magnet 236.

In the ninth embodiment, the entire valve device is located on the carriage 14. However, the permanent magnet 236 and the solenoid 238 may be located at a position other than the carriage 14. For example, the permanent magnet 236 and the solenoid 238 may be located in a non-printing area, that is, at the cleaning position or the hole position. In this case, during cleaning or when the inkjet printer 11 is off, the carriage 14 is moved to a position corresponding to the permanent magnet 236 and the solenoid 238. This configuration decreases the number of the parts mounted on the carriage 14 and reduces the load on the carriage driving motor.

In the seventh to ninth embodiments, the inkjet printer 11 is capable of printing on a large format target such as an A0 sized sheet of paper. However, the seventh to ninth embodiments are applicable to inkjet printers that are capable of printing on targets other than A0 sized sheet of paper or on targets made of material other than paper.

In the seventh to ninth embodiments, the inkjet printer 11, in which the ink cartridge 12 is not mounted on the carriage 14, is used. However, the seventh to ninth embodiments are applicable to inkjet printers in which the ink cartridge 12 is mounted on the carriage 14.

A tenth embodiment of the present invention will now be described with reference to FIGS. 20 to 25.

Figure 21:
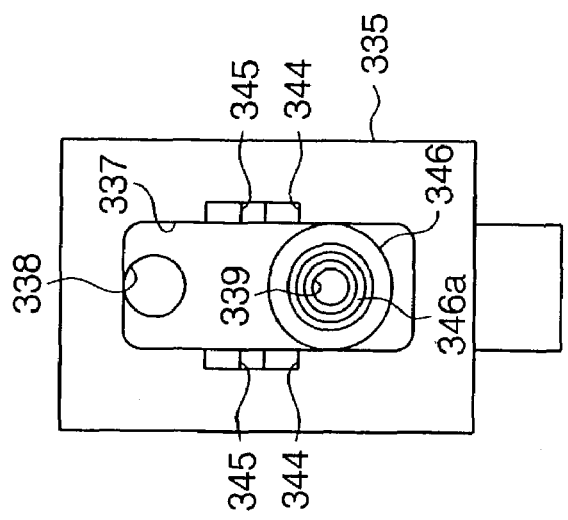
FIG. 21 is a side view illustrating a passage forming member.

A pressure damper 15 includes a passage housing 333 and a valve device 334. The passage housing 333 guides ink supplied from the ink supply tube 13 to the recording head 16. The valve device 334 opens and closes the passage in the passage housing 333. The passage housing 333 is fixed to the carriage 14 and includes a passage forming member 335 and a film 336. A passage is formed in the passage forming member 335. The passage forming member 335 is formed of a resin material such as polypropylene or polyethylene. An ink chamber 337 is formed in a side portion of the passage forming member 335. FIG. 21 is a side view of the passage forming member 335. As shown in FIG. 21, first and second circular ports 338, 339 are formed in an inner wall of the ink chamber 337 that lies perpendicular to a main scanning direction.

Figure 20:
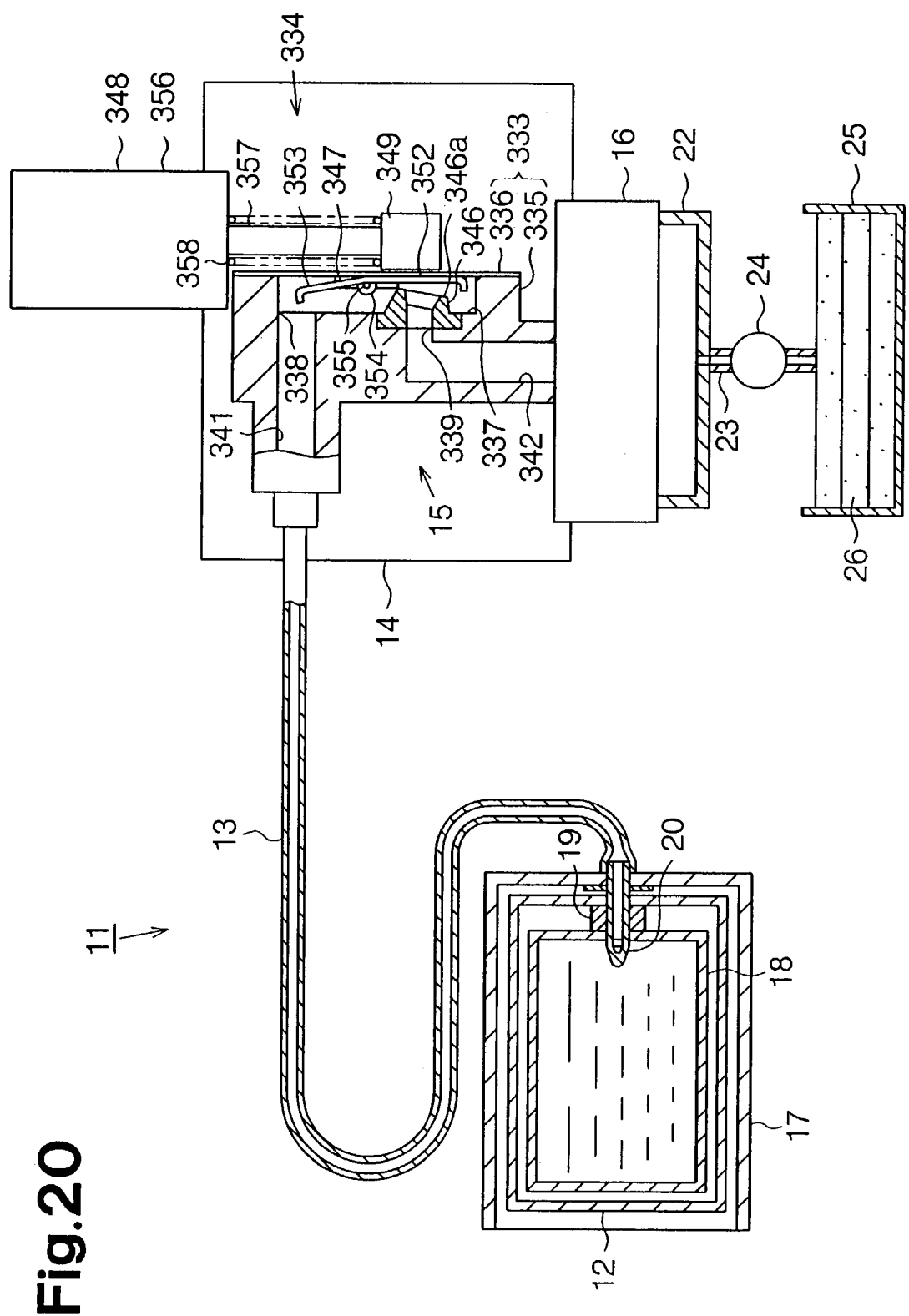
FIG. 20 is a schematic view showing an inkjet printer according to a tenth embodiment.

As shown in FIG. 20, a first port 338 is connected to a proximal portion of a first ink passage 341. A distal portion of the first ink passage 341 is connected to the ink supply tube 13. Thus, ink supplied from the ink supply tube 13 enters the ink chamber 337 through the first ink passage 341.

The second port 339 is connected to a second ink passage 342. The second ink passage is connected to the recording head 16. Therefore, ink in the ink chamber 337 is supplied to the recording head 16 through the second ink passage 342. The first ink passage 341, the ink chamber 337, and the second ink passage 342 form a passage of the passage housing 333.

Figure 22:
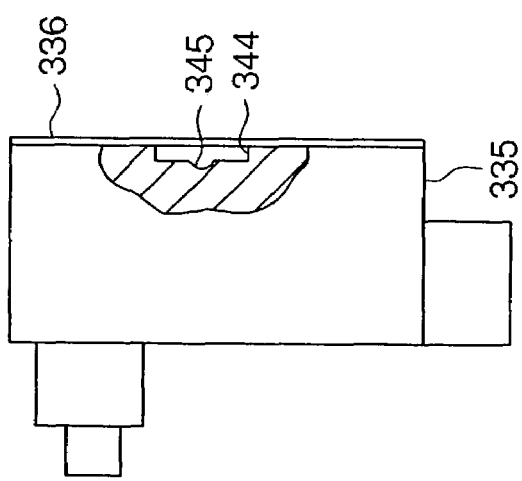
FIG. 22 is a partially cross-sectional view showing the passage forming member.
Figure 23:
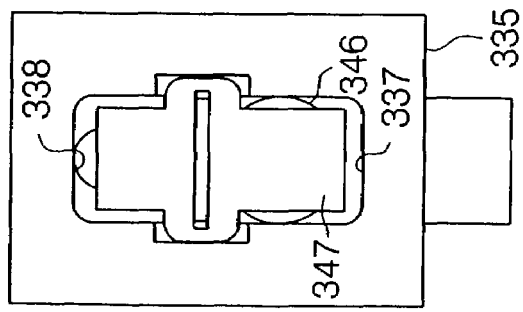
FIG. 23 is a partially exploded side view showing the passage forming member.

As shown in FIGS. 21 and 22, the passage forming member 335 has a shaft receiving portions 344 on both sides of the ink chamber 337. A semi-cylindrical shaft seat 345 is formed in each shaft receiving portion 344.

As shown in FIG. 20, a film 336 is heat welded to a side of the passage forming member 335 to seal the opening of the ink chamber 337 of the passage forming member 335. The film 336 contains the same material as the film of the first embodiment, and is deformed in directions decreasing and increasing the volume of the ink chamber. The compliance of the film 336 due to elastic deformation absorbs pressure fluctuations of ink in the ink chamber 337.

The valve device 334 includes a projection 346 functioning as a valve member, a plate-like operational member 347, a solenoid 348 functioning as a magnet moving mechanism, and a magnet 349. As shown in FIGS. 20 and 21, the projection 346 is formed on an inner wall of the ink chamber 337 that is perpendicular to the main scanning direction. The projection 346 surrounds the second port 339 of the ink chamber 337. An upper surface 346a of the projection 346 is slightly inclined such that the height of the projection 346 decreases toward the recording head 16. The inclination of the upper surface 346a is determined to seal the projection 346 by contacting the operational member 347 when an operational member 347, which will be discussed below, rotates. The projection 346 is formed of the same elastic material as in the first embodiment.

As shown in FIGS. 20 and 27, the operational member 347 is rotatably attached to the housing shaft seats 345 in the ink chamber 337. Specifically, the operational member 347 is formed of a magnetic material such as electromagnetic stainless steel. The operational member 347 is shaped to have a ridgeline functioning as axis section 351. The operational member 347 has the central axis section 351, a first side section 352 and a second side section 353. The first and second side sections 352, 353 are each formed in a plane that intersects the axis section 351 at a predetermined angle.

A rectangular opening 351a is formed in the center of the axis section 351. Also, a semi-cylindrical shaft socket 354. As shown in FIG. 20, the operational member 347 receives a support shaft 355 at the shaft socket 354 so that the operational member 347 and the support shaft 355 rotate relative to each other. The ends of the support shaft 355 is rotatably supported by the housing shaft seats 345, which permits the operational member 347 to be rotated at the housing shaft seats 345.

Figure 24:
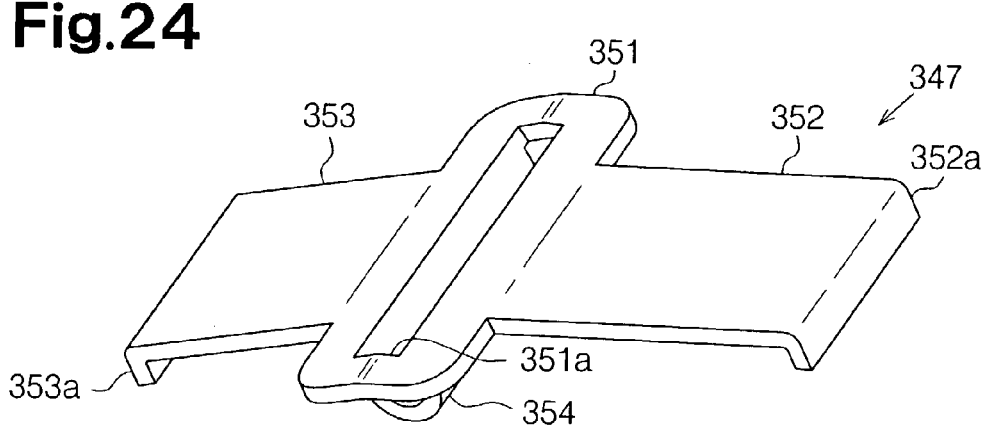
FIG. 24 is a top perspective view showing an operational member.
Figure 25:
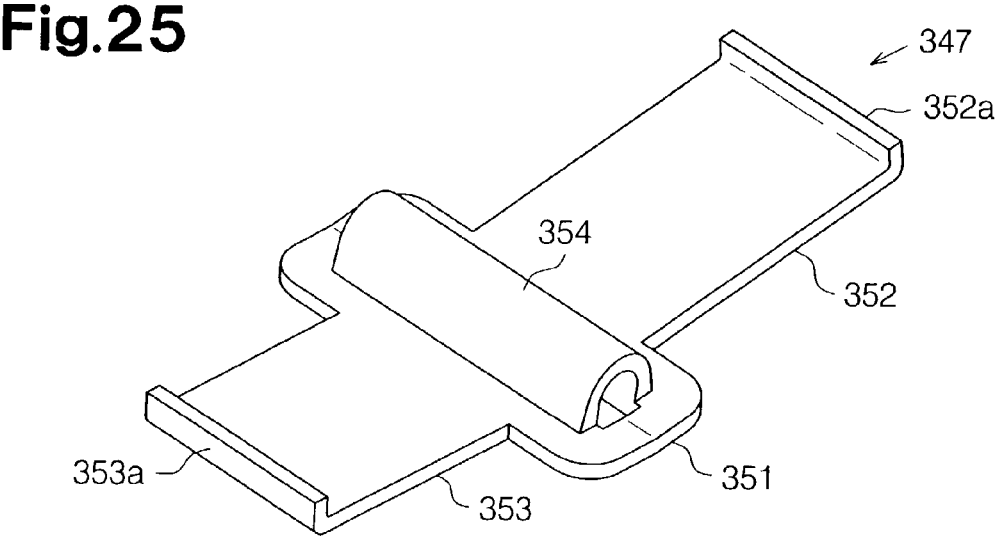
FIG. 25 is a bottom perspective view showing the operational member.

As shown in FIGS. 24, 25, the ends of the first and second side sections 352, 353 are bent in a direction away from the film 336 to form bent sections 352a, 353a. Therefore, even if the first and second side sections 352, 353 contact the film 336, the film 336 is not damaged.

Figure 26:
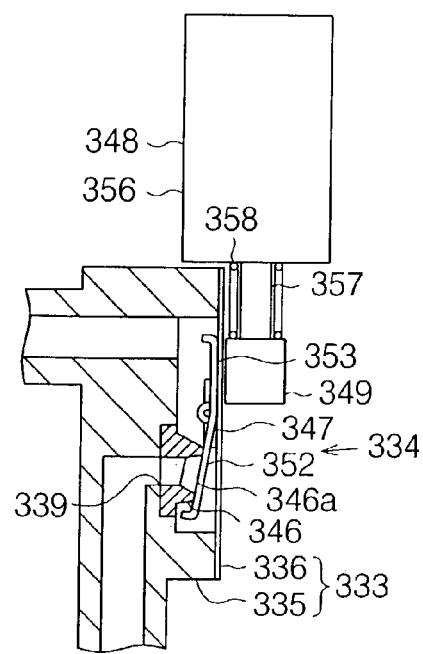
FIG. 26 is a schematic view showing an operation of a pressure damper.

When the operational member 347 is rotated counterclockwise as viewed in FIG. 20, the first side section 352 contacts the film 336. When the operational member 347 rotates clockwise, the first side section 352 contacts the upper surface 346a of the projection 346 as shown in FIG. 26, and the second side section 353 contacts the film 336. At this time, since the upper surface 346a of the projection 346 the upper surface 346a of the projection 346 is inclined to be located in a plane that contains the axis of the operational member 347, the projection 346 (the port 339) is securely sealed by the operational member 347.

A solenoid 348 is fixed to the carriage 14 as shown in FIG. 20 and includes an excitation portion 356 and a plunger 357 projection downward from the excitation portion 356. The excitation portion 356 incorporate an excitation coil (not shown). When supplied with current through a lead wire (not shown), the excitation portion 356 generates a magnetic field. The plunger 357 is a magnetic member that is vertically movable. When the excitation portion 356 is excited, the plunger 357 is attracted to the excitation portion 356. The magnet 349 is attached to the distal end of the plunger 357. Also, a coil spring 358 is fitted about the plunger 357. The coil spring 358 urges the magnet 349 and the excitation member 356 away from each other.

The magnet 349 is a permanent magnet and faces the operational member 347, with the film 336 in between. The magnet 349 transmit magnetic force to the operational member 347 through the film 336. As the plunger 357 is moved vertically, the magnet 349 is switched between a first attraction position to face the first side section 352 of the operational member 347 as shown in FIG. 20, and a second attraction position to face the second side section 353 of the operational member 347 as shown in FIG. 26.

Therefore, when the solenoid 348 is supplied with current and excited, the plunger 357 is attracted toward the excitation portion 356 as shown in FIG. 26, and the magnet 349 is moved to the second attraction position. Then, the second side section 353 of the operational member 347 is attracted through the film 336, which rotates the operational member 347 clockwise. As a result, the second side section 353 contacts the film 336, and the first side section 352 contacts the upper surface 346a of the projection 346, which closes the projection 346 (the port 339).

If the current to the solenoid 348 is stopped in the state of FIG. 26, the accumulated force of the coil spring 358 causes the plunger 357 to protrude from the excitation portion 356, and the magnet 349 is moved to the first attraction position as shown in FIG. 20. Then, the first side section 352 of the operational member 347 is attracted through the film 336, which rotates the operational member 347 counterclockwise. As a result, the first side section 352 is moved away from the projection 346 and contacts the film 336. Accordingly, the projection 346 (the port 339) is opened. As described above, supplying and stopping current to the solenoid 348 changes the relative positions of the first side section 352 and the projection 346, which opens and closes the projection 346.

Like the first embodiment, the above described valve device 334 is suitable for cleaning the recording head 16 by drawing ink. The choke cleaning and the selective cleaning of ink of selected-colors can be performed by opening and closing the ink passage with the valve device 334 according to this embodiment.

The tenth embodiment has the following advantages.

(1) In the tenth embodiment, the solenoid 348 moves the magnet 349 between the first attraction position and the second attraction position, thereby changing the relative position of the operational member 347 to the first side section 352 and the projection 346. Accordingly, the projection 346 (the second port 339) is opened and closed. Therefore, if the operational member 347 is made of a magnetic material such as electromagnetic stainless steel, the projection 346 can be opened and closed with the magnet 349. As a result, any material can be selected for the projection 346, which adds to the flexibility of design of the valve device. Therefore, there is no need to excite the projection 346 to attract the operational member 347 toward the projection 346. Also, there is no need to wind an excitation coil about the passage housing 333. This simplifies the structure of the valve device.

(2) In the tenth embodiment, the magnet 349 is located outside of the passage housing 333. Therefore, the ink resistance of the magnet 349 does not need to be taken into consideration, which adds to the flexibility of design of the valve device.

(3) In the tenth embodiment, the magnet 349 is at the first attraction position when the solenoid 348 is not supplied with current to open the projection 346. The magnet 349 is at the second attraction position when the solenoid 348 is supplied with current to close the projection 346. Therefore, during the choke cleaning or the selective cleaning of the inkjet printer 11, the solenoid 348 needs to be excited only when cleaning operation is executed. This reduces the load on the entire inkjet printer 11.

(4) In the tenth embodiment, movement of the magnet 349 rotates the operational member 347 about the axis. Accordingly, the first side section 352 and the projection 346 are moved relative to each other to open and close the projection 346. That is, the operational member 347 does not open and close the projection 346 using the own elasticity. Thus, there is no apprehension that opening and closing of the projection 346 will be impossible due to deterioration of elasticity. Further, since the projection 346 does not need to be opened and closed with a force that is greater than the force of the operational member 347, the energy efficiency is improved.

(5) In the tenth embodiment, the support shaft 355 are received by the shaft socket 354 integrally formed with the operational member 347 to permit the operational member 347 to rotate about the support shaft 355. Therefore, the operational member 347 can be rotated with a simple structure.

(6) In the tenth embodiment, the film 336 is located between the magnet 349 and the operational member 347 in the passage housing 333. Thus, the magnet 349 and the operational member 347 approach each other, with the film 336 in between. This shortens the distance between the magnet 349 and the operational member 347 and the attraction force is increased. Also, the structure facilitates installment of the operational member 347 in the passage housing 333 during manufacture.

(7) In the tenth embodiment, the film 336 is heat welded to the passage forming member 335. Therefore, the ink chamber 337 of the passage housing 333 is sealed with a simple structure. Also, film 336 is made of a material having a high gas barrier property. Therefore, gas is reliably prevented from leaking into the ink chamber 337 of the passage housing 333.

(8) In the tenth embodiment, the plate-like operational member 347 is used as the opening-closing member. The ends of the operational member 347 are bent in directions away from the film 336 to form the bent sections 352a, 353a. Therefore, when the first or second side section 352, 353 contacts the film 336 by moving the operational member 347, the bent sections 352a, 353a do not damage the film 336.

(9) In the tenth embodiment, the magnet 349 is a permanent magnet. Therefore, driving energy such as electricity is not required for attract the operational member 347. This simplifies the valve device.

(10) In the tenth embodiment, the projection 346 is formed of an elastic material. This permits the first side section 352 of the operational member 347 and the projection 346 to be closely contact each other and thus improves the sealing property.

(11) In the tenth embodiment, the upper surface 346a of the projection 346 is inclined such that the upper surface 346a lies in a plane that contains the axis of the operational member 347. Therefore, when the operational member 347 contacts the projection 346, the entire upper surface 346a of the projection 346 thoroughly contacts the first side section 352. Accordingly, the projection 346 is reliably sealed.

(12) In the tenth embodiment, the valve device 334 is located upstream of the recording head 16 of the inkjet printer 11. Therefore, during cleaning to discharge bubbles from the filter of the recording head 16, the valve device 334 is effectively used.

The tenth embodiments may be modified as follows.

In the tenth embodiment, the magnet 349 is at the first attraction position when the solenoid 348 is not supplied with current to open the projection 346. The magnet 349 is at the second attraction position when the solenoid 348 is supplied with current to close the projection 346.

This may be modified as in an eleventh embodiment shown in FIGS. 27(a) and 27(b). In the eleventh embodiment, the plunger 357 of the solenoid 348 projects upward from the excitation portion 356. When the excitation portion 356 is not supplied with current, the magnet 349 is located at the second attraction position as shown in FIG. 27(a), thereby closing the projection 346. When the excitation portion 356 is supplied with current, the magnet 349 is located at the first attraction position as shown in FIG. 27(b), thereby opening the projection 346.

In the eleventh embodiment, even if the inkjet printer 11 falls sideways when the inkjet printer 11 is off and no current is being supplied to the solenoid 348, ink is prevented from leaking since the valve device 334 is closed.

In the eleventh embodiment, the valve device 334 in located anywhere in the ink passage from a portion of the supply tube 13 that is moved by operation of the carriage 14 to the ink cartridge 12.

In the tenth and eleventh embodiments, the support shaft 355 is received by the shaft socket 354 of the operational member 347 to permit the operational member 347 to rotate. However, the operational member 347 and the support shaft 355 may be formed integrally.

In the tenth and eleventh embodiments, the plate-like operational member 347 is used. However, the shape of the operational member 347 is may be changed as long as the operational member 347 is moved by the magnet 349 to contact and close the projection 346.

In the tenth and eleventh embodiments, the bent sections 352a, 353a functioning as protection portions are formed on the operational member 347. However, the bent sections 352a, 353a may be omitted. Also, only one of the bent sections 352a, 353a may be formed. Further, the bent sections 352a, 353a may be replaced with elastic bodies such as rubber. Also, the film 336 may have a protection portion.

In the tenth and eleventh embodiments, the magnet 349 is a permanent magnet. However, as shown in FIG. 28, electromagnets 361, 362 may be provided at positions corresponding to the first and second side sections 352, 353, respectively. In this case, the electromagnets 361, 362 are alternately activated to generate magnetic fields to rotate the operational member 347. This permits the position of the operational member 347 to be accurately controlled.

In the tenth and eleventh embodiment, the projection 346 is used as a valve member. The projection 346 may be replaced by a valve member having a different shape. Although the projection 346 is formed of an elastic material, the projection 346 may be formed of other type of material.

In the tenth and eleventh embodiment, the upper surface 346a of the projection 346 is inclined. However, as shown in FIG. 29, the upper surface 346a may be parallel to the axis of the plunger. In this case, the shape of the first side section 352 of the operational member 347 may be bent to contact the upper surface 346a of the projection 346.

In the tenth and eleventh embodiments, the inkjet printer 11, in which the ink cartridge 12 is not mounted on the carriage 14, is used. However, the tenth and eleventh embodiments are applicable to inkjet printers in which the ink cartridge 12 is mounted on the carriage 14.

In the tenth and eleventh embodiments, the present invention is applied to inkjet printers. However, the present invention may be applied to other types of valve devices. Also, the present invention may be applied to devices that uses fluids other than ink.

In the tenth and eleventh embodiments, the solenoid 348 is used as a magnet moving mechanism. However, any moving means may be used as long as the means is capable of moving the magnet 349 between the first attraction position and the second attraction position. For example, an actuator including a motor and a threaded shaft may be used for moving the magnet 349.

Figure 30:
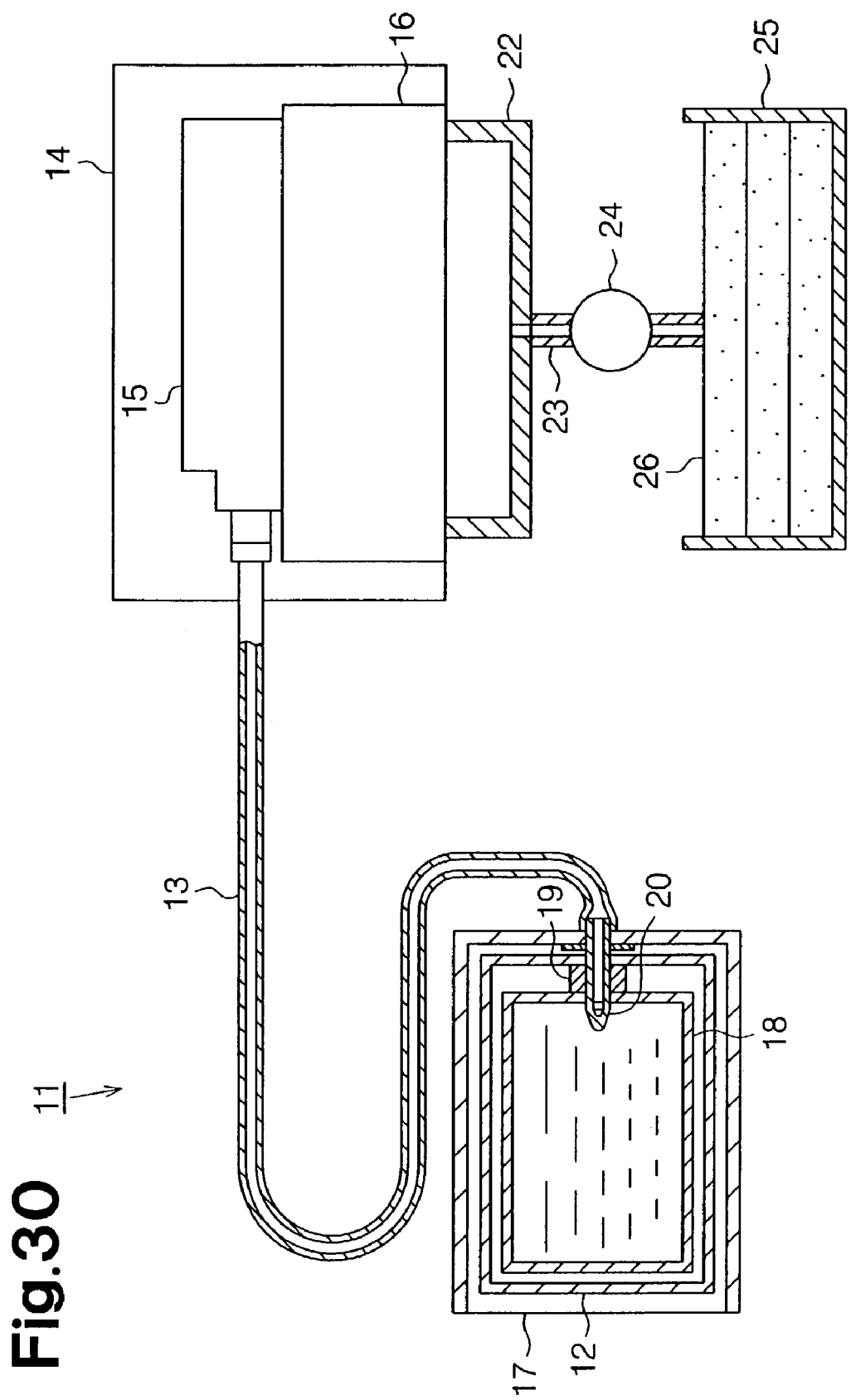
FIG. 30 is a schematic view showing an inkjet printer according to a twelfth embodiment.

A valve device according to a twelfth embodiment of the present invention will be described with reference to FIGS. 30 to 32. The valve device is used in a pressure damper 15 of an inkjet type recording apparatus.

The pressure damper 15 has a passage forming member 431. The passage forming member 431 is formed of a resin material such as polypropylene or polyethylene. An ink passage is formed in the passage forming member 431. The ink passage includes a first ink passage 435, an ink chamber 433, a small hole 434, and a second ink passage 432. The distal end of the first ink passage 435 is connected to the ink supply tube 13. The first ink passage 435 is communicated with the ink chamber 433 through the small hole 434. The ink chamber 433 has a closed end and has an opening that opens upward. The small hole 434 is formed in a sidewall of the ink chamber 433. The ink chamber 433 is communicated with the second ink passage 432 at the bottom. Ink from the ink supply tube 13 enters the ink chamber 433 through the first ink passage 435 and the small hole 434. The ink then passes the second ink passage 432 and is supplied to the recording head 16.

A film 436 is provided on the upper surface of the passage forming member 431. As in the first embodiment, the film 436 is formed of layers of different materials.

An operational member 437 and a valve member 438 are located in the ink chamber 433, which forms the ink passage. The operational member 437 is made of magnetic material and has a small diameter portion 439 and a large diameter portion 441. The small diameter portion 439 has a constant diameter. A pressing surface 440 is formed on a side of the small diameter portion 439 that faces a small hole 434. When the passage is closed, the pressing surface 440 is pressed against the valve member 438. The large diameter portion 441 is tapered toward the operational member 437. Planar inclined surfaces 445 are formed on the circumference of the large diameter portion 441.

A recess 442 is formed in the distal end of the large diameter portion 441. The recess 442 opens at the distal end of the operational member 437. A coil spring 443 functioning as an elastic body is fitted in the recess 442. A first end of the coil spring 443 is fixed to the operational member 437. A second end of the coil spring 443 is fixed to spring seat 446 formed on the passage forming member 431. A spring receiving hole 459 is formed in the spring seat 446. In this embodiment, the bottom of the spring receiving hole 459 is closed by the passage forming member 431. When the passage is closed, the coil spring 443 presses the operational member 437 so that the pressing surface 440 is pressed against the valve member 438. When the passage is opened, the operational member 437 is inclined, which bends the coil spring 443.

The valve member 438 will now be described. The valve member 438 is located in the ink chamber 433 about the inner end of the small hole 434. As in the first embodiment, the valve member 438 is formed of an elastic material. An annular projection 447 is formed at the distal end of the valve member 438. The distal portion of the projection 447 is formed flat. When the distal portion of the projection 447 contacts the flat portion of the pressing surface 440 of the operational member 437, the pressing force elastically deforms the valve member 438. This closes the small hole 434 to close the passage.

An electromagnet 448 is located outside of the passage forming member 431 in the vicinity of the film 436. The electromagnet 448 includes an iron core 449, a frame 450, and an excitation coil 451. The frame 450 is machined to form a cylinder, and the iron core 449 is located in the center of the frame 450. The frame 450 is made of resin such as polyamide containing glass. The excitation coil 451 is wound about the frame 450. The excitation coil 451 is made of a copper wire and coated with an insulating coating layer of polyethylene and urethane. The excitation coil 451 is electrically connected to a valve device driving circuit with a lead wire (neither is shown). When the electromagnet 448 is supplied with current, the operational member 437, which is formed of magnetic material, is attracted by the electromagnet 448, with the film 436 in between, and is moved to an attraction position (operational position) 444 shown in FIG. 32. When the current to the electromagnet 448 is stopped, the operational member 437 is not attracted any longer and returns to a standby position shown in FIG. 31. When the operational member 437 is not magnetized, the passage is closed. When the operational member 437 is magnetized and at the attraction position 444, the passage is opened.

Two stoppers 453, 454 are located in the ink chamber 433. The stoppers 453, 454 are fixed in the vicinity of the valve member 438 and is located about the small diameter portion 439 of the operational member 437. The first stopper 453 is located closer to the electromagnet 448. A distal portion 455 of the first stopper 453 functions as a fulcrum when the operational member 437 is inclined and moved to the attraction position. The outer surface of the first stopper 453 is formed flat and contacts the film 436. The second stopper 454 is located at the bottom of the ink chamber 433. A distal portion 456 of the second stopper 454 restricts the movement of the operational member 437 when the operational member 437 returns to the standby position.

An operation of this valve device will now be described.

Figure 31:
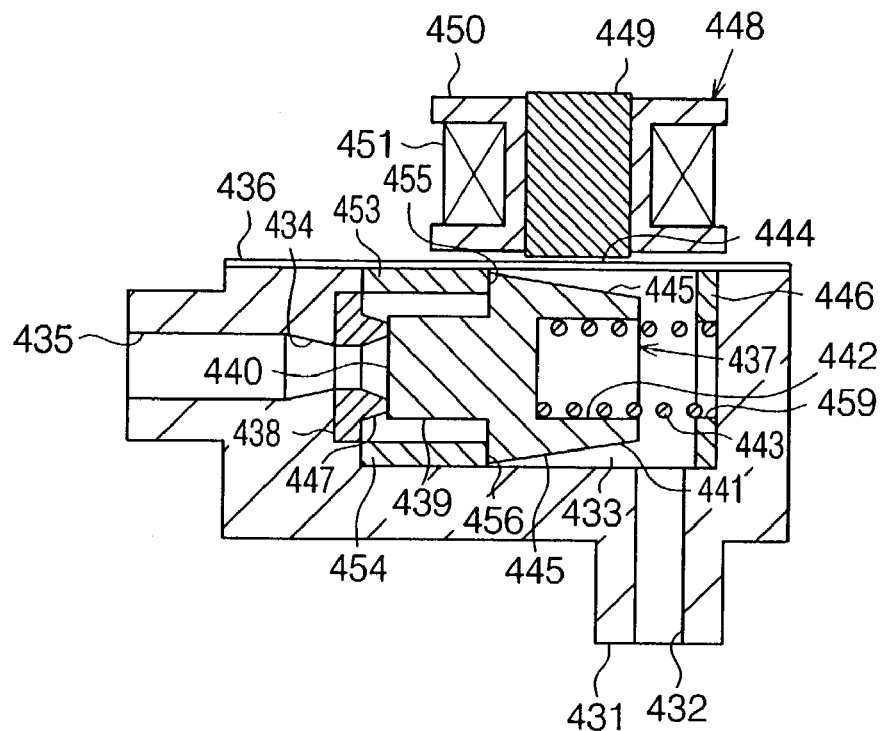
FIG. 31 is a cross-sectional view, with a part cut away, illustrating a pressure damper when no current is supplied to an electromagnet.
Figure 32:
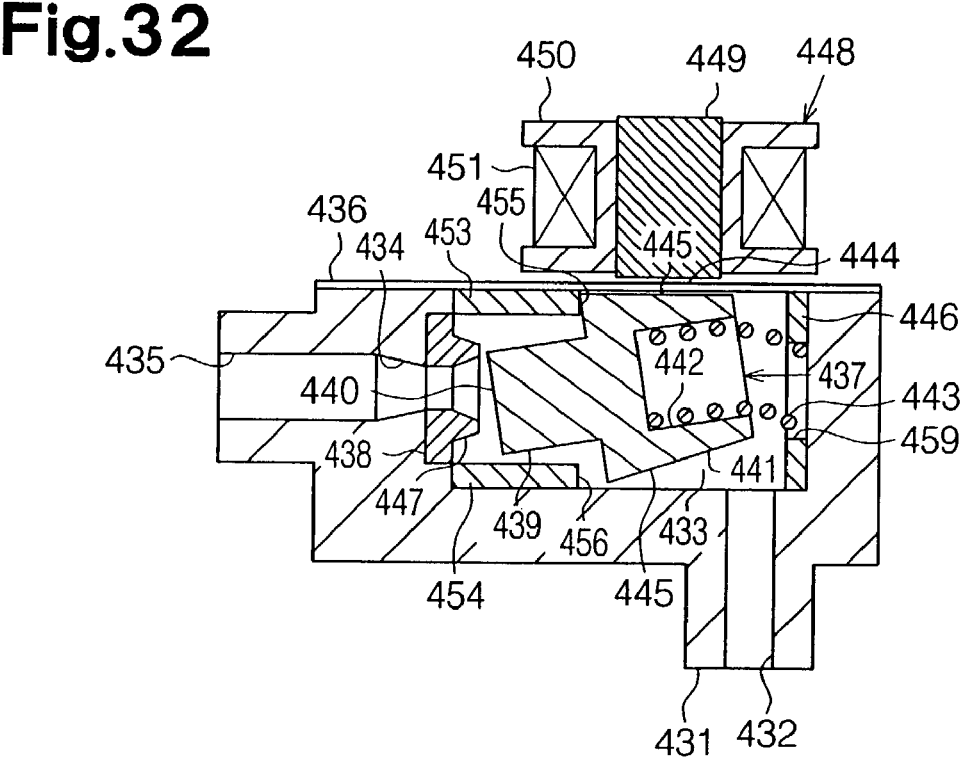
FIG. 32 is a cross-sectional view, with a part cut away, illustrating a pressure damper when current is supplied to an electromagnet.

When the electromagnet 448 is not supplied with current, the operational member 437 is not attracted by the electromagnet 448 and is at the standby position as shown in FIG. 31. At this time, the operational member 437 is pressed against the valve member 438 by the coil spring 443, and closes the passage. The distal portions 455, 456 of the stoppers 453, 454 contact the operational member 437.

When the electromagnet 448 is supplied with current, the operational member 437 is attracted by a magnetic force, and is inclined toward the film 436 about the distal portion 455 of the first stopper 453 as a fulcrum. The operational member 437 is moved to the attraction position (operational position) as shown in FIG. 32 and contacts the film 436. At this time, the distal portion 456 of the second stopper 454 is separated from the operational member 437. Since its ends are fixed, the coil spring 443 is bent by the inclination of the operational member 437. Since the attraction force of the electromagnet 448 is set greater than the force of the coil spring 443, the operational member 437 does not return to the standby position even if the coil spring 443 is bent.

In this manner, when the electromagnet 448 is supplied with current, the operational member 437 is inclined toward the film 436. This creates space between the pressing surface 440 and the valve member 438. Fluid in the passage flows into the small hole 434 through the space, and the passage is opened.

When the current to the electromagnet 448 is stopped, the attraction force of the electromagnet 448 disappears, and the operational member 437 is returned to the standby position by the force of the coil spring 443. At this time, the distal portion 456 of the second stopper 454 restricts the movement of the operational member 437 and stops the operational member 437. Since the coil spring 443 is arranges such that its length is shorter than its natural length when the operational member 437 is at the standby position, the coil spring 443 presses the bottom of the recess 442. Therefore, the pressing surface 440 of the operational member 437 is pressed against the valve member 438. Accordingly, the passage is closed.

As the previous embodiments, the operation of the pressure damper 15 according to the twelfth embodiment is suitable for cleaning the recording head 16 by drawing ink.

The pressure damper 15, or the valve device according to the twelfth embodiment, has the following advantages.

(1) In the twelfth embodiment, the coil spring 443 retains the operational member 437 at the standby position. Thus, the operational member 437 does not need to be formed of an elastic material for generating pressing force to be applied to the valve member 438 when the passage is closed. This permits the material for the valve member 437 to be selected from a wide range of materials. The operational member 437 is attracted by the electromagnet 448 and is moved to the attraction position to open the passage. Therefore, there is no need to arrange a magnet by providing iron cores about the operational member 437, or about the passage forming member 431. This provides a valve device having a simplified structure. Further, since the position of the magnet is not limited, the twelfth embodiment adds to the flexibility of design of the valve device.

(2) In the twelfth embodiment, the electromagnet 448 for attracting the operational member 437 is located outside the passage forming member 431. Thus, the ink resistance of the electromagnet 448 does not need to be taken into consideration. Therefore, the materials of the parts in the electromagnet 448 are not limited, which adds to the flexibility of design.

(3) In the twelfth embodiment, the inclined surfaces 445 are formed on the large diameter portion 441 of the operational member 437. Therefore, when the operational member 437 is attracted by the electromagnet 448, the inclined surfaces 445 easily contact the electromagnet 448. The attraction force for attracting the operational member 437 must be greater than the force of the coil spring 443. Since the inclined surfaces 445 are formed flat, the inclined surfaces 445 have a great area for receiving magnetic force and thus receives a sufficient attraction force. Accordingly, the operational member 437 is stably retained at the attraction position.

(4) In the twelfth embodiment, the recess 442 is formed in the distal end of the large diameter portion 441 of the operational member 437, and the coil spring 443 is fitted in the recess 442. Therefore, the depth and the diameter of the recess 442 can be determined in accordance with the shape of the coil spring 443. Thus, the force of the coil spring 443 is adjustable. By fitting an elastic body in the recess 442, the point of application of the force of the elastic body, that is, the center of the inclination, can be set at the center of the elastic body. This reduces the moment of the inclination. Accordingly, the operational member 437 is effectively urged.

(5) In the twelfth embodiment, the operational member 437 has the large diameter portion 441 and the small diameter portion 439. Also, the first stopper 453 located near the electromagnet 448 and the second stopper 454 located near the passage forming member 431 are accommodated in the ink chamber 433. The first stopper 453 is capable of contacting the large diameter portion 441 at the distal portion 455. Therefore, when the operational member 437 is inclined, the first stopper 453 functions as a fulcrum. When the operational member 437 is at the standby position, the second stopper 454 is capable of contacting the large diameter portion 441 at the distal portion 456. Therefore, when the operational member 437 is moved from the attraction position to the standby position, the second stopper 454 restricts the movement of the operational member 437 and stops the operational member 437. This stabilizes the movement of the operational member 437 and thus stabilizes the flow rate of fluid supplied to the recording head 16.

(6) In the twelfth embodiment, the elastic body for urging the operational member 437 is the coil spring 443. The valve device is therefore inexpensive and simple.

(7) In the twelfth embodiment, the film 436 is located between the electromagnet 448 and the operational member 437 to seal the passage. This reduces the distance between the electromagnet 448 and the operational member 437. Therefore, even if the force of the electromagnet 448 is reduced, a relatively great attraction force is generated. Further, since the film 436 is heat welded to the passage forming member 431, the sealing property of the passage is improved. Also, since the film 436 is formed of a material having a high gas barrier property, air does leak in the passage through the film 436.

(8) In the twelfth embodiment, the valve device is located upstream of the recording head 16. Therefore, during the choke cleaning to discharge bubbles from the filter of the recording head 16, the valve device is effectively used. Also, the valve device is effectively used in the selective cleaning in which the nozzle of the necessary colors are cleaned.

(9) In the twelfth embodiment, the valve member 438 is formed of an elastic body, and the projection 447 is formed at the distal end. The pressing surface 440 of the operational member 437 is pressed against projection 447 to close the passage. The sealing property of the passage is therefore improved.

(10) In the twelfth embodiment, a magnet for attracting the operational member 437 is the electromagnet 448. Therefore, by supplying and stopping current to the electromagnet 448, the passage is opened and closed. Also, by changing the magnitude of current, a desired magnetic force is generated. Thus, any type of operational member may be used, which adds to the flexibility of design of the valve device.

(11) In the twelfth embodiment, the passage is opened when current is supplied to the electromagnet 448, and is closed when no current is supplied to the electromagnet 448. Therefore, even if the inkjet printer 11 falls sideways when the inkjet printer 11 is off and no current is being supplied to the electromagnet 448, ink is prevented from leaking since the valve device is closed.

Figure 33:
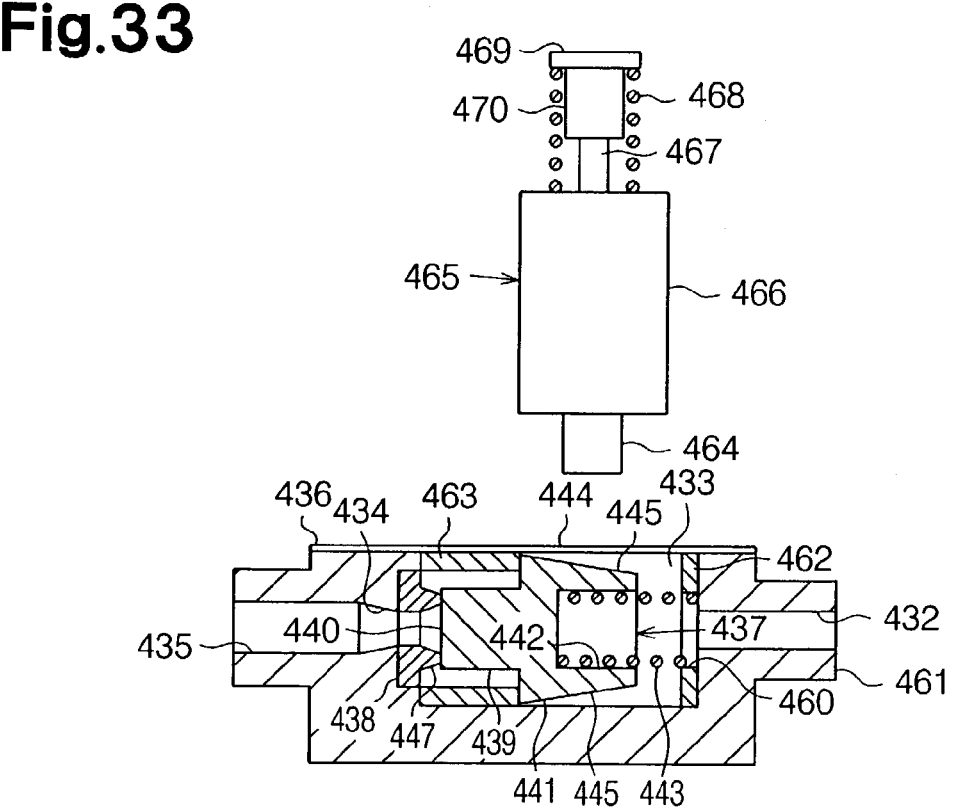
FIG. 33 is a cross-sectional view, which a part cut away, illustrating a pressure damper according to a thirteenth embodiment.
Figure 34:
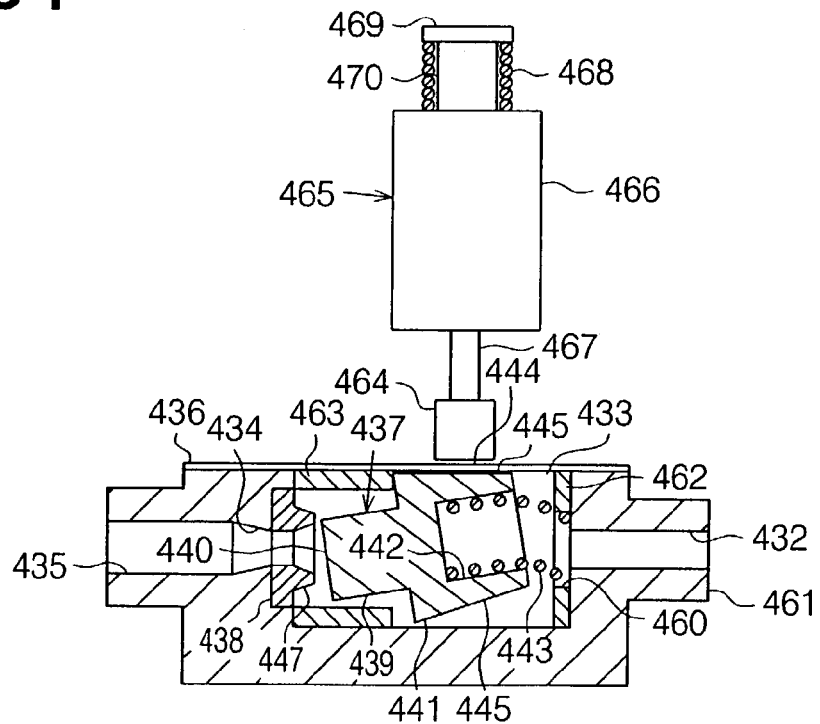
FIG. 34 is a cross-sectional view, with a part cut away, illustrating the pressure damper according to the thirteenth embodiment.
Figure 35:
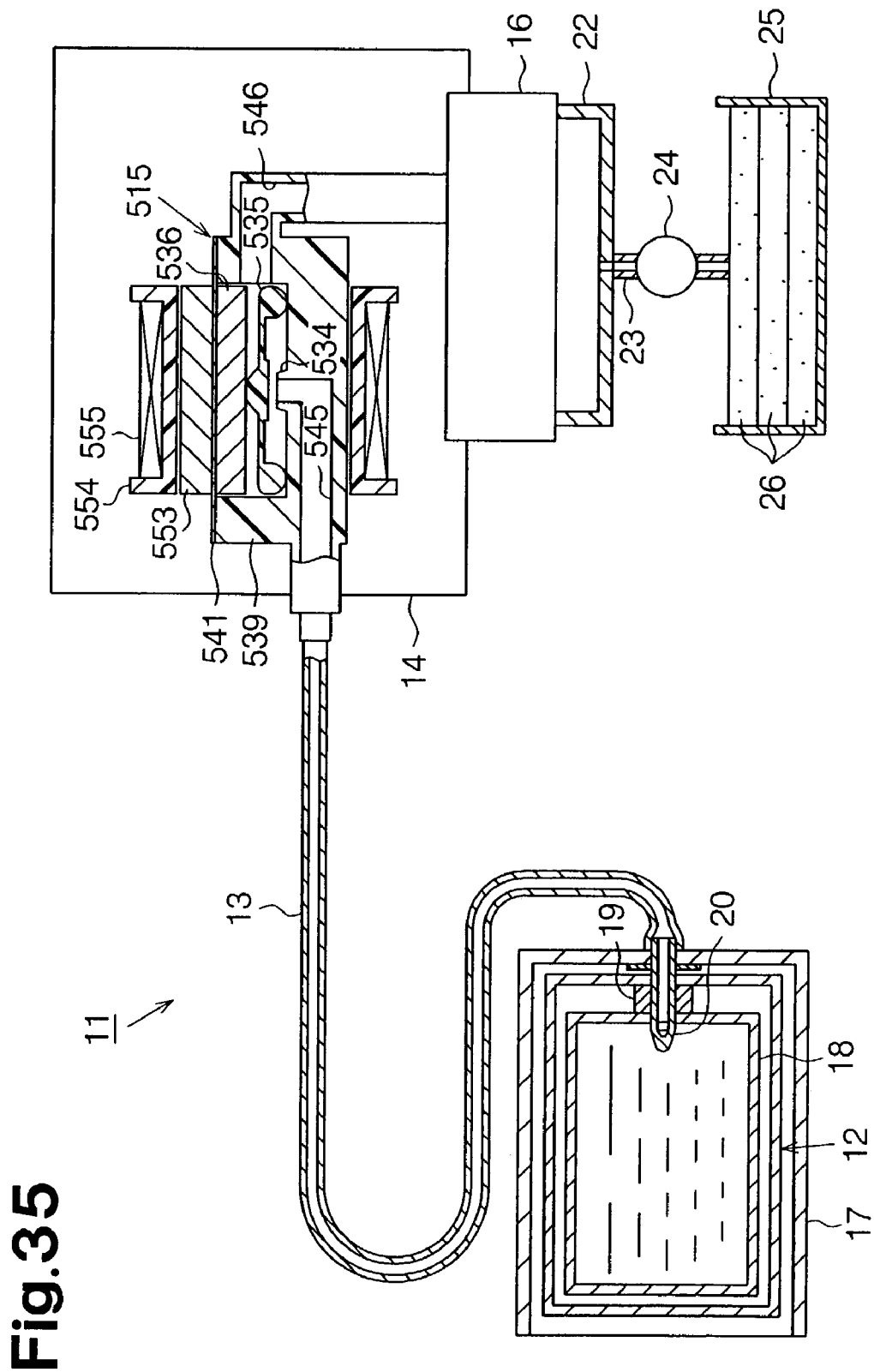
FIG. 35 is a schematic view showing an inkjet printer according to a fourteenth embodiment.

A thirteenth embodiment of the present invention will now be described with reference to FIGS. 33 and 34. The differences from the twelfth embodiment will mainly be discussed.

A pressure damper 15 has a passage forming member 461. A passage is defined in the passage forming member 461. A first ink passage 435 and a second ink passage 432 extend substantially in the same direction. A spring seat 462 is located in the passage forming member 461 at a position close to the first ink passage 435. The spring seat 462 is formed in to a shape in accordance with an ink chamber, and has an ink hole 460 in the center to introduce ink into the second ink passage 432.

A substantially cylindrical stopper 463 is located in the ink chamber 433 about a valve member 438. The stopper 463 faces an operational member 437. A proximal portion of the stopper 463 is fixed to the passage forming member 461 in the vicinity of the valve member 438 and is located about a small diameter portion 439 of the operational member 437. The distal portion of the stopper 463 is capable of contacting a large diameter portion of the operational member 437.

The stopper 463 functions as a fulcrum of the operational member 437 in the vicinity of a film 436. At the side opposite from the portion functioning as the fulcrum, the stopper 463 restricts the operational member 437 at a standby position.

A permanent magnet 464 and a solenoid 465 are located outside of the passage forming member 461 in the vicinity of the film 436. The solenoid 465 moves the permanent magnet 464. The solenoid 465 includes an electromagnet 466, a movable iron core 467, a solenoid coil spring 468. The movable iron core 467 is formed of a magnetic material. The permanent magnet 464 is attached to a first end of the movable iron core 467. A base 469 and a stopper 470 are provided at a second end of the movable iron core 467. The cylindrical electromagnet 466 is movable fitted about the movable iron core 467. The solenoid coil spring 468 is located between the electromagnet 466 and the base 469.

When the permanent magnet 464 is moved toward the passage, the solenoid coil spring 468 is contracted. When the permanent magnet 464 is moved away from the passage, the solenoid coil spring 468 is expanded.

An operation of this valve device will now be described.

When the electromagnet 466 is not supplied with current, no attraction force is applied to the movable iron core 467. Therefore, the movable iron core 467 is at an upper position as shown in FIG. 33, and the solenoid coil spring 468 is expanded. At this time, since the permanent magnet 464 is above and away from the operational member 437, the operational member 437 is located at the standby position and the passage is closed.

When the electromagnet 466 is supplied with current, the movable iron core 467 is attracted by the electromagnet 466, and the stopper 470 restricts the movement of the movable iron core 467. At this time, the solenoid coil spring 468 is contracted, and the permanent magnet 464 approaches the operational member 437. Then, the permanent magnet 464 attracts and inclines the operational member 437. Accordingly, the operational member 437 is located at an attraction position and opens the passage. If the current is stopped in this state, the attraction force acting on the movable iron core 467 disappears, and the movable iron core 467 is moved away from the operational member 437 by the force of the solenoid coil spring 468. Therefore, the permanent magnet 464 is moved away from the operational member 437. Accordingly, the operational member 437 receives the force of the coil spring 443 and is returned to the standby position, which closes the passage.

In addition to the advantages (3), (4), (6), (8), and (9) of the twelfth embodiment, the thirteenth embodiment provides the following advantages.

(12) In the thirteenth embodiment, the coil spring 443 retains the operational member 437 at the standby position. Thus, the operational member 437 does not need to be formed of an elastic material for generating pressing force to be applied to the valve member 438 when the passage is closed. This permits the material for the valve member 437 to be selected from a wide range of materials. The operational member 437 is attracted by the permanent magnet 464 at the inclined surface 445, and is moved to the attraction position to open the passage. Therefore, there is no need to arrange a magnet by providing iron cores about the operational member 437, or about the passage forming member 431. This provides a valve device having a simplified structure. Further, since the position of the magnet is not limited, the twelfth embodiment adds to the flexibility of design of the valve device.

(13) In the thirteenth embodiment, the permanent magnet 464 for attracting the operational member 437 is located outside the passage forming member 461. Thus, the ink resistance of the permanent magnet 464 does not need to be taken into consideration. Therefore, the material of the permanent magnet 464 is not limited, which adds to the flexibility of design.

(14) In the thirteenth embodiment, the operational member 437 has the large diameter portion 441 and the small diameter portion 439. Also, the substantially cylindrical stopper 463 is located in the ink chamber 433. The stopper 463 contacts the first end section of the large diameter portion 441. Therefore, when the operational member 437 is inclined, the stopper 463 functions as a fulcrum. The stopper 463 also contacts the second end of the large diameter portion 441 at the distal portion 456, which is closer to the passage forming member 461. Thus, when the operational member 437 is moved from the attraction position to the standby position, the stopper 463 restricts the movement of the operational member 437. This stabilizes the movement of the operational member 437 and thus stabilizes the flow rate of fluid supplied to the recording head 16.

(15) In the thirteenth embodiment, the film 436 is located between the permanent magnet 464 and the operational member 437 to seal the passage. This reduces the distance between the permanent magnet 464 and the operational member 437. Therefore, even if the force of the permanent magnet 464 is reduced, a relatively great attraction force is generated. Further, since the film 436 is heat welded to the passage forming member 461, the sealing property of the passage is improved. Also, since the film 436 is formed of a material having a high gas barrier property, air does leak in the passage through the film 436.

(16) In the thirteenth embodiment, a magnet for attracting the operational member is the permanent magnet 464, and a device for moving the permanent magnet 464 is the solenoid 465. Therefore, the position of the solenoid 465 and the positions of the permanent magnet 464 when the solenoid 465 is supplied with current and is not supplied with current are arbitrarily determined. This adds to the flexibility of design of the valve device.

(17) In the thirteenth embodiment, the passage is opened when current is supplied to the electromagnet 466 of the solenoid 465, and is closed when no current is supplied to the electromagnet 466. Therefore, even if the inkjet printer 11 falls sideways when the inkjet printer 11 is off and no current is being supplied to the electromagnet 466, ink is prevented from leaking since the valve device is closed.

(18) In the thirteenth embodiment, the solenoid 465 is arranged substantially perpendicular to the operational member 437. This prevents the size of the valve device from being increased along the moving direction of the operational member 437.

The twelfth and thirteenth embodiments may be modified as follows.

In the twelfth and thirteenth embodiments, the ink passage is formed as shown in FIGS. 31 to 34. However, the direction in which the first and second ink passage 435, 432 extend may be changed.

In the twelfth and thirteenth embodiments, the first ink passage 435 is connected to the ink supply tube 13, and the second ink passage 432 is connected to the recording head 16. To the contrary, the first ink passage 435 may be connected to the recording head 16, and the second ink passage 432 may be connected to the ink supply tube 13. In this case, ink from the ink supply tube 13 enters the ink chamber 432 through the second ink passage 432. The ink then passes the small hole 434 and is supplied to the recording head 16 through the first ink passage 435.

Also, the valve member 438 may be located at the pressing surface 440 of the operational member 437 to contact an area about the small hole 434.

In the thirteenth embodiment, the solenoid 465 is used as a magnet moving mechanism. However, the magnet may be moved by a magnet moving mechanism other than the solenoid 465.

In the thirteenth embodiment, the permanent magnet 464 is located at the distal end of the movable iron core 467. However, the position of the permanent magnet 464 may be located other positions on the movable iron core 467.

In the thirteenth embodiment, the moving direction of the permanent magnet 464 is substantially perpendicular to the axis of the operational member 437. However, the moving direction of the permanent magnet 464 may be substantially parallel to the axis of the operational member 437.

In the thirteenth embodiment, the passage is opened when current is supplied to the electromagnet 466, and is closed when no current is supplied to the electromagnet 466. To the contrary, the solenoid coil spring 468 may be located at the side of the permanent magnet 464, so that the passage is closed when the electromagnet 466 is supplied with current, and is opened when the electromagnet 466 is not supplied with current. In this configuration, the movable iron core 467 is moved in a direction opposite from that of the thirteenth embodiment when the electromagnet 466 is supplied with current. In this case, since the permanent magnet 464 is moved away from the operational member 437 when the electromagnet 466 is supplied with current, the passage is closed and the solenoid coil spring 468 is contracted. When the electromagnet 466 is not supplied with current, the solenoid coil spring 468 at the permanent magnet 464 is expanded, and the permanent magnet 464 attracts the operational member 437. Accordingly, the passage is opened.

In the twelfth and thirteenth embodiments, the inkjet printer 11, in which the ink cartridge 12 is not mounted on the carriage 14, is used. However, the twelfth and thirteenth embodiments are applicable to inkjet printers in which the ink cartridge 12 is mounted on the carriage 14.

In the twelfth and thirteenth embodiments, the present invention is applied to inkjet printers. However, the present invention may be applied to other types of liquid injecting apparatuses that inject liquid other than ink. For example, the present invention may be applied to liquid injecting apparatus for injecting liquid such as electrode material or color material used for manufacturing electro luminescent displays and FEDs (surface light emitting displays). The present invention may also be applied to liquid injecting apparatus for injecting biological organic matter used for manufacturing biochips. Alternatively, the present invention may be applied to sample injecting apparatus such as a precision pipette.

A fourteenth embodiment of the present invention will now be described with reference to FIGS. 35 to 38.

A passage valve 515 is attached to a carriage 14. The passage valve 515 opens and closes a passage for supplying ink from an ink supply tube 13 to a recording head 16.

The recording head 16 is located at the lower side of the carriage 14. Ink is supplied to the recording head 16 from the passage valve 515. The recording head 16 expands and contracts a pressure chamber (not shown) with a piezoelectric oscillator to discharge droplets of ink, which is supplied from the passage valve 515, from a nozzle opening.

The passage valve 515 will now be described.

Figure 36:
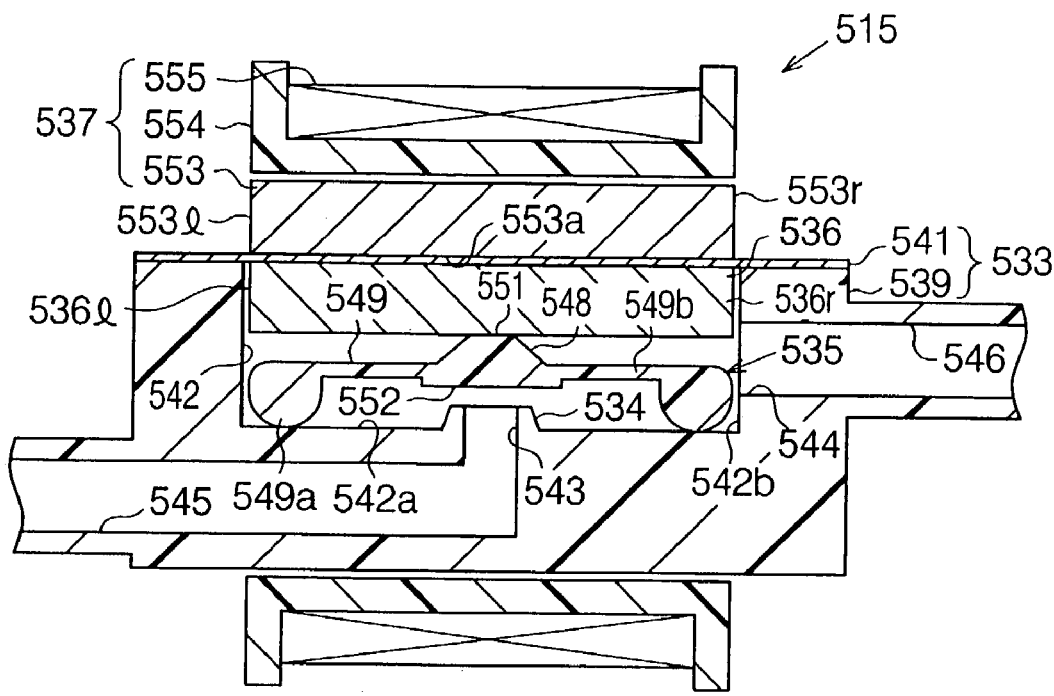
FIG. 36 is a partially cross-sectional view showing a passage valve.

As shown in FIG. 36, the passage valve 515 includes a passage housing 533, a valve seat 534 formed in the passage housing 533, an elastic member 535, a magnetic member 536, a magnetic member driving mechanism 537 located outside the passage housing 533. The passage housing 533 includes a passage forming member 539 and a film 541, and is fixed to the carriage 14.

The passage forming member 539 is formed of a resin material such as polypropylene or polyethylene. A recess-like ink chamber 542 is formed in the passage forming member 335. The ink chamber 542 is opened upward. A first port 543 is formed in a bottom 542a of the ink chamber 542. A second port 544 is formed in a right inner wall 542b of the ink chamber 542.

A first ink passage 545 is formed in the passage forming member 539. The first ink passage 545 starts from the first port 543 and extends leftward. The distal end (not shown) of the first ink passage 545 is connected to the ink supply tube 13 (see FIG. 35). Further, a second ink passage 546 is formed in the passage forming member 539. The second ink passage 546 starts from the second port 544 and extends rightward. The distal end (not shown) of the second ink passage 546 is connected to the recording head 16 (see FIG. 35).

The film 541 is heat welded to the upper surface of the passage forming member 539 to cover the opening of the ink chamber 542 and seal the ink chamber 542. Therefore, the passage includes a first ink passage 545, the ink chamber 542, and the second ink passage 546.

Ink that is supplied from the ink supply tube 13 to the first ink passage 545 enters the ink chamber 542 through the first port 543. Then, the ink flows to the second ink passage 546 through the second port 544 and is supplied to the recording head 16.

The material of the film 541 is the same as that in the first embodiment.

The valve seat 534 is an annular projection formed about the first port 543 on the bottom 542a of the ink chamber 542. In this embodiment, the valve seat 534 is integrally formed with the passage forming member 539.

Figure 37:
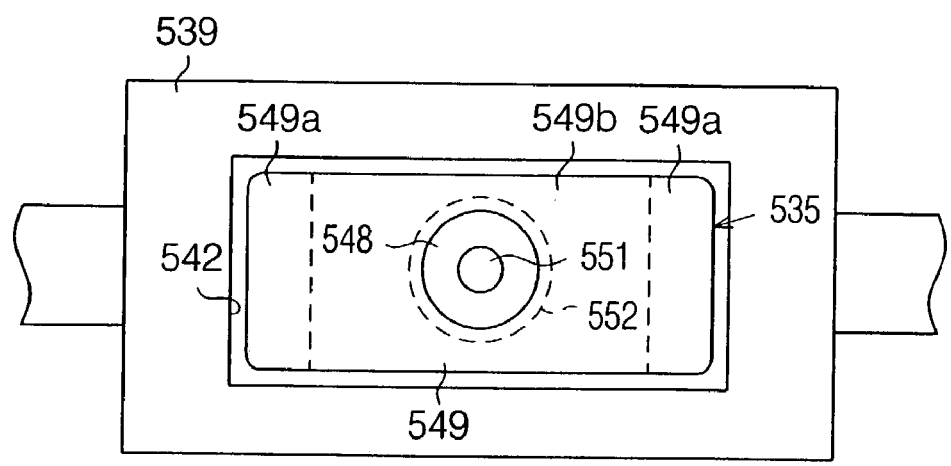
FIG. 37 is a partially exploded plan view showing a passage valve.

As shown in FIGS. 36 and 37, the elastic member 535 is shaped like an elongated rectangle and is accommodated in the ink chamber 542. Space exists between the elastic member 535 and the inner walls of the ink chamber 542. The elastic member 535 is made of an elastic material, such as a fluorine rubber, a rigid silicon rubber, a butyl rubber, an elastomer, a CR rubber, an NBR rubber, or a urethane rubber. The elastic member 535 includes a central valve body 548 and an urging portion 549, which urges the valve body 548 upward.

The valve body 548 is shaped like a truncated cone and projects upward. The upper surface of the valve body 548 forms a magnetic member contacting section 551, and the lower surface of the valve body 548 forms a valve seat contacting section 552. The magnetic member contacting section 551 and the valve seat contacting section 552 are both circular and concentric.

The urging portion 549 includes a pair of support sections 549a and a plate-like thin section 549b, which couples the support sections 549a at the upper sections. The valve body 548 is integrally formed with the center of the thin section 549b. If the valve body 548 is urged downward while limiting the lateral movement of the support sections 549a, the thin section 549b is elastically deformed and the valve body 548 is moved downward. In this state, if the valve body 548 is released, the valve body 548 is moved upward as the thin section 549b returns to the initial position.

The above described elastic member 535 is accommodated in the ink chamber 542 with the support sections 549a contacting the bottom 542a of the ink chamber 542. The valve seat contacting section 552 of the elastic member 535 and the valve seat 534 are vertically stacked.

When no external force is applied to the elastic member 535, the thin section 549b is parallel to the bottom 542a of the ink chamber 542, and the valve seat contacting section 552 is separated from the valve seat 534. When a downward force is applied to the magnetic member contacting section 551 from above, the thin section 549b of the elastic member 535 is deformed, and the valve seat contacting section 552 of the valve body 548 contacts the valve seat 534. This closes the first port 543.

The magnetic member 536 is shaped as a rectangular parallelepiped and is made of a material that is magnetized in a magnetic field, such as electromagnetic stainless steel.

The outside dimension of the magnetic member 536 is substantially the same as the elastic member 535. The magnetic member 536 is held between the elastic member 535 and the film 541 in the ink chamber 542. When the elastic member 535 is not deformed, the upper surface 536a of the magnetic member 536 contacts the film 541, and the lower surface 536b contacts the magnetic member contacting section 551.

The magnetic member driving mechanism 537 includes a permanent magnet 553, a bobbin 554, and an excitation coil 555. The permanent magnet 553 has substantially the same size and shape as the magnetic member 536. The lower surface 553a of the permanent magnet 553 contacts the film 541 from the outside of the ink chamber 542. That is, the permanent magnet 553 faces the magnetic member 536, with the film 541 in between. Since the permanent magnet 553 is located outside, but not inside, the ink chamber 542, the permanent magnet 553 does not contact ink. Therefore, when selecting the material for the permanent magnet 553, deterioration caused by ink does not need to be taken into consideration. This permits the material for the permanent magnet 553 to be selected from a wide range of materials As viewed in FIG. 36, a left end section 553l of the permanent magnet 553 (the part closer to the ink supply tube 13) is a north pole, and a right end section 553r (the part closer to the recording head 16) is a south pole.

The bobbin 554 is formed as a hollow prism having a rectangular cross-section, and is made of resin, such as polyamide (PA). The bobbin 554 is placed horizontally. The passage housing 533 and the permanent magnet 553 are fitted in the bobbin 554. The passage housing 533 and the permanent magnet 553 are fitted in the bobbin 554 along a direction perpendicular to the central axis of the bobbin 554 such that the valve seat 534, the valve body 548, the magnetic member 536, are the permanent magnet 553 are arranged in this order.

The excitation coil 555 is wound about the bobbin 554. If, in this state, the coil 555 is supplied with current, a magnetic field is generated in the bobbin 554, which magnetizes the magnetic member 536 in the passage housing 533. The direction in which the coil 555 is wound and the direction in which current flows are determined such that, when the magnetic member 536 is magnetized by supplying current to the coil 555, the left end section 536l of the magnetic member 536 becomes a north pole and the right end section 536r becomes a south pole.

When the coil 555 is not supplied with current, the magnetic member 536 of the passage valve 515 is attracted upward by the permanent magnet 553. Therefore, the elastic member 535 receives no pressing force from the magnetic member 536, and the valve seat contacting section 552 of the valve body 548 is separated from the valve seat 534. Accordingly, the first ink passage 545 is communicated with the ink chamber 542, and the passage valve 515 is opened (see FIG. 36).

Figure 38:
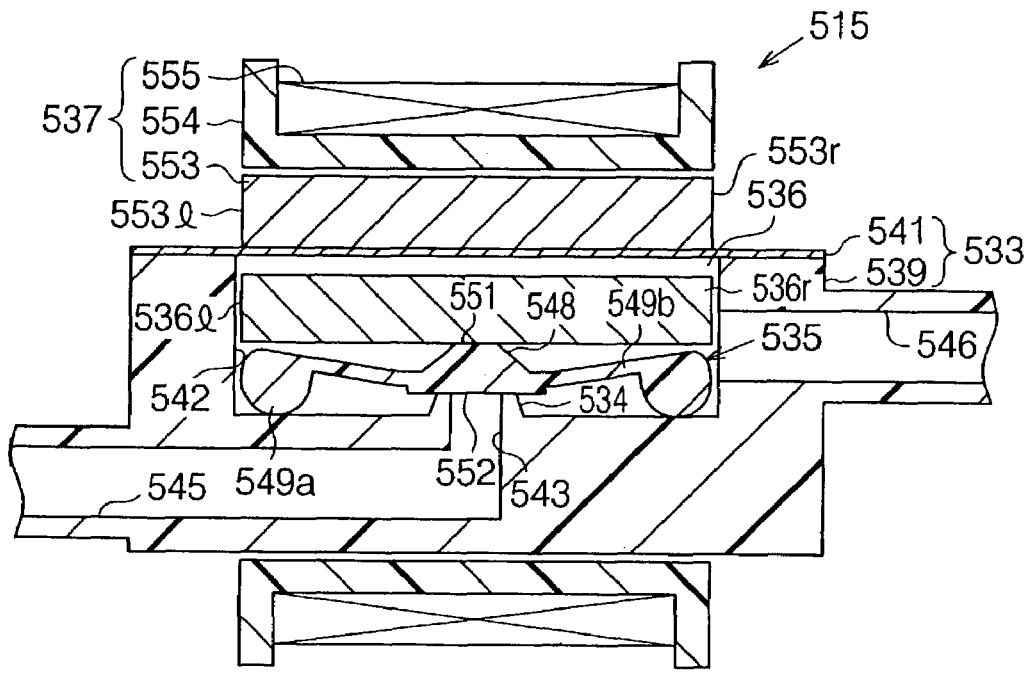
FIG. 38 is a schematic view showing an operation of a passage valve.

Referring to FIG. 38, when the coil 555 is supplied with current, a magnetic field is generated inside the bobbin 554. Accordingly, the left end section 536l of the magnetic member 536 becomes a north pole, and the right end section 536r becomes a south pole. As a result, the left end sections 536l, 553l of the magnetic member 536 and the permanent magnet 553 are the same poles, and the right end sections 536r, 553r are the same poles. The magnetic member 536 and the permanent magnet 553 repel each other. The magnetic member 536 moves downward (in a first direction) without changing its orientation. The magnetic member contacting section 551 of the valve body 548 of the elastic member 535 receives a pressing force of the magnetic member 536 from below. As a result, the thin section 549b of the elastic member 535 is elastically deformed, and the valve seat contacting section 552 contacts the valve seat 534 to close the first port 543. Accordingly, the first ink passage 545 is disconnected from the ink chamber 542, and the passage valve 515 is closed.

As described above, by supplying and stopping current to the coil 555, the magnetic member 536 is moved in a direction perpendicular to the central axis of the coil 555. Accordingly, the valve seat contacting section 552 contacts and separates from the valve seat 534. As a result, the passage valve 515 is opened and closed.

The fourteenth embodiment has the following advantages.

(1) In the fourteenth embodiment, the permanent magnet 553 is located outside the ink chamber 542. The magnetic member 536 in the ink chamber 542 is attracted by the permanent magnet 553 and moved upward so that the valve body 548 separates from the valve seat 534. Accordingly, the passage valve 515 is opened. Then, the coil 555 is supplied with current to magnetize the magnetic member 536 such that the magnetic member 536 and the permanent magnet 553 repel each other. This moves the magnetic member 536 downward so that the valve body 548 contacts the valve seat 534. Accordingly, the passage valve 515 is closed.

Therefore, when the passage valve 515 is opened and closed using the permanent magnet 553 and the coil 555, the permanent magnet 553 is located outside the ink chamber 542. Therefore, the influence of ink to the permanent magnet 553 does not need to be taken into consideration. Thus, the material of the permanent magnet 553 is easily selected. This adds to the flexibility of design of the passage valve 515.

(2) In the fourteenth embodiment, when opening the passage valve 515, the force by which the magnetic member 536 is attracted to the permanent magnet 553 is used. Thus, energy such as electricity is need to keep the passage valve 515 open. Therefore, the energy efficiency is improved. Further, the attraction force of the permanent magnet 553 prevents the magnetic member 536 from moving toward the valve seat 534 due to the pressure difference between a section upstream of the valve seat 534 and a section downstream of the valve seat 534. This prevents the passage valve 515 from being closed.

(3) In the fourteenth embodiment, when closing the passage valve 515, the magnetic member 536 is caused to repel the permanent magnet 553 and to move toward the valve seat 534 by supplying current to the coil 555.

Therefore, the time period of supplying current to the coil 555 can be shortened during the choke cleaning or the selective cleaning of an inkjet printer, in which a time for closing the passage valve is shorter than a time for opening the passage valve. This improves the energy efficiency.

(4) In the fourteenth embodiment, the valve seat 534, the valve body 548, the magnetic member 536, and the permanent magnet 553 are arranged in a direction perpendicular to the central axis of the coil 555.

Therefore, the magnetic member 536 is moved in a direction perpendicular to the central axis of the coil 555. This reduces the space in the direction of the central axis of the coil 555 of the passage valve 515.

(5) In the fourteenth embodiment, the valve body 548 is located between the valve seat 534 and the magnetic member 536. In response to movement of the magnetic member 536, the valve body 548 is caused to contact and separate from the valve seat 534.

Therefore, when opening and closing the passage valve 515, the magnetic member 536 does not directly contact the valve seat 534. Instead, the valve body 548 contacts the valve seat 534. Thus, to securely seal the valve seat 534, only the material of the valve body 548 needs to be selected to suit for sealing the valve seat 534. As a result, the material of the magnetic member 536 does not need to be suitable for sealing the valve seat 534. This facilitates the selection of the material of the magnetic member 536.

(6) In the fourteenth embodiment, the valve body 548 is made of an elastic material. Therefore, when closing the passage valve 515, the valve seat 534 closely contacts the valve body 548, which securely closes the passage valve 515.

(7) In the fourteenth embodiment, the valve body 548 and the urging portion 549 are integrally formed. Therefore, the number of parts is reduced and the structure is simplified. Accordingly, the productivity of the passage valve 515 is improved.

(8) In the fourteenth embodiment, the valve body 548 is shaped like a truncated cone. Therefore, even if the magnetic member 536 contacts the valve body 548 in various directions, the force applied to the valve body 548 from the magnetic member 536 is always concentrated at the same position. By matching the position at which the force is concentrated with the position at which the valve body 548 contacts the valve seat 534, the valve body 548 is caused to reliably contacts the valve seat 534. As a result, even if the magnetic member 536 contacts the valve body 548 in various directions, the valve seat 534 and the valve body 548 reliably contact each other and the passage valve 515 is securely closed.

(9) In the fourteenth embodiment, the ink chamber 542 is sealed with the film 541, and the film 541 is located between the permanent magnet 553 and the magnetic member 536.

Therefore, the permanent magnet 553 and the magnetic member 536 are located close to each other, with the film 541 in between, and the distance between the permanent magnet 553 and the magnetic member 536 is shortened. As a result, the magnetic member 536 is attracted by the permanent magnet 553 with a great attraction force. This improves the energy efficiency. When manufacturing the passage valve 515, the magnetic member 536 and the elastic member 535 are placed in the ink chamber 542 before the ink chamber 542 is sealed with the film 541. This permits the magnetic member 536 and the elastic member 535 to be easily placed in the ink passage, and thus improves the productivity.

A fifteenth embodiment of the present invention will now be described with reference to FIGS. 39 and 40. The differences from the fourteenth embodiment will mainly be discussed.

Figure 39:
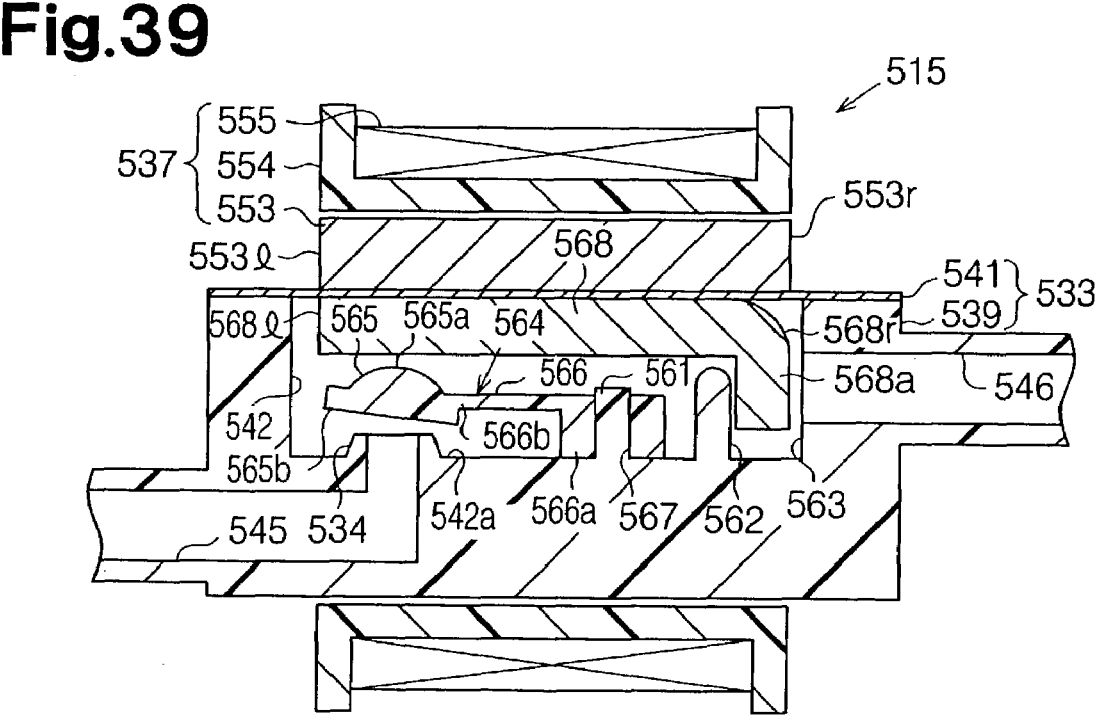
FIG. 39 is a partially cross-sectional view showing a passage valve according to a fifteenth embodiment.

As shown in FIG. 39, a passage valve 515 of this embodiment includes a passage forming member 539, in which an ink chamber 542 is defined. A first projection 561 and a second projection 562 are provided on a bottom 542*a* of the ink chamber 542*a*. The second projection 562 functions as restriction means. An accommodating space 563 is defined between the second projection 562 and a right inner wall of the ink chamber 542.

An elastic member 564 is formed of an elastic material like the elastic member 535 of the fourteenth embodiment. The elastic member 564 includes a valve body 565 and an urging portion 566. The upper portion of the valve body 565 is formed semi-spherical and forms a magnetic member contacting section 565*a*. The lower surface of the valve body 565 is formed flat and circular, and forms a valve seat contacting section 565*b*. An urging portion 566 includes a support section 566*a* located right to the valve body 565, and a plate-like thin section 566*b* for connecting the support portion 566*a* with the valve body 565. A vertical fit hole 567 is formed in the support portion 566*a*.

The elastic member 564 is accommodated in the ink chamber 542. The first projection 561 is fitted in the fit hole of the support portion 566*a*, and the lower surface of the support portion 566*a* contacts the bottom 542*a* of the ink chamber 542. Therefore, the magnetic member contacting section 565*a* and the valve seat contacting section 565*b* of the elastic member 564 are supported by the support section 566*a* in a cantilever manner. In this state, the valve seat contacting section 565*b* and the valve seat 534 of the ink chamber 542 are vertically stacked.

Therefore, if the valve body 565 is pressed downward in this state, the thin section 566*b* of the elastic member 564 is elastically deformed and the valve body 565 is moved downward. Accordingly, the valve seat contacting section 565*b* contacts the valve seat 534. As a result, the first port 543 is closed. When the downward pressing of the valve body 565 is ceased, the thin section 566*b* returns to the initial position by the own elasticity, which moves the valve body 565 upward. Accordingly, the valve seat contacting section 565*b* is separated from the valve seat 534. As a result, the first port 543 is opened.

Like the magnetic member 536 of the fourteenth embodiment, a magnetic member 568 is formed of a material that is magnetized in a magnetic field and is shaped as a rectangular parallelepiped. In this embodiment, the magnetic member 568 has a bent section 568*a* that is located at the right end section and bent downward. Then, the magnetic member 568 is accommodated in the ink chamber 542 and is located between the film 541 and the elastic member 564. The bent section 568*a* of the magnetic member 568 is located below the accommodating space 563 of the ink chamber 542. The bent section 568*a* and the second projection 562 form a restriction member for restricting the lateral movement of the magnetic member 568.

When the coil 555 is supplied with current, a magnetic field is generated inside the bobbin 554. Accordingly, a left end section 568*l* of the magnetic member 536 becomes a north pole, and a right end section 568*r* becomes a south pole.

When the coil 555 is not supplied with current, the magnetic member 536 of the passage valve 515 is attracted upward by the permanent magnet 553, which faces the magnetic member 568, with the film 541 in between. Therefore, the elastic member 564 receives no pressing force from the magnetic member 568, and the valve seat contacting section 565*b* of the elastic member 564 is separated from the valve seat 534. Accordingly, the first ink passage 545 is communicated with the ink chamber 542, and the passage valve 515 is opened (see FIG. 39).

Figure 40:
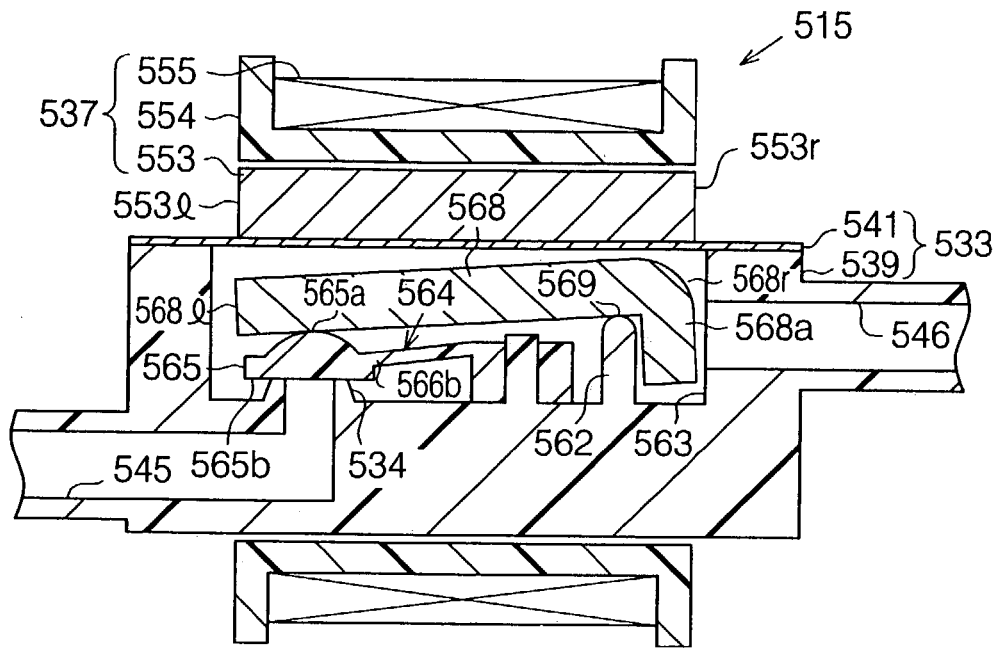
FIG. 40 is a schematic view showing an operation of a passage valve.

Referring to FIG. 40, when the coil 555 is supplied with current, a magnetic field is generated inside the bobbin 554. Accordingly, the left end section 568*l* of the magnetic member 568 becomes a north pole, and the right end section 568*r* becomes a south pole. As a result, the left end sections 553*l*, 568*l* of the magnetic member 568 and the permanent magnet 553 are the same poles, and the right end sections 553*r*, 568*r* are the same poles. The magnetic member 568 and the permanent magnet 553 repel each other. Accordingly, the lower surface of the magnetic member 568 contacts the second projection 562, and the left end section 568*l* of the magnetic member 568 is rotated downward about the contacting point 569 functioning as a fulcrum. The lower surface of the left end section 568*l* of the magnetic member 568 contacts a magnetic member contacting section 565*a* of the elastic member 564, and the magnetic member contacting section 565*a* receives a downward force.

As a result, the elastic member 564 is elastically deformed, and the valve seat contacting section 565*b* contacts the valve seat 534 to close the first port 543. Accordingly, the first ink passage 545 is disconnected from the ink chamber 542, and the passage valve 515 is closed.

In addition to the advantages (1) to (7), and (9) of the fourteenth embodiment, the fifteenth embodiment has the following advantages.

(10) In the fifteenth embodiment, the upper portion of the valve body 565 is semi-spherical. Therefore, even if the magnetic member 568 contacts the valve body 565 in various directions, the force applied to the valve body 565 from the magnetic member 568 is always concentrated at the same position. By matching the position at which the force is concentrated with the position at which the valve body 565 contacts the valve seat 534, the valve body 565 is caused to reliably contacts the valve seat 534. As a result, the valve seat 534 and the valve body 565 reliably contact each other to close the passage valve 515.

(11) In the fifteenth embodiment, the second projection 562 is provided in the ink chamber 542 of the passage housing 533, and the magnetic member 568 has the bent section 568*a*. The downward movement of the right end section 568*r* of the magnetic member 568 is prevented by the contacting point 569 between the lower surface of the bent section 568*a* and the second projection 562. Therefore, by supplying and stopping current to the coil 555, the magnetic member 568 rotates about the contacting point 569 and causes the valve body 565 to contact and separate from the valve seat 534. This stabilizes the movement of the magnetic member 568 and thus permits the passage valve 515 to be reliably opened and closed.

A sixteenth embodiment of the present invention will now be described with reference to FIGS. 41 and 42. The differences from the fourteenth embodiment will mainly be discussed.

Figure 41:
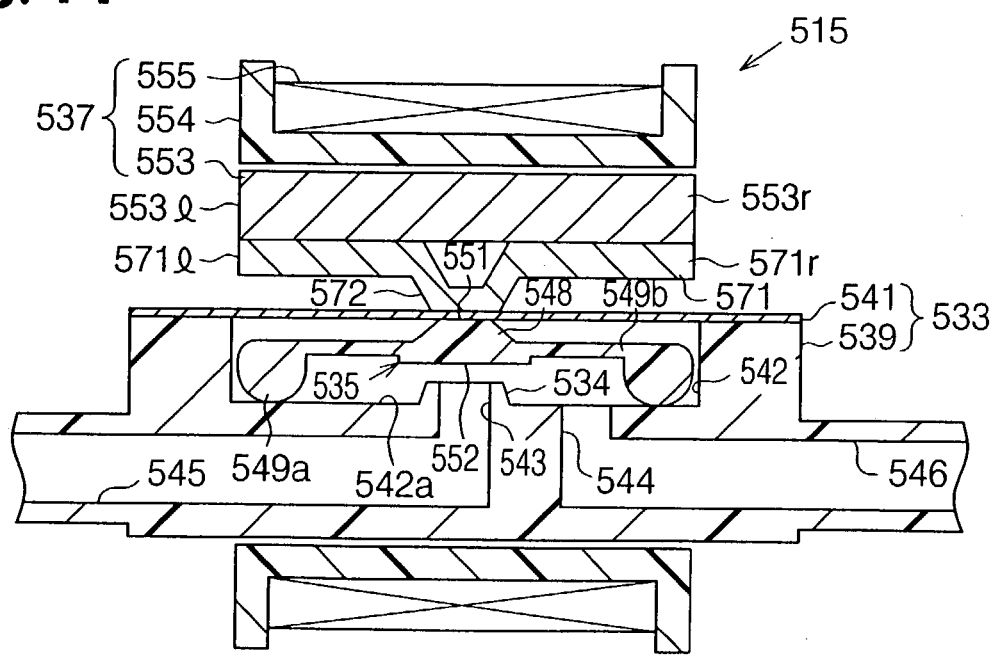
FIG. 41 is a partially cross-sectional view showing a passage valve according to a sixteenth embodiment.

As shown in FIG. 41, a passage valve 515 of this embodiment has a magnetic member 571 located outside an ink chamber 542. The depth of the ink chamber 542 of a passage forming member 539 is less than that of the fourteenth embodiment. Specifically, the depth is determined such that, when an elastic member 535 is accommodated in the ink chamber 542, a magnetic member contacting section 551 of a valve body 548 of the elastic member 535, which is not elastically deformed, contacts a film 541, a pair of support sections 549*a* of the elastic member 535 contact a bottom 542*a* of the ink chamber 542. In the fourteenth embodiment, the second port 544 of the passage forming member 539 is formed in the right inner wall 542*b* of the ink chamber 542. In this embodiment, a second port 544 is formed in the bottom 542*a* of the ink chamber 542.

Like the magnetic member 536 of the fourteenth embodiment, the magnetic member 571 is formed of a material that is magnetized in a magnetic field and is shaped as a rectangular parallelepiped. In this embodiment, the magnetic member 571 has a contacting section 572 projecting downward from the center. The magnetic member 571 is located between a permanent magnet 553 and the film 541.

When the coil 555 is supplied with current, a magnetic field is generated inside the bobbin 554. Accordingly, a left end section 571*l* of the magnetic member 571 becomes a north pole, and a right end section 571*r* becomes a south pole.

When the coil 555 is not supplied with current, the magnetic member 571 of the passage valve 515 is attracted upward (in a second direction) by the permanent magnet 553. Therefore, the elastic member 535 receives no pressing force from the magnetic member 571, and the valve seat contacting section 552 of the elastic member 535 is separated from the valve seat 534. Accordingly, the first ink passage 545 is communicated with the ink chamber 542, and the passage valve 515 is opened (see FIG. 41).

Figure 42:
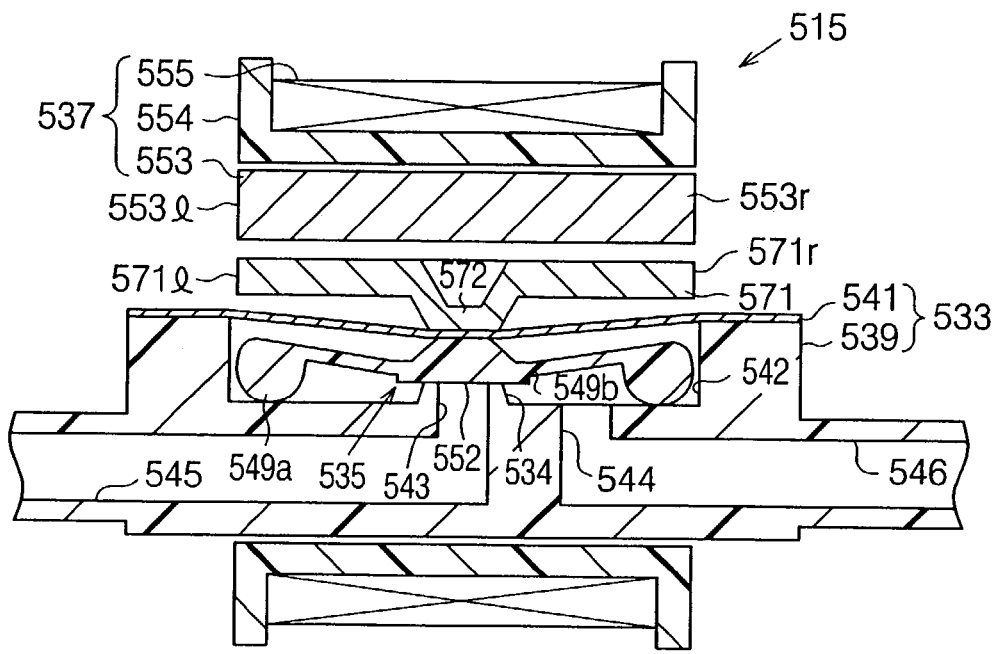
FIG. 42 is a schematic view showing an operation of a passage valve.

Referring to FIG. 42, when the coil 555 is supplied with current, a magnetic field is generated inside the bobbin 554. Accordingly, the left end section 571*l* of the magnetic member 571 becomes a north pole, and the right end section 571*r* becomes a south pole. As a result, the left end sections 553*l*, 571*l* of the magnetic member 571 and the permanent magnet 553 are the same poles, and the right end sections 553*r*, 571*r* are the same poles. The magnetic member 571 and the permanent magnet 553 repel each other. Then, the lower surface of the contacting section 572 of the magnetic member 571 presses the film 541 downward. As a result, the magnetic member contacting section 551 of the elastic member 535 is pressed downward through the film 541, which elastically deforms the thin section 549*b* of the elastic member 535. As a result, the valve seat contacting section 552 contacts the valve seat 534. Accordingly, the first port 543 is closed, and the first ink passage 545 is disconnected from the ink chamber 542. As a result, the passage valve 515 is closed.

In addition to the advantages (1) to (8) of the fourteenth embodiment, the sixteenth embodiment has the following advantages.

(12) In the sixteenth embodiment, the ink chamber 542 is sealed with the film 541, and the film 541 is located between the magnetic member 571 and the film 541.

Therefore, the magnetic member 571 is placed outside the ink chamber 542, and the influence of the ink in the ink chamber 542 to the magnetic member 571 does not need to be taken into consideration. Thus, the material of the magnetic member 572 is easily selected. This adds to the flexibility of design of the passage valve 515. When manufacturing the passage valve 515, the elastic member 535 is placed in the ink chamber 542 before the ink chamber 542 is sealed with the film 541. This permits the elastic member 535 to be easily placed in the ink passage, and thus improves the productivity.

(13) In the sixteenth embodiment, when closing the passage valve 515, the magnetic member 571 presses the film 541 downward at the contacting section 572, which partly contacts the film 541. Therefore, the area at which the magnetic member 571 contacts the film 541 is reduced. Thus, the film 541 is easily deformed by the contacting section 572. Accordingly, the valve body 548 is pressed downward through the film 541 and contacts the valve seat 534.

A seventeenth embodiment of the present invention will now be described with reference to FIGS. 43 and 44. The differences from the fourteenth embodiment will mainly be discussed.

Figure 43:
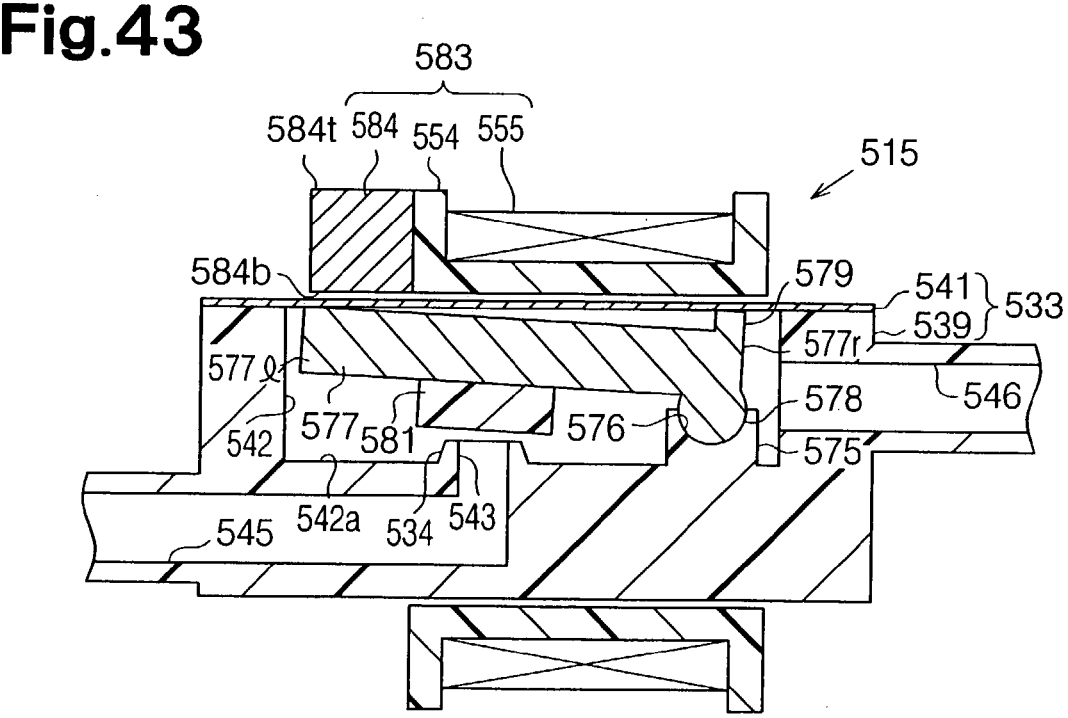
FIG. 43 is a partially cross-sectional view showing a passage valve according to a seventeenth embodiment.

As shown in FIG. 43, a passage valve 515 of this embodiment includes a passage forming member 539, in which an ink chamber 542 is defined. A third projection 575 is provided on a bottom 542*a* of the ink chamber 542*a*. A substantially semi-spherical recess 576 is formed in the upper surface of the third projection 575. Like the magnetic member 536 of the fourteenth embodiment, the magnetic member 577 is formed of a material that is magnetized in a magnetic field and is shaped as a rectangular parallelepiped.

In this embodiment, the magnetic member 577 has a substantially semi-spherical projection 578 projecting downward from the right end section. Further, the magnetic member 577 includes a projection 579 projection upward from the right end section.

The magnetic member 577 is accommodated in the ink chamber 542 such that the projection 578 is engaged with the recess 576, and the projection 579 contacts the film 541. Therefore, in the ink chamber 542, the magnetic member 577 pivots about the projection 578 functioning as a fulcrum. Like the elastic member 535 of the fourteenth embodiment, a valve body 581 is formed of an elastic material, and is shaped as a rectangular parallelepiped. The valve body 581 is fixed to the lower surface of the magnetic member 577.

The valve body 581 is substantially aligned with a valve seat 534 of the ink chamber 542 in the vertical direction. Therefore, when the magnetic member 577 is pivoted toward the film 541 about the projection 578 functioning as a fulcrum, the valve body 581 is separated from the valve seat 534. When the magnetic member 577 is pivoted toward the valve seat 534 about the projection 578 functioning as a fulcrum, the valve body 581 contacts the valve seat 534, and the first port 543 is closed.

A permanent magnet 584 of a magnetic member driving mechanism 583 is shaped as a rectangular parallelepiped. The permanent magnet 584 is smaller than the magnetic member 577 in the lateral direction. In this embodiment, the permanent magnet 584 is not located in the bobbin 554 but is located adjacent to and left of the bobbin 554. The permanent magnet 584 faces a left end section 577*l* of the magnetic member 577, with the film 541 in between. The remainder of the magnetic member 577 face the bobbin 554, with the film 541 in between. The permanent magnet 584 is magnetized such that an upper section 584*t* as viewed in FIG. 43 is a south pole, and a bottom section 584*b* as viewed in FIG. 43 is a north pole.

When the coil 555 is supplied with current, a magnetic field is generated inside the bobbin 554. Accordingly, the left end section 577*l* of the magnetic member 577 becomes a north pole, and a right end section 577*r* becomes a south pole.

When the coil 555 is not supplied with current, the left end section 577*l* of the magnetic member 577 is attracted upward by the permanent magnet 584. Accordingly, the magnetic member 577 is pivoted toward the film 541 about the projection 578 functioning as a fulcrum. Therefore, the valve body 581 is separated from the valve seat 534. Accordingly, the first ink passage 545 is communicated with the ink chamber 542, and the passage valve 515 is opened (see FIG. 43).

Figure 44:
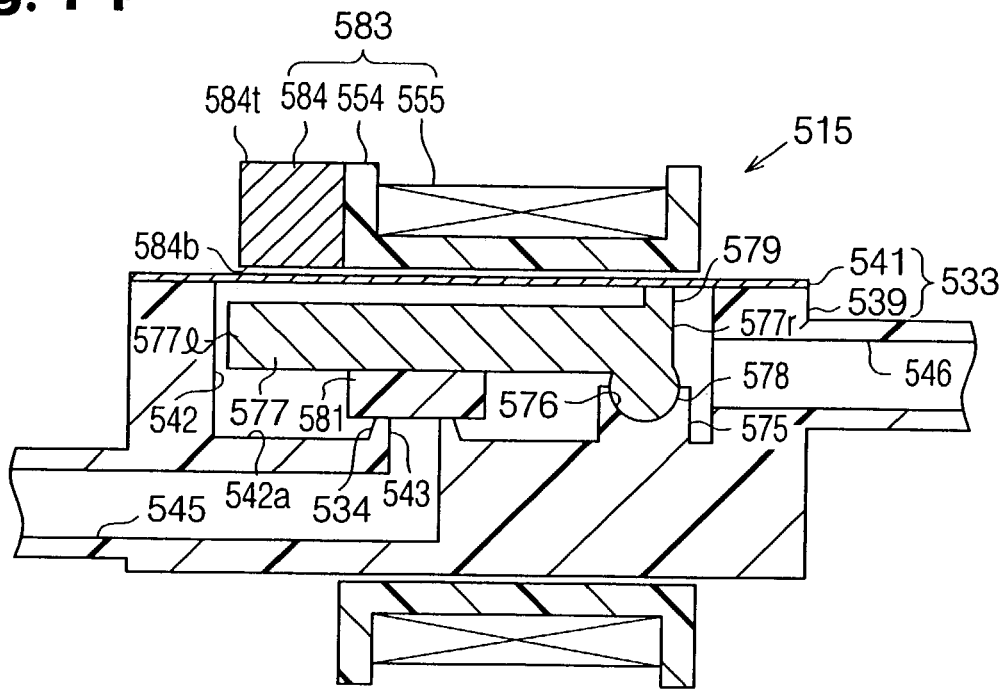
FIG. 44 is a schematic view showing an operation of a passage valve.

Referring to FIG. 44, when the coil 555 is supplied with current, a magnetic field is generated inside the bobbin 554. Accordingly, the left end section 577*l* of the magnetic member 577 has the same pole as the bottom section 584*b* of the permanent magnet 584. The magnetic member 577 and the permanent magnet 584 therefore repel each other. Then, the magnetic member 577 is pivoted toward the valve seat 534 about the projection 578 functioning as a fulcrum. Therefore, the valve body 581 contacts the valve seat 534. Accordingly, the first port 543 is closed, and the first ink passage 545 is disconnected from the ink chamber 542. As a result, the passage valve 515 is closed.

In addition to the advantages (1) to (6), and (9) of the fourteenth embodiment, the seventeenth embodiment has the following advantages.

(14) In the seventeenth embodiment, the third projection 575 is provided in the ink chamber 542 of the passage forming member 539, and the projection 578 is provided on the magnetic member 577. The recess 576 of the third projection 575 is engaged with the projection 578 functioning as a fulcrum, thereby permitting the magnetic member 577 to pivot about the projection 578. Therefore, by supplying and stopping current to the coil 555, the magnetic member 577 rotates about the projection 578 and causes the valve body 581 to contact and separate from the valve seat 534. This stabilizes the movement of the magnetic member 577 and thus permits the passage valve 515 to be reliably opened and closed.

The fourteenth to seventeenth embodiments may be modified as follows.

In the fourteenth to seventeenth embodiments, the first ink passage 545 is connected to the ink supply tube 13, and the second ink passage 546 is connected to the recording head 16. However, the first ink passage 545 may be connected to the recording head 16, and the second ink passage 546 may be connected to the ink supply tube 13.

In the fourteenth to seventeenth embodiments, the valve bodies 548, 565, 581 are located between the magnetic member 536, 568, 571, 577 and the valve seat 534. However, the valve bodies 548, 565, 581 may be omitted. In this case, the magnetic members 536, 568, 571, 577 directly or with the film 541 in between acts on the valve seat 534.

In the fourteenth to seventeenth embodiments, the elastic members 535, 564 have the urging portions 549, 566 and the valve bodies 548, 565, which are formed integrally. However, the urging portions 549, 566 may be independently formed from the valve bodies 548, 565. In this case, the valve bodies 548, 565 may be urged away from the valve seat 534 with a coil spring.

In the fourteenth to seventeenth embodiments, the valve seat 534 may be formed separately from the passage forming member 539. In this case, the valve seat 534 is formed of an elastic material so that the valve seat 534 closely contacts the valve bodies 548, 565, 581.

In the fourteenth to sixteenth embodiments, the valve body 548 may be fixed to the magnetic member 536 and the film 541. In this case, the elastic member 535 may include only the valve body 548, and the urging portion 549 may be omitted.

In the fourteenth to seventeenth embodiments, the passage valve 515 is used in the inkjet printer 11, in which the ink cartridge 12 is not mounted on the carriage 14. However, the passage valve 515 is applicable to inkjet printers in which the ink cartridge 12 is mounted on the carriage 14.

In the fourteenth to seventeenth embodiments, the passage valve 515 is fixed to the carriage 14. However, the passage valve 515 may be located at a predetermined position in the ink passage from the ink supply tube 13 to the ink cartridge 12.

An eighteenth embodiment of the present invention will now be described. This embodiment is the same as the fourteenth embodiment except for that the permanent magnet 553 of the fourteenth embodiment is replaced with a magnetic member 553. Thus, like or the same reference numerals are given to those components that are like or the same as the corresponding components of the fourteenth embodiment. Also, the eighteenth embodiment will be described by referring to FIGS. 35 to 38. In the eighteenth embodiment, two magnetic members 536, 553 are provided. The magnetic member 536 will be referred to as a movable magnetic member or a first magnetic member. The magnetic member 553 will be referred to as a fixed magnetic member or a second magnetic member.

As in the fourteenth embodiment, the movable magnetic member 536 is shaped as a rectangular parallelepiped and is made of a material that is magnetized in a magnetic field. The size of the movable magnetic member 536 is substantially same as that of the elastic member 535. The movable magnetic 536 is accommodated in the ink chamber 542 and is held between the elastic member 535 and the film 541. The thickness of the movable magnetic member 536 is determined such that, when the elastic member 535 is not deformed, the upper surface 536a of the magnetic member 536 contacts the film 541, and the lower surface 536b contacts the magnetic member contacting section 551.

The weight of the movable magnetic member 536 is determined such that, when the movable magnetic member 536 is placed on the elastic member 535, the thin section 539b of the elastic member 535 is not elastically deformed.

A magnetic member driving mechanism 537 includes the fixed magnetic member 553, which functions as a second magnetic member, a bobbin 554, and an excitation coil 555. The fixed magnetic member 553 has substantially the same size and shape as the movable magnetic member 536. The lower surface 553a of the fixed magnetic member 553 contacts the film 541 from the outside of the ink chamber 542. That is, the fixed magnetic member 553 faces the movable magnetic member 536, with the film 541 in between. Since the fixed magnetic member 553 is located outside, but not inside, the ink chamber 542, the fixed magnetic member 553 does not contact ink.

The excitation coil 555 is wound about the bobbin 554. The coil 555 surrounds the valve seat 534, the valve body 548, the movable magnetic member 536, and the fixed magnetic member 553. When the coil 555 is supplied with current, a magnetic field is generated in the bobbin 554, which magnetizes the movable magnetic member 536 and the fixed magnetic member 553. The direction in which the coil 555 is wound and the direction in which current flows are determined such that, when the magnetic members 536, 553 are magnetized by supplying current to the coil 555, left end sections 536l, 553l of the magnetic members 536, 553 become north poles and right end sections 536r, 553 become south poles.

When the coil 555 is not supplied with current, the movable magnetic member 536 receives no external force, and the elastic member 535 receives the weight of the movable magnetic member 536. In this state, the thin section 549b of the elastic member 535 is not elastically deformed. Therefore, the valve seat contacting section 552 of the valve body 548 is separated from the valve seat 534. Accordingly, the first ink passage 545 is communicated with the ink chamber 542, and the passage valve 515 is opened (see FIG. 36).

Referring to FIG. 38, when the coil 555 is supplied with current, a magnetic field is generated inside the bobbin 554. Accordingly, the left end sections 536l, 553l of the movable magnetic member 536 and the fixed magnetic member 553 become north poles, and the right end sections 536r, 553r become south poles. As a result, the left end sections 536l, 553l of the movable magnetic member 536 and the fixed magnetic member 553 are the same poles, and the right end sections 536r, 553r are the same poles. The magnetic members 536, 553 repel each other. The movable magnetic member 536 receives a downward repelling force. Accordingly, the magnetic member contacting section 551 of the valve body 548 of the elastic member 535 receives a downward pressing force from the movable magnetic member 536. When the pressing force is greater than the upward urging force of the urging portion 549 of the elastic member 535, the thin section 549b is elastically deformed, and the valve seat contacting section 552 contacts the valve seat 534. As a result, the first port 543 is closed. Accordingly, the first ink passage 545 is disconnected from the ink chamber 542, and the passage valve 515 is closed.

As described above, by supplying and stopping current to the coil 555, the movable magnetic member 536 is moved in a direction perpendicular to the central axis of the coil 555. Accordingly, the valve seat contacting section 552 of the valve body 548 of the elastic member 535 contacts and separates from the valve seat 534. As a result, the passage valve 515 is opened and closed.

In addition to the advantages of the fourteenth embodiment, the eighteenth embodiment provides the following advantages.

In the eighteenth embodiment, the movable magnetic member 536 and fixed magnetic member 553 are located inward of the coil 555 and are arranged in a direction perpendicular to the central axis of the coil 555. The movable magnetic member 536 and the fixed magnetic member 553 are magnetized to repel each other. The movable magnetic member 536 is moved toward the valve seat 534 by the repelling force so that the passage valve 515 is closed.

Therefore, the passage valve 515 is opened and closed by utilizing the repelling force of the movable magnetic member 536 and the fixed magnetic member 553. In other words, the passage valve 515 is opened and closed without using permanent magnets. As a result, the materials for the movable magnetic member 536 and the fixed magnetic member 553 can be selected from a wider range of materials compared to permanent magnets. This adds to the flexibility of design of the passage valve 515. Further, the movable magnetic member 536 and the fixed magnetic member 553 are located inward of the coil 555 and are arranged in a direction perpendicular to the central axis of the coil 555. Therefore, the moving range of the movable magnetic member 536 does not exceed the outer dimension of the coil 555. Accordingly, the size of the entire passage valve 515 is reduced.

The permanent magnet 553 of the fifteenth to seventeenth embodiments shown in FIGS. 39 to 44 may be replaced with the fixed magnetic member 553 of the eighteenth embodiment. In this case, in addition to the advantages of fifteenth to seventeenth embodiments, the advantages of the eighteenth embodiment are obtained.

A nineteenth embodiment of the present invention will now be described with reference to FIGS. 45 and 46. The nineteenth embodiment is different from the eighteenth embodiment in the structure of the magnetic member driving mechanism 537 of the passage valve 515. Thus, like or the same reference numerals are given to those components that are like or the same as the corresponding components of the third embodiment.

Figure 45:
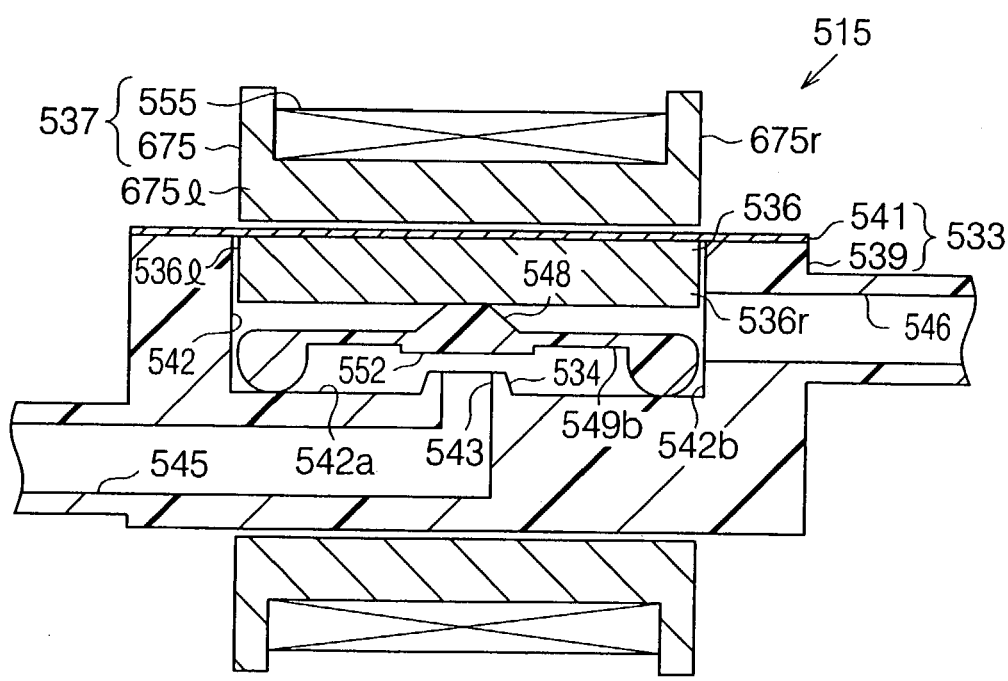
FIG. 45 is a partially cross-sectional view showing a passage valve according to an eighteenth embodiment.

As shown in FIG. 45, a magnetic member driving mechanism 537 of a passage valve 515 according to this embodiment does not have the fixed magnetic member 553. The magnetic member driving mechanism 537 only includes a bobbin 675 and a coil 555. The bobbin 675 of this embodiment is made of a magnetic material such as a magnetic soft-ion. A valve seat 534, a valve body 548, and a movable magnetic member 536 are fitted in the bobbin 675. The valve seat 534, the valve body 548, the movable magnetic member 536 are arranged in this order along a direction perpendicular to the central axis of the bobbin 675. The position of the movable magnetic member 536 is closer to the inner wall of the bobbin 675 than to the central axis of the bobbin 675.

When the coil 555, which is wound about the outer circumference of the bobbin 675, is supplied with current, a magnetic field is generated inside the coil 555. Accordingly, the bobbin 675, which is formed of a magnetic material, and the movable magnetic member 536 are magnetized. The direction in which the coil 555 is wound and the direction in which current flows are determined such that, when the movable magnetic members 536 and the bobbin 675 are magnetized by supplying current to the coil 555, left end sections 536l, 675l as viewed in FIG. 45 become north poles and right end sections 536r, 675r become south poles.

When the coil 555 is not supplied with current, the movable magnetic member 536 receives no external force, and the elastic member 535 receives the weight of the movable magnetic member 536. In this state, the thin section 549b of the elastic member 535 is not elastically deformed. Therefore, the valve seat contacting section 552 of the valve body 548 is separated from the valve seat 534. Accordingly, the first ink passage 545 is communicated with the ink chamber 542, and the passage valve 515 is opened (see FIG. 45).

Figure 46:
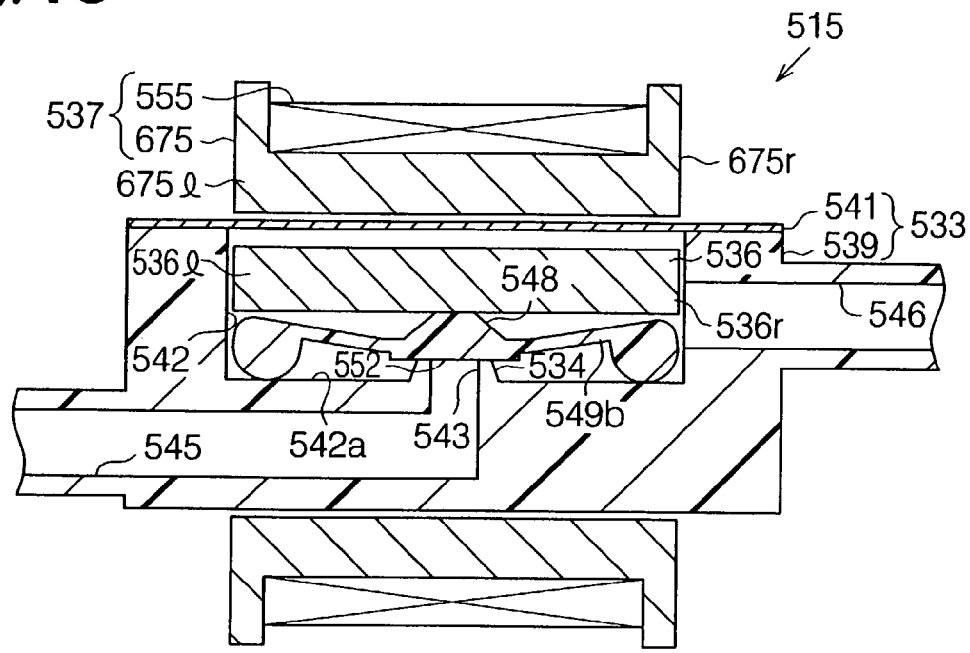
FIG. 46 is a schematic view showing an operation of a passage valve.

Referring to FIG. 46, when the coil 555 is supplied with current, a magnetic field is generated inside the coil 555. Accordingly, the left end sections 536l, 675l of the movable magnetic member 536 and the bobbin 675 become north poles, and the right end sections 536r, 675r become south poles. As a result, the left end sections 536l, 653l of the movable magnetic member 536 and the bobbin 675 are the same poles, and the right end sections 536r, 653r are the same poles. The movable magnetic members 536 and the bobbin 675 repel each other. Since the movable magnetic member 536 is closer to the inner wall of the bobbin 675 than to the central axis of the bobbin 675, the movable magnetic member 536 moves toward the central axis of the bobbin 675. Therefore, the movable magnetic member 536 receives a downward repelling force as viewed in FIG. 45. Accordingly, the magnetic member contacting section 551 of the valve body 548 of the elastic member 535 receives a downward pressing force from the movable magnetic member 536. When the pressing force is greater than the upward urging force of the urging portion 549 of the elastic member 535, the thin section 549b is elastically deformed, and the valve seat contacting section 552 contacts the valve seat 534. As a result, the first port 543 is closed. Accordingly, the first ink passage 545 is disconnected from the ink chamber 542, and the passage valve 515 is closed.

The nineteenth embodiment has the following advantages.

In the nineteenth embodiment, the bobbin 675 is made of a magnetic material. The valve seat 534, the valve body 548, and the movable magnetic member 536 are fitted in the bobbin 675. The valve seat 534, the valve body 548, and the movable magnetic member 536 are arranged in this order along a direction perpendicular to the central axis of the bobbin 675. By supplying current to the coil 555, the bobbin 675 and the movable magnetic member 536 are magnetized to repel each other. The movable magnetic member 536 is moved toward the valve seat 534 by the repelling force so that the passage valve 515 is closed.

Therefore, the passage valve 515 is opened and closed by utilizing the repelling force of the movable magnetic member 536 and the bobbin 675. In other words, the passage valve 515 is opened and closed without using permanent magnets. As a result, the materials for the movable magnetic member 536 and the bobbin 675 can be selected from a wider range of materials compared to permanent magnets. This adds to the flexibility of design of the passage valve 515. Further, the movable magnetic member 536 and the bobbin 675 are located inward of the coil 555 and are arranged in a direction perpendicular to the central axis of the coil 555. Accordingly, the size of the entire passage valve 515 is reduced.

In the nineteenth embodiment, the bobbin 675 is made of a magnetic material. Therefore, the bobbin 675 is used as a magnetic member for repelling the movable magnetic member 536 when the coil 555 is supplied with current. This reduces the number of the parts in the entire device and simplifies the structure. Accordingly, the productivity is improved.

In the nineteenth embodiment, the ink chamber 542 is sealed with the film 541, and the film 541 is located between the bobbin 675 and the movable magnetic member 536.

Therefore, the bobbin 675 and the movable magnetic member 536 are located close to each other, with the film 541 in between, and the distance between the bobbin 675 and the movable magnetic member 536 is shortened. As a result, when closing the passage valve 515, a great repelling force is generated between the movable magnetic member 536 and the bobbin 675, which improves the energy efficiency. When manufacturing the passage valve 515, the movable magnetic member 536 and the elastic member 535 are placed in the ink chamber 542 before the ink chamber 542 is sealed with the film 541. This permits the movable magnetic member 536 and the valve body 548 to be easily placed in the ink passage, and thus improves the productivity.

Figure 47:
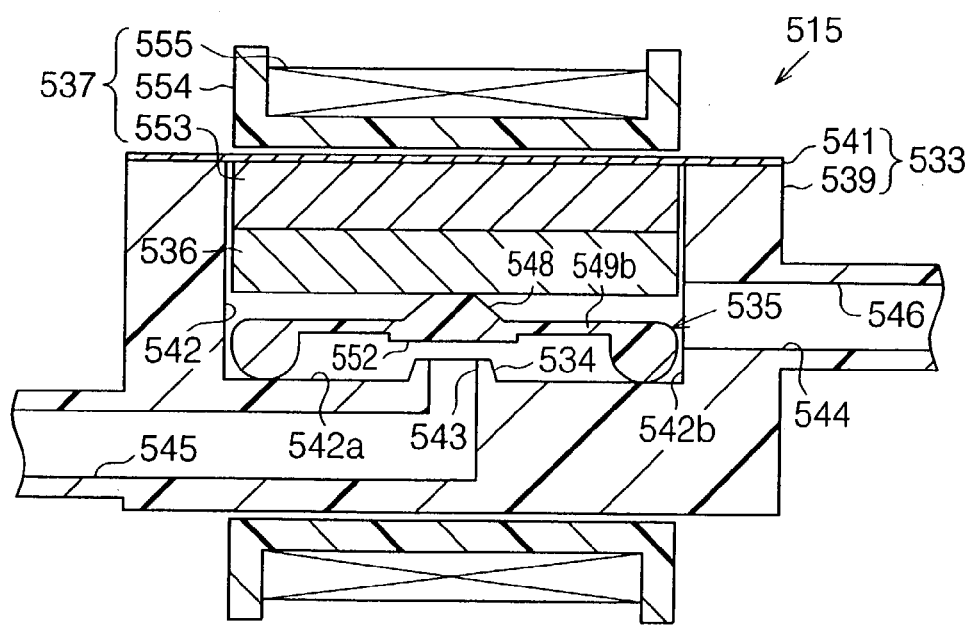
FIG. 47 is a partially cross-sectional view showing a passage valve according to a nineteenth embodiment.
Figure 48:
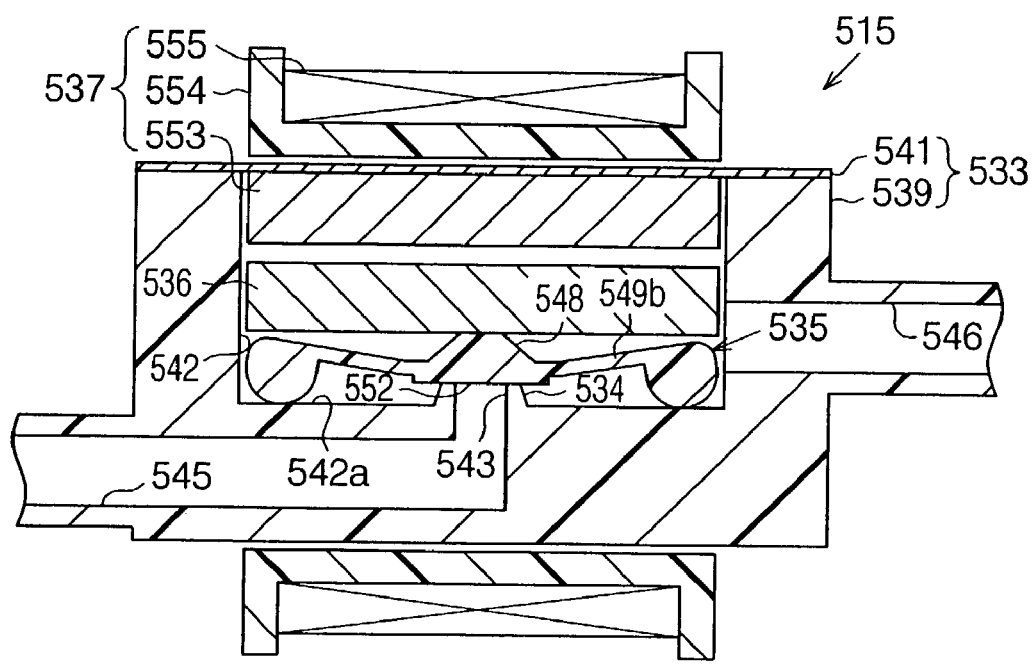
FIG. 48 is a schematic view showing an operation of a passage valve.

As shown in FIG. 47, the fixed magnetic member 553 may be located in the passage, or below the film 541. In this case, as in the nineteenth embodiment, the fixed magnetic member 553 and the movable magnetic body 536 are caused to repel each other by supplying current to the coil 555. At this time, the valve body 548 of the elastic member 535 contacts the valve seat 534. Accordingly, the first ink passage 545 is disconnected from the ink chamber 542, and the passage valve 515 is closed.

A twentieth embodiment of the present invention will now be described with reference to FIGS. 49 to 54.

A carriage 14 is mounted and reciprocates on a guide member 21, which extends along a lateral direction of a sheet of recording paper (main operation direction). A passage valve 715 is attached to a carriage 14. The passage valve 715 forcibly changes the flow rate of ink supplied from an ink supply tube 13 to a recording head 16.

Figure 50:
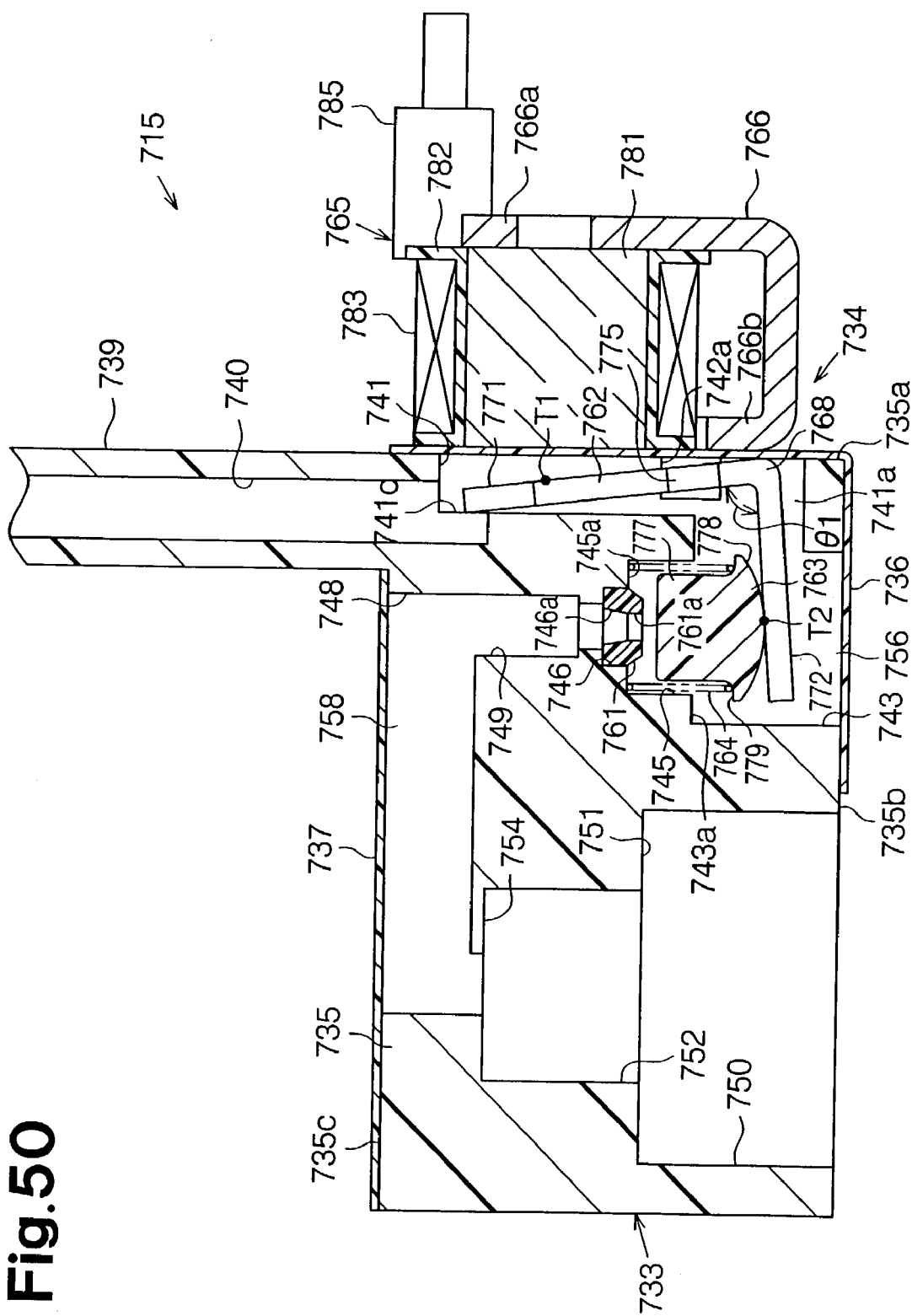
FIG. 50 is a cross-sectional view showing a passage valve.

The passage valve 715 shown in FIG. 50 includes a passage housing 733 and a valve device 734. The passage housing 733 guides ink supplied from the ink supply tube 13 to the recording head 16. The valve device 734 opens and closes the passage in the passage housing 733.

Figure 49:
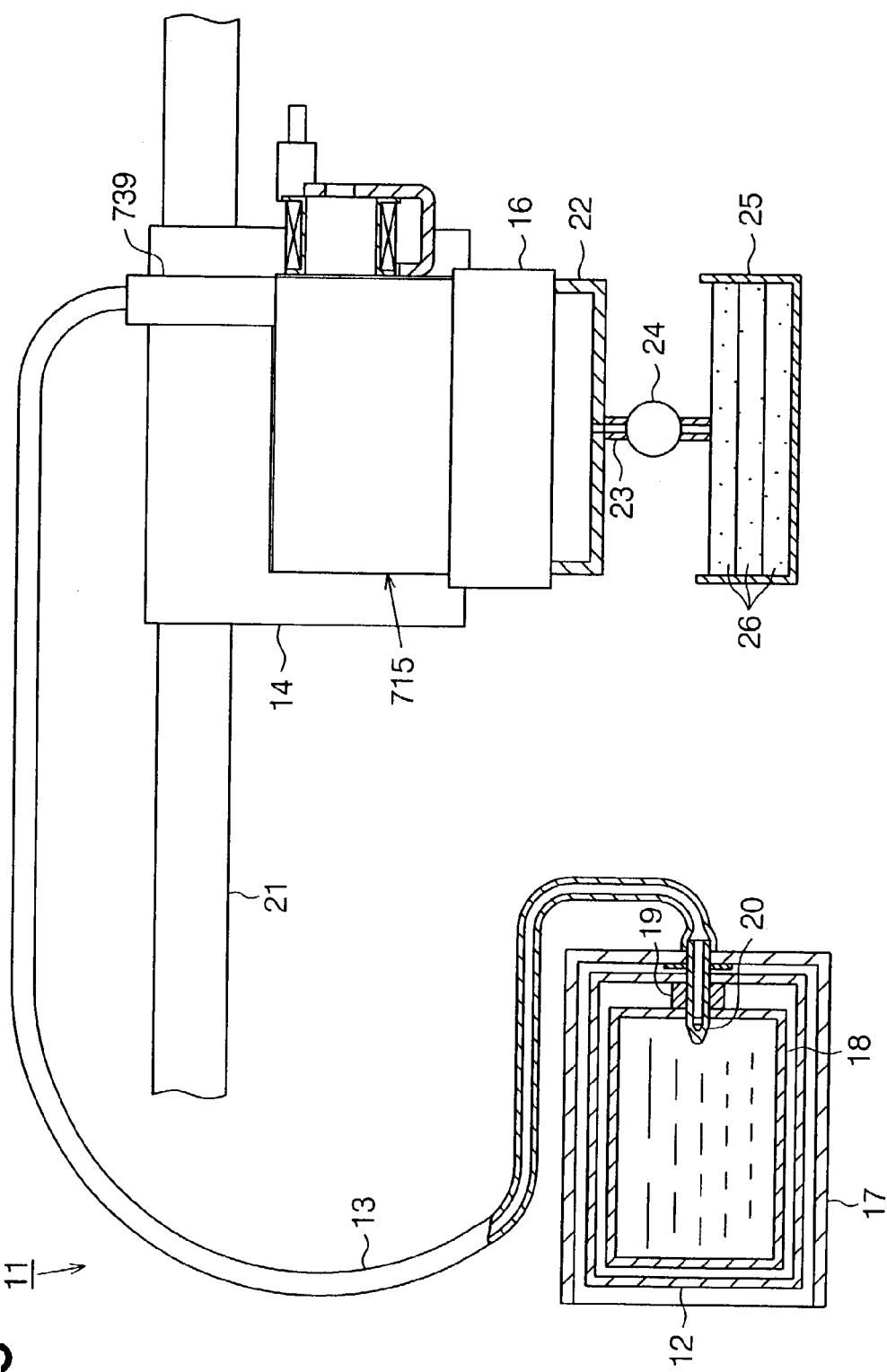
FIG. 49 is a schematic view showing a printer according to a twentieth embodiment.

The passage housing 733 is fixed to the carriage 14 and includes a passage forming member 735, a first film 736, and a second film 737. The passage forming member 735 is formed of a resin material such as polypropylene or polyethylene and is shaped as a rectangular parallelepiped. The passage forming member 735 has an ink inlet 739 projection upward. As shown in FIG. 49, the ink inlet 739 is connected to the ink supply tube 13. As shown in FIG. 50, an ink introducing hole 740 is formed in the ink inlet 739. Ink from the ink supply tube 13 flows in the ink inlet 739 through the ink introducing hole 740.

Figure 51:
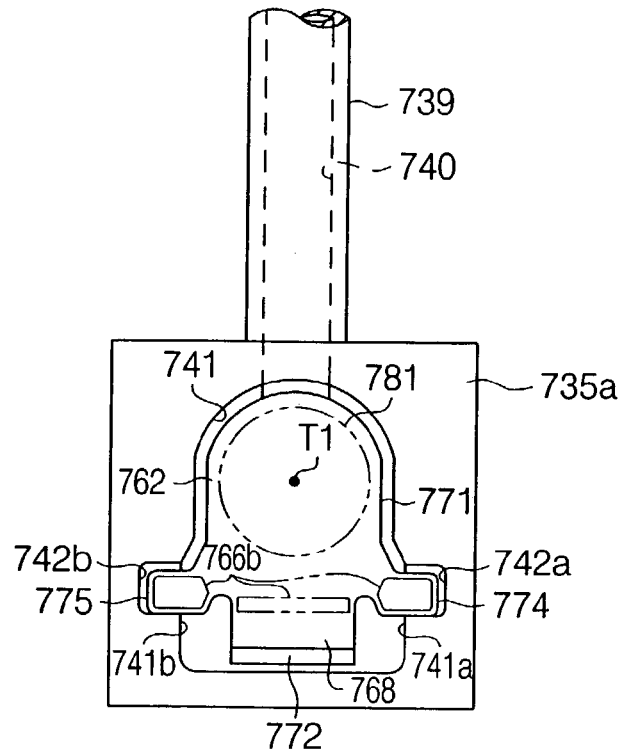
FIG. 51 is a partially exploded side view showing a passage valve.

As shown in FIGS. 50 and 51, a first recess 741 is formed in a first sidewall 735a of the passage forming member 735, which is located on the right as viewed in FIG. 50. The first recess 741 has an arcuate inner wall. The ink introducing hole 740 is formed in the inner wall to communicate the first recess 741 with the ink introducing hole 740. The first recess 741 has walls 741a, 741b, which are perpendicular to the main scanning direction. Facing shaft seats 742a, 742b are formed in the walls 741a, 741b.

As shown in FIG. 50, a second recess 743 is formed in a second sidewall 735b of the passage forming member 735, which is located in a lower portion as viewed in FIG. 50. The second recess 743 is communicated with the first recess 741. The second recess 743 has a bottom 743a extending along the main scanning direction. A substantially cylindrical third recess 745 is formed in the bottom 743a. A substantially cylindrical fourth recess 746 is formed in a bottom 745a of the third recess 745.

A substantially rectangular parallelepiped fifth recess 748 is formed in a third sidewall 735c of the passage forming member 735, which is located in an upper portion as viewed in FIG. 50. A communication hole 749 extending vertically as viewed in FIG. 50 is connected to the fifth recess 748. The communication hole 749 is communicated with the fourth recess 746 through the bottom 746a of the fourth recess 746.

A large recess 750 is formed in the second sidewall 735b. The diameter of the small recess 752 is smaller than the diameter of the large recess 750. The small recess 752 is communicated with the fifth recess 748 through a bottom 754. Therefore, the ink introducing hole 740 is communicated with the large recess 750 through the first to fourth recesses 741, 743, 745, 746, the communication hole 749, the fifth recess 748, and the small recess 752.

As in the first embodiment, the first and second films 736, 737 are each formed of layers of different materials.

The first film 736 is bent substantially by a right angle and heat welded to the first sidewall 735a and the second sidewall 735b of the passage forming member 735. The first film 736 seals the first and second recesses 741, 743. As a result, the first and second recesses 741, 743 and the first film 736 define a substantially L-shaped first ink chamber 756.

The second film 737 is heat welded to the third sidewall 735c to seal the opening of the fifth recess 748. As a result, the fifth recess 748 and the second film 737 define a second ink chamber 758.

As described above, the first ink chamber 756, the communication hole 749, the second ink chamber 758, the small recess 752, the large recess 750 form a passage. Ink that flows into the ink introducing hole 740 flows along the passage. The large recess 750 is connected to the recording head 16. Ink that flows in the large recess 753 is supplied to the recording head 16.

The valve device 734 includes a valve seat 761, a magnetic lever 762 functioning as an operational member, an aligning member 763, a coil spring 764, an electromagnet member 765, and a magnetic circuit forming member 766. The valve seat 761 is substantially annular and fitted in the fourth recess 746. A center hole 761a of the valve seat 761 is concentric with the communication hole 749. The height of the valve seat 761 as viewed in FIG. 50 is greater than the depth of of the fourth recess 746. The lower end of the valve seat 761 protrudes into the third recess 745. The valve seat 761 is made of elastic material such as a fluorine rubber, a rigid silicon rubber, a butyl rubber, an elastomer, a CR rubber, an NBR rubber, or a urethane rubber.

As shown in FIGS. 50 and 51, the magnetic lever 762 is substantially L-shaped and made of electromagnetic stainless steel. The magnetic lever 762 is located in the first ink chamber 756. Specifically, the magnetic lever 762 has a bent section 768, a first side section 771, and a second side section 772. The side sections 771, 772 are located on the sides of the bent section 768, respectively. The angle θ1 defined by the first side section 771 and the second section 772 is less than ninety degrees.

The distal end of the first side section 771 is substantially arcuate as shown in FIG. 51. The first side section 771 includes shaft sections 774, 775, which are located on a common line and protrude in the opposite directions. The shaft sections 774, 775 are spaced from the bent section 768.

The first side section 771 is located in the first recess 741 in the first ink chamber 756. The shaft sections 774, 775 are loosely fitted in the shaft seats 742a, 742b, respectively.

The second side section 772 is located in the second recess 743 in the first ink chamber 756. The magnetic lever 762 is rotatable clockwise and counterclockwise as viewed in FIG. 50 about the shaft sections 774, 775 in the first ink chamber 756.

Not only rotatable about the shaft sections 774, 775, the magnetic lever 762 is movable in the shaft seats 742a, 742b. That is, there is a play in the magnetic lever 762.

The aligning member 763 is substantially cylindrical and includes a main section 777 having a diameter less than that of the third recess 745 and a flange section 778 having a diameter greater than that of the third recess 745. The flange section 778 is located below the main section 777. A step 779 is defined between the main section 777 and the flange 778. The upper end of the aligning member 763 is formed flat, the lower end is formed semi-spherical.

The aligning member 763 is located between the magnetic lever 762 and the second side section 772 in the first ink chamber 756. The main section 777 of the aligning member 763 is partly loosely received by the third recess 745.

The coil spring 764 is a compression spring and extends from the first ink chamber 756 to the third recess 745. The outer diameter of the coil spring 764 is less than the inner diameter of the third recess 745 of the passage forming member 735. The inner diameter of the coil spring 764 is greater than the main section 777 of the aligning member 763. The upper end of the coil spring 764 is fitted in the third recess 745, and the lower end of the coil spring 764 is fitted about the main section 777 of the aligning member 763. The upper end of the coil spring 764 contacts the bottom 745a of the third recess 745. The lower end of the coil spring 764 contacts the step 779 of the aligning member 763.

The coil spring 764 urges the aligning member 763 away from the valve seat 761. The spherical lower end of the aligning member 763 contacts the second side section 772 of the magnetic member 762 at a point.

When a clockwise rotation force as viewed in FIG. 50 is applied to the magnetic lever 762, the aligning member 763 is moved toward the valve seat 761 via the second side section 772 of the magnetic lever 762. Accordingly, the upper surface of the aligning member 763 contacts the valve seat 761. As a result, the center hole 761a of the valve seat 761 is sealed, and the first ink chamber 756 and the second ink chamber 758 are disconnected from each other.

If the counterclockwise rotation force is stopped to be applied to the magnetic lever 762, the force of the coil spring 764 causes the spherical lower end of the aligning member 763 to press the second side section 772 of the magnetic lever 762. The magnetic lever 762 is rotate counterclockwise as viewed in FIG. 50. As shown in FIG. 50, the magnetic lever 762 is maintained a position where the first side section 771 contacts the wall 741c of the first recess 741. Also, the aligning member 763 is separated from the valve seat 761.

Accordingly, the center hole 761a of the valve seat 761 is opened. As a result, the first ink chamber 756 and the second ink chamber 758 are communicated with each other.

The electromagnet member 765 is fixed to the passage forming member 735. Since the electromagnet member 765 is located outside of the first ink chamber 756, the electromagnet member 765 does not contact ink. Therefore, when selecting the material for the electromagnet member 765, deterioration caused by ink does not need to be taken into consideration. This permits the material for the electromagnet portion 553 to be selected from a wide range of materials.

The electromagnet member 765 includes a core portion 781, a bobbin 782, a coil 783, and a terminal 785. The core portion 781 is a cylindrical magnetic member made of, for example, electromagnetic stainless steel. The central axis of the core portion 781 extends along the main scanning direction. As shown by chain double-dashed line lines in FIG. 51, the core portion 781 contacts the first film 736. That is, the core portion 781 faces the first side section 771 of the magnetic lever 762 with the first film 736 in between.

The bobbin 782 is cylindrical as shown in FIG. 50 and is made of resin such as polyamide (PA). The core portion 781 is fitted in the bobbin 782. The central axis 782 coincides with the central axis of the core portion 781.

The coil 783 is wound about the outer circumference of the bobbin 782. The coil 783 is electrically connected to the terminal 785. Current is supplied to the coil 783 through the terminal 785. When the coil 783 is supplied with current, a magnetic field is generated inside the bobbin 782.

When current is supplied to the terminal 785, a magnetic field is generated in the bobbin 782, which magnetizes the core portion 781 in the bobbin 782. That is, the electromagnet member 765 is an electromagnet that becomes a magnet when current is supplied to the terminal 785.

The magnetic circuit forming member 766 is formed of an electromagnetic stainless steel plate and is substantially J-shaped. The magnetic circuit forming member 766 is fixed to the electromagnet member 765. An upper end 766a of the magnetic circuit forming member 766 contacts the core portion 781 of the electromagnet member 765. A lower end of the magnetic field forming member 766 contacts the first film 736 as shown by solid lines in FIG. 50 and by chain double-dashed line in FIG. 51. That is, the lower end 776b of the magnetic field forming member 766 faces the periphery of the shaft sections 774, 775 with the first film 736 in between.

Figure 52:
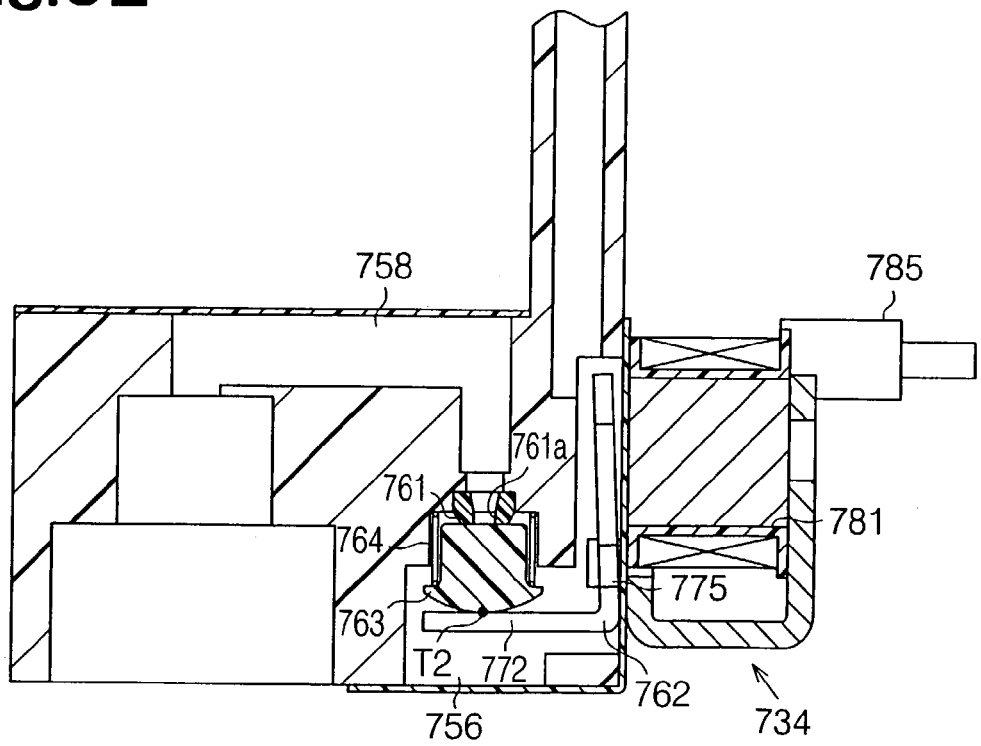
FIG. 52 is a schematic view showing an operation of a passage valve.

When current is supplied to the terminal 785, the core portion 781 is magnetized. Then, as shown in FIG. 52, the magnetic lever 762 is attracted to the core portion 781. As a result, the magnetic lever 762 is rotated clockwise about the shaft sections 774, 775 to a sealing position shown in FIG. 52. Accordingly, a aligning member 763 contacts the valve seat 761. Therefore, the valve seat 761 is sealed, and the first ink chamber 756 and the second ink chambers 758 are disconnected from each other. That is, the ink supply tube 13 (see FIG. 49) located upstream of the passage valve 715 and the recording head 16 are disconnected from each other, and ink is not supplied to the recording head 16.

Figure 53:
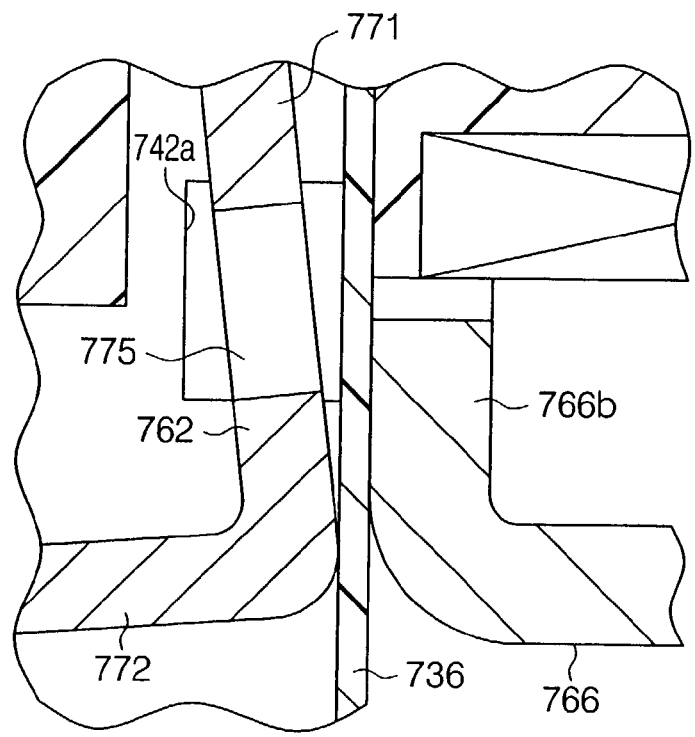
FIG. 53 is a schematic view showing an operation of a passage valve.
Figure 54:
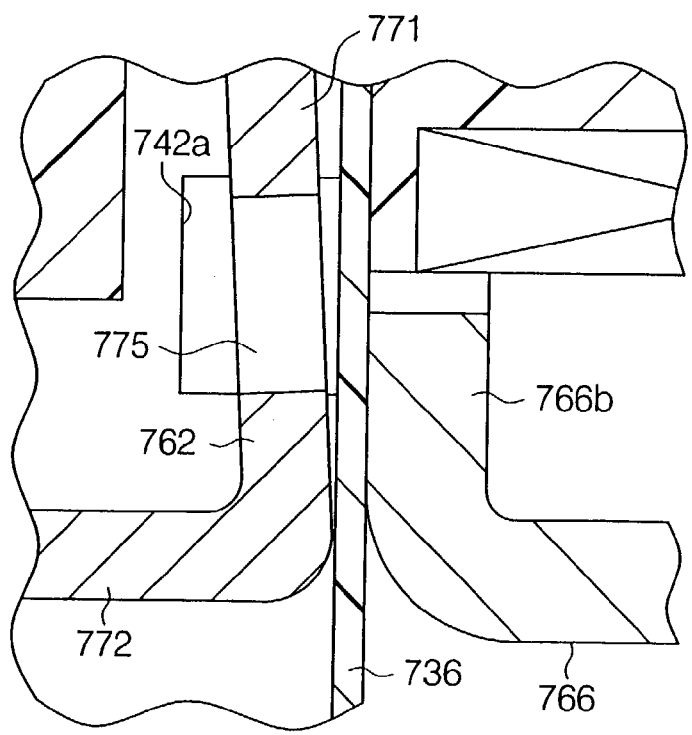
FIG. 54 is a schematic view showing an operation of a passage valve.

Since the shaft sections 774, 775 of the magnetic lever 762 are loosely fitted in the shaft seats 742a, 742b, the shaft sections 774, 775 are moved from a position spaced from the magnetic circuit forming member 766 shown in FIG. 53 to a position close to the magnetic circuit forming member 766 shown in FIG. 54. As a result, the distance between the magnetic circuit forming member 766 and the magnetic lever 762 is reduced, and the magnetic lever 762 is magnetized. That is, the core portion 781, the magnetic circuit forming member 766, and the magnetic lever 762 form a magnetic circuit. As a result, magnetic flux generated by the core portion 781 passes through the magnetic circuit forming member 766 and the magnetic lever 762, and increases the magnetic force that attracts the magnetic lever 762 toward the core portion 781. In this embodiment, a portion of the magnetic lever 762 that are located close to the magnetic circuit forming member 766, namely, a portion about the shaft sections 774, 775 are magnetized.

Since the magnetic lever 762 is magnetized when the sealed state of the valve seat 761 is maintained, the voltage applied to the coil 783 is lower than when the valve seat 761 is closed from the opened state. Therefore, when closing the valve seat 761 in this embodiment, current is supplied to the coil 783 by a relatively high first voltage in a first stage. Thereafter, in a second stage, current is supplied to the coil 783 by a relatively low second voltage. This reduces the power consumption, and an energy saving device is obtained.

When current to the coil 783 is stopped while the valve seat 761 is sealed, the magnetic lever 762 receives no magnetic force from the electromagnet member 765 and receives only the force of the coil spring 764. As a result, the magnetic lever 762 receives a counterclockwise force about the shaft sections 774, 775, which moves the magnetic lever 762 to an open position. As a result, the aligning member 763 and the valve seat 761 are separated from each other as shown in FIG. 50. The, the first ink chamber 756 and the second ink chambers 758 are communicated with each other. That is, the ink supply tube 13 is communicated with the recording head 16, and ink is supplied to the recording head 16.

By supplying and stopping current to the coil 783, the valve seat 761 is opened and closed. Accordingly, the ink supply tube 13 and the recording head 16 are communicated with and disconnected from each other.

In FIG. 50, T1 denotes a center of attraction of the magnetic lever 762 by the electromagnet member 765, and T2 denotes a contact point between the magnetic lever 762 and the aligning member 763. The distance between the attraction center point t1 and the rotation center of the shaft sections 774, 775 is greater than the distance between the contact point T2 and the rotational center of the shaft sections 774, 775. In this case, the magnetic lever 762 is rotated clockwise due to leverage. Therefore, the attraction force acting on the magnetic lever 762 is less than the drab at the contact point T2 of the magnetic lever 762. Therefore, when rotating the magnetic lever 762 clockwise to open the valve seat 761, the force for rotating the electromagnet member 765 is relatively small. As a result, the amount of electricity supplied to the coil 783 is reduced, and an energy saving device is obtained.

The above described valve device 734 is suitable for cleaning the recording head 16 by drawing ink. In the printer 11, a suction cleaning is performed as a maintenance of the recording head 16. In this cleaning, to remove bubbles in ink in the recording head 16, the ink is drawn by the suction pump 24. However, in a normal cleaning, bubbles cannot be sufficiently removed. Particularly, if a great number of bubbles remain on a filter (not shown), the nozzle may be blocked, which degrades the printing quality. The "choke cleaning" is one of effective methods for removing bubbles.

In the choke cleaning, a valve (the valve device 734) located in the upstream section of the ink passage is closed (choked), and suction is applied to the nozzle by the suction pump 24. The pressure in the recording head 16 is lowered to expand the bubbles, so that the bubbles are drawn to a section downstream of the filter of the recording head 19. In this state, the valve (the valve device 734) is opened to discharge the bubbles. The choke cleaning is executed by opening and closing the ink passage with the valve device 734.

The operation of the valve device 734 is suitable for cleaning one of a plurality of recording heads 16, or for executing the selective cleaning. The number of the nozzles per head of recent inkjet printers has increased due to the demands for faster printing. This is called higher resolution trend of inkjet printers. Also, due to the demands for high quality color printing, inkjet printers are equipped with inks with an increased number of colors. Accordingly, the amount of consumed ink has been increasing. Therefore, there is a demand for reducing the amount of consumed ink by reducing liquid waste generated in suction cleaning.

To achieve this goal, the selective cleaning, in which only the recording head 16 that requires cleaning is subjected to suction, is favorable. According to this embodiment, the valve device 34 is provided for the ink passage of each color, and the ink passage of the printing head corresponding to the ink that needs cleaning is opened, and the ink passages of the other printing heads are closed. In other words, this embodiment is capable of executing the selective cleaning.

The twentieth embodiment has the following advantages.

(1) In the twentieth embodiment, the passage valve 715 of the printer 11 includes the passage housing 733, the valve seat 761, the magnetic lever 762, and the electromagnet member 765. The magnetic lever 762 includes the shaft sections 774, 775. The shaft sections 774, 775 are loosely supported by the shaft seats 742a, 742b of the passage forming member 735.

As a result, if there is no play between the shaft sections 774 and 775 and the movement of the shaft sections 774, 775 is limited, errors during assembly may cause the valve seat from being accurately sealed and opened by the magnetic lever. However, in the present invention, the play of the shaft sections 774, 775 absorbs assembly errors. As a result, the valve device 734 is reliably opened and closed.

(2) In the twentieth embodiment, the magnetic lever 762 includes the bent section 768, and first and second side sections 771, 772 located at the sides of the bent section 768. The angle θ1 defined by the side sections 771, 772 is less than ninety degrees. Therefore, the direction in which a force is transmitted from the first side section 771 to the electromagnet member 765 is different from the direction in which the second side section 772 presses the aligning member 763. This adds to the flexibility of arrangement of the electromagnet member 765, the magnetic lever 762, the valve seat 761. Thus, the side of the entire valve device 734 is reduced.

(3) In the twentieth embodiment, the shaft sections 774, 775 are formed in the first side section 771. Therefore, the positions of the shaft sections 774, 775 are not overlap the position of the bent section 768 of the magnetic lever 762. This facilitates the machining of the magnetic lever 762. As a result, the machining accuracy of the magnetic lever 762 is prevented from being degraded. Thus, the valve device 734 having a high precision is obtained.

The shaft sections 774, 775 are arranged at positions that permit the shaft sections 774, 775 to be easily magnetized. This permits the magnetic lever 762 to be attracted toward the electromagnet member 765 by a great force.

(4) In the twentieth embodiment, the magnetic lever 762 is made of a magnetic material is moved by supplying and stopping current to the electromagnet member 765, thereby sealing and opening the valve seat 761.

Therefore, since the magnetic lever 762 is moved by magnetic force, the electromagnet member 765 and the magnetic lever 762 are maintained at a non-contacting state, which permits the magnetic lever 762 to be smoothly moved. Also, unlike the magnetic lever 762, the electromagnet member 765 does not need to be accommodated in the ink chamber. Therefore, the ink resistance of the material of the electromagnet member 765 does not need to be taken into consideration, which adds to the flexibility of design of the valve device.

(5) In the twentieth embodiment, the force applied to the magnetic lever 762 is clearly turned on and off by supplying and stopping current to the electromagnet member 765. This improves the opening and closing response of the valve device 734.

(6) In the twentieth embodiment, the electromagnet member 765 includes the magnetic circuit forming member 766. Therefore, a magnetic circuit is generated by supplying current to the electromagnet member 765, and the attraction force applied to the magnetic lever 762 is increased.

(7) In the twentieth embodiment, the magnetic lever 762 is moved toward the electromagnet member 765 when the electromagnet member 765 is supplied with current. Accordingly, the distance between the magnetic circuit forming member 766 and the magnetic lever 762, and the magnetic lever 762 is magnetized. That is, the core portion 781, the magnetic circuit forming member 766, and the magnetic lever 762 form a magnetic circuit. Therefore, the force by which the magnetic lever 762 is attracted toward the electromagnet member 765 is increased. As a result, the magnitude of the voltage applied to the electromagnet member 765 can be reduced after the magnetic lever 762 is magnetized, which reduces the consumption of the electricity.

(8) In twentieth embodiment, when the magnetic lever 762 is magnetized, a portion of the magnetic lever 762 that are located close to the magnetic circuit forming member 766, namely, a portion about the shaft sections 774, 775 are magnetized. Therefore, the area of the portion that is magnetized is enlarged by the area of the shaft sections 774, 775. As a result, the magnetic lever 762 is attracted by a stable and great attraction force.

(9) In the twentieth embodiment, the valve seat 761 is sealed when the electromagnet member 765 is supplied with current. Therefore, the time period of supplying current to the electromagnet member 765 can be shortened during the choke cleaning or the selective cleaning of the printer 11, in which a time for closing the passage valve is shorter than a time for opening the valve device 734. This improves the energy efficiency.

(10) In the twentieth embodiment, the coil spring 764, which is located between the aligning member 763 and the valve seat 761, urges the aligning member 763 away from the valve seat 761. Therefore, as long as the electromagnet member 765 causes the magnetic lever 762 to move the aligning member 763 to closely contact the valve seat 761, the electromagnet member 765 may have any configuration. This permits the valve device 734 to be simplified.

(11) In the twentieth embodiment, the aligning member 763 is located between the magnetic member 762 and the valve seat 761. The magnetic lever 762 presses the aligning member 763 so that the aligning member 763 closely contacts and seals the valve seat 761. This permits the valve device 734 to reliably open and close the passage. In this case, the magnetic lever 762 does not need to be formed of a material that closely contacts the valve seat 761, which permits the material for the magnetic lever 762 to be selected from a wide range of materials.

(12) In the twentieth embodiment, a part of the aligning member 763 that contacts the magnetic lever 762 is spherical. Therefore, even if the magnetic lever 762 contacts the aligning member 763 in various directions, the force applied to the aligning member 763 from the magnetic lever 762 is reliably transmitted to the aligning member 763. As a result, when sealing the valve seat 761, the aligning member 763 reliably contacts the valve seat 761. Thus, the passage valve 715 is accurately opened and closed.

(13) In the twentieth embodiment, T1 denotes a center of attraction of the magnetic lever 762, and T2 denotes a contact point between the magnetic lever 762 and the aligning member 763. The distance between the attraction center point t1 and the rotation center of the shaft sections 774, 775 is greater than the distance between the contact point T2 and the rotational center of the shaft sections 774, 775. Therefore, when rotating the magnetic lever 762 clockwise to open the valve seat 761, the force for rotating the electromagnet member 765 is relatively small. As a result, the amount of electricity supplied to the coil 783 is reduced, and an energy saving device is obtained

(14) In the twentieth embodiment, the passage housing 733 of the passage valve 715 is formed by the passage forming member 735 and the first and second films 736, 737. The first and second films 736 737 closes the openings of the first and second recesses 741, 743, and the fifth recess 748, respectively.

When manufacturing the passage valve 715, the magnetic lever 762 is placed in recesses 741, 743 of the passage forming member 735 before the recess 741, 743 are sealed with the first and second films 736, 737. This permits the magnetic lever 762 to be easily placed in the passage of the passage valve 715, and thus facilitates the manufacture.

(15) In the twentieth embodiment, the first film 736 is located between the electromagnet member 765 and the magnetic lever 762. Therefore, since the electromagnet member 765 and the magnetic lever 762 are located close to each other with the first film 736 in between, the distance between the electromagnet member 765 and the magnetic lever 762 is shortened. As a result, a great force is applied to the magnetic lever 762. Since the electromagnet member 765 is located outside the passage, the ink resistance of the material of the electromagnet member 765 does not need to be taken into consideration, which adds to the flexibility of design of the valve device.

(16) In the twentieth embodiment, when closing the valve seat 761, the coil 783 is supplied with current by the relatively high first voltage in the first stage, so that the magnetic lever 762 is moved to a position where the magnetic lever 762 becomes a magnetic circuit. Thereafter, in the second stage, the coil 783 is supplied with current by the relatively low second voltage, so that the magnetic lever 762, which becomes a magnetic circuit, keeps being attracted toward the electromagnet member 765. Therefore, voltages of appropriate magnitude for each position of the magnetic lever 762 are applied to the electromagnet member 765, which reduces the electricity consumption, and an energy saving device is obtained The twentieth embodiment may be modified as follows.

In the twentieth embodiment, the magnetic lever 762, the aligning member 763, and the valve seat 761 are arranged in this order from the upstream side of ink flow. However, the valve seat 761, the aligning member 763, and the magnetic lever 762 may arranged in this order from the upstream side of ink flow. In this case, the shape of the passage housing 733 is changed, accordingly.

The first side section 771 and the second side section 772 of the magnetic lever 762 may be located in a common plane.

In the magnetic lever 762, the shaft sections 774, 775 may be formed on the bent section 768. Alternatively, the shaft sections 774, 775 may be formed on the second side section 772.

A solenoid and a magnet may be used as devices for moving the magnetic member 762. That is, the position of the magnetic lever 762 may be changed by changing the position of a magnet by a solenoid for attracting and not attracting the magnetic lever 762.

In the twentieth embodiment, the coil spring 764 may be replaced with a leaf spring or a disk spring.

In the twentieth embodiment, the aligning member 763 and the magnetic lever 762 are independent from each other. However, the aligning member 763 and the magnetic lever 762 may be formed integrally. When formed integrally, the aligning member 763 and the magnetic lever 762 may be formed of a magnetic material.

A part of the aligning member 763 that contacts the magnetic lever 762 may have a curved shape other than the spherical shape. Alternatively, the part may be flat.

The distance between the rotation center and the attraction center point T1 of the magnetic lever 762 may be equal to or less than the distance between the rotation center and the contact point T2 of the magnetic lever 762 and the aligning member 763.

The first and second films 736, 737 may be attached to the passage forming member 735 through a method other than heat welding.

In the twentieth embodiment, the first voltage, which is higher than the second voltage, is applied to the electromagnet member 765 in the first stage, or before the magnetic lever 762 is magnetized. The second voltage is applied to the electromagnet member 765 in the second stage, or after the magnetic lever 762 is magnetized.

However, the same voltage may be applied to the electromagnet member 765 before and after the magnetic lever 762 is magnetized. Alternatively, the second voltage may be higher than the first voltage.

In the twentieth embodiment, the passage valve 715 is used in the printer 11, in which the ink cartridge 12 is not mounted on the carriage 14. However, the passage valve 715 is applicable to printers in which the ink cartridge 12 is mounted on the carriage 14.

In the twentieth embodiment, the passage valve 715 is fixed to the carriage 14. However, the passage valve 715 may be located at an arbitrary position in the ink passage from the ink supply tube 13 to the ink cartridge 12.

In above embodiments, the present invention is applied to the liquid ejecting apparatus, or the printer 11. However, the present invention may be applied to other types of liquid ejecting apparatuses. For example, the present invention may be applied to printing machines including fax machines and copy machines, a liquid ejecting apparatus for ejecting liquid such as electrode material or color material used for manufacturing electro luminescent displays and surface light emitting displays. The present invention may also be applied to liquid ejecting apparatus for ejecting biological organic matter used for manufacturing biochips. Alternatively, the present invention may be applied to sample ejecting apparatus such as a precision pipette. The valve device 734 may be used in an apparatus other than liquid ejecting apparatuses. Also, the present invention may be applied to devices that uses fluids other than ink.

The invention claimed is:

1. A valve device, comprising:
   a valve member located in a passage through which fluid passes, wherein the valve member selectively opens and closes the passage, wherein the passage is formed by a passage forming member made of a resin material;
   a support member, which is made of a magnetic and elastic material, wherein the support member has a proximal section, a distal section and an attraction section located between the proximal and distal sections, wherein the support member is located within the passage, the proximal section of the support member is fixed to the passage forming member, and the distal section of the support member supports the valve member;
   an electromagnetic driving mechanism which attracts the attraction section of the support member with magnetic force; and
   a film between the support member and the electromagnetic driving mechanism wherein the film associates with the passage forming member to form the passage;
   wherein the electromagnetic driving mechanism is outside the passage and faces the attraction section of the support member with the film in between; and
   wherein the valve member closes the passage when the electromagnetic driving mechanism is activated to attract the attraction section of the support member against an elasticity of the support member, wherein the valve member opens the passage according to the elasticity of the support member when the electromagnetic driving mechanism is not activated, and wherein when the valve member selectively opens and closes the passage, the support member is elastically deformed.

2. The valve device according to claim 1, wherein the electromagnetic driving mechanism includes a pair of magnetic members, each of which is located on one of facing surfaces of the passage forming member.

3. The valve device according to claim 2,
   wherein the proximal section and one of the magnetic members of the electromagnetic driving mechanism are located close to each other, with the film in between.

4. The valve device according to claim 3, wherein the film is heat welded to the passage forming member.

5. The valve device according to claim 3, wherein the film is formed of a material having a high gas barrier property.

6. The valve device according to claim 3,
   wherein the distance between the proximal section and the attraction section of the support member is shorter than the distance between the proximal section and the valve member.

7. The valve device according to claim 2, wherein the passage is closed by causing an annular projection formed on the valve member to contact the passage forming member.

8. The valve device according to claim 2, wherein the passage forming member has a small hole, which partially forms the passage, wherein an annular projection is formed at a periphery of the small hole, and wherein the passage is closed by causing the valve member to contact the annular projection.

9. The valve device according to claim 8, wherein the projection is formed of an elastic material.

10. The valve device according to claim 1, wherein the elastic material comprises a leaf spring.

11. The valve device according to claim 1, further comprising:
    an elastic member, wherein, when the valve member closes the passage, the elastic member urges the valve member in a direction opening the passage.

12. The valve device according to claim 11, wherein the elastic member comprises a coil spring.

13. The valve device according to claim 1, wherein a filter is located in an upstream section of the valve device.

14. The valve device according to claim 1, wherein the valve device is used for a liquid ejecting apparatus.

15. The valve device according to claim 14, wherein the valve device is located upstream to a filter of an ejecting head of the liquid ejecting apparatus.

16. The valve device according to claim 14, wherein the valve device is used for the choke cleaning or the selective cleaning of the liquid ejecting apparatus.

* * * * *